(12) United States Patent
Inagaki et al.

(10) Patent No.: US 7,058,001 B2
(45) Date of Patent: Jun. 6, 2006

(54) RECORDING MEDIUM AND INFORMATION RECORDING AND REPRODUCING METHOD USING THE SAME

(75) Inventors: Yoshio Inagaki, Kaisei-machi (JP); Masayuki Naya, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 708 days.

(21) Appl. No.: 09/793,721

(22) Filed: Feb. 27, 2001

(65) Prior Publication Data

US 2002/0118627 A1    Aug. 29, 2002

(30) Foreign Application Priority Data

Feb. 28, 2000 (JP) ............................ 2000-052375
Feb. 28, 2000 (JP) ............................ 2000-052397
Feb. 28, 2000 (JP) ............................ 2000-052406

(51) Int. Cl.
    G11B 7/24 (2006.01)
(52) U.S. Cl. .................. 369/288; 369/284; 430/270.18
(58) Field of Classification Search ........... 430/270.21, 430/270.18, 270.19; 369/284, 288
    See application file for complete search history.

(56) References Cited

U.S. PATENT DOCUMENTS

| | | | |
|---|---|---|---|
| 4,030,926 A | | 6/1977 | Stahlke et al. |
| 5,787,032 A | * | 7/1998 | Heller et al. ................. 365/151 |
| 5,936,878 A | | 8/1999 | Arsenov et al. |
| 5,945,252 A | | 8/1999 | Sokoluk et al. |
| 5,998,094 A | * | 12/1999 | Ishida et al. ............ 430/270.19 |
| 6,020,105 A | * | 2/2000 | Wariishi ................... 430/270.2 |
| 6,071,671 A | * | 6/2000 | Glushko et al. ........ 430/270.15 |
| 6,071,672 A | * | 6/2000 | Namba et al. .......... 430/270.18 |
| 6,077,584 A | * | 6/2000 | Hurditch .................... 428/64.1 |
| 6,147,959 A | * | 11/2000 | Ohyama ..................... 369/126 |
| 6,168,843 B1 | * | 1/2001 | Kambe et al. .............. 428/64.1 |
| 6,218,072 B1 | * | 4/2001 | Otaguro et al. ........ 430/270.21 |
| 6,335,522 B1 | * | 1/2002 | Shimada et al. .......... 250/201.3 |
| 6,614,746 B1 | * | 9/2003 | Tanaka et al. .............. 369/126 |
| 6,682,799 B1 | * | 1/2004 | Alperovich et al. ....... 428/64.1 |
| 6,785,214 B1 | * | 8/2004 | Kumacheva et al. ........ 369/103 |

FOREIGN PATENT DOCUMENTS

WO    WO 98/25268 A    6/1998

* cited by examiner

*Primary Examiner*—Brian E. Miller
*Assistant Examiner*—Michael V. Battaglia
(74) *Attorney, Agent, or Firm*—Sughrue Mion, PLLC

(57) ABSTRACT

A recording medium comprises a substrate and a recording layer overlaid on the substrate. The recording layer comprises a material, which has properties such that, when recording light having a predetermined wavelength $\lambda 1$ is irradiated to the material, the material is capable of being caused to change into a fluorescent material and such that, when excitation light having a wavelength $\lambda 2$ is then irradiated to the thus formed fluorescent material, the fluorescent material is capable of being caused to produce fluorescence. The wavelength $\lambda 1$ of the recording light and the wavelength $\lambda 2$ of the excitation light may be identical or different. The substrate may be constituted of a material having properties such that, when the excitation light is irradiated to the material, the material does not produce fluorescence having a wavelength identical with the wavelength of the fluorescence produced by the fluorescent material.

22 Claims, 14 Drawing Sheets

F I G . 3
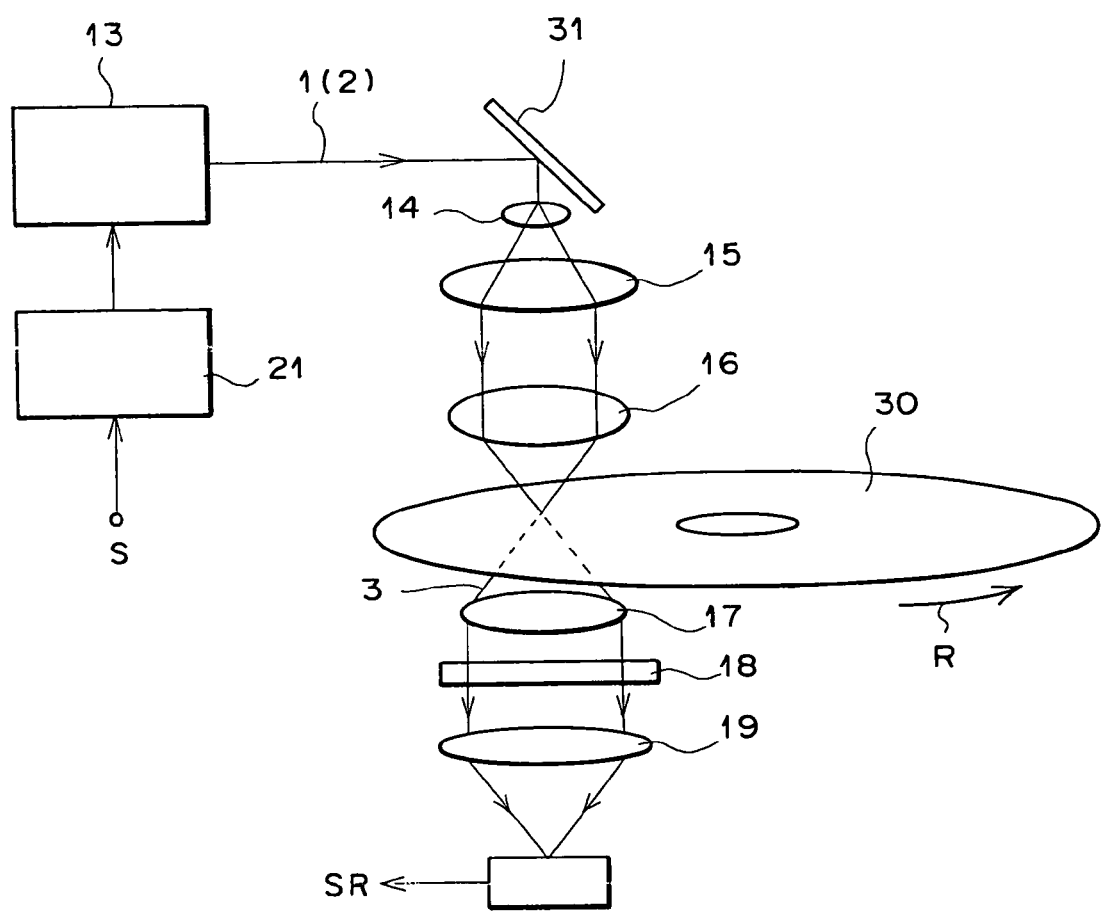

F I G. 6
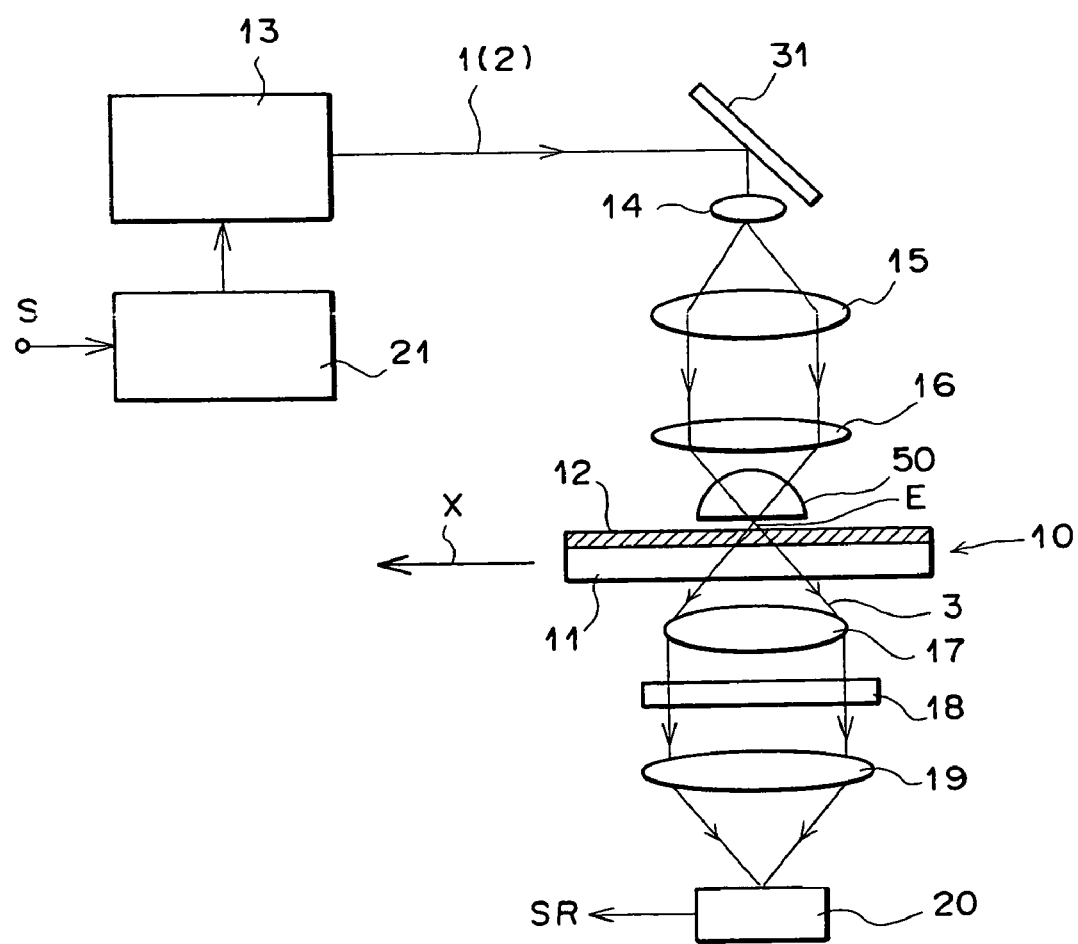

RECORDING MEDIUM AND INFORMATION RECORDING AND REPRODUCING METHOD USING THE SAME

BACKGROUND OF THE INVENTION

1. Field of the Invention

This invention relates to a recording medium. This invention particularly relates to a recording medium provided with a recording layer comprising a material, which has properties such that, when light having a predetermined wavelength is irradiated to the material, the material is capable of being caused to change into a fluorescent material. This invention also relates to a method and apparatus for recording information, in which the recording medium is utilized. This invention further relates to a method and apparatus for reproducing information, in which the recording medium is utilized.

2. Description of the Related Art

There have heretofore been proposed various recording media, each of which is provided with a recording layer having properties such that, when light, such as a laser beam having been converged into a small beam diameter, is irradiated to the recording layer, a change in characteristics is caused to occur at a local area limited site of a material constituting the recording layer. By the utilization of the properties of the recording layers of the recording media, information, such as image information or computer data, is capable of being recorded on the recording media. As the recording media described above, recording media, such as CD-R disks, wherein only one piece of information is capable of being recorded at a single point on the recording layer, were popular in the past. Recently, recording media enabling multiple recording, wherein multiple pieces of information are capable of being recorded at a single point on the recording layer and the information is thus capable of being recorded at a high density, have been proposed.

As the recording media described above, recording media provided with recording layers constituted of fluorescent materials have been proposed. With the conventional recording media of the types described above, ordinarily, recording and reproduction of information are performed by the utilization of the characteristics such that, when recording light is irradiated to the recording layer constituted of the fluorescent material and excitation light acting as reproducing light is then irradiated to the site on the recording layer, which site has been exposed to the recording light, the intensity of the fluorescence, which is produced from the site having been exposed to the recording light, becomes lower than the intensity of the fluorescence, which is produced from the site having not been exposed to the recording light, or the wavelength of the fluorescence, which is produced from the site having been exposed to the recording light, varies from the wavelength of the fluorescence, which is produced from the site having not been exposed to the recording light.

However, with the conventional techniques for performing the recording and the reproduction of the information in the manner described above, in cases where the excitation light is irradiated to the site having not been exposed to the recording light, as in cases where the excitation light is irradiated to the site having been exposed to the recording light, the fluorescence is produced from the site having not been exposed to the recording light, though the intensity or the wavelength of the fluorescence varies from the intensity or the wavelength of the fluorescence produced from the site having been exposed to the recording light. Therefore, the problems occur in that the fluorescence produced from the site having not been exposed to the recording light acts as a background, and a reproduced signal having a high signal-to-noise ratio cannot always be obtained.

SUMMARY OF THE INVENTION

The primary object of the present invention is to provide a recording medium, wherein a reproduced signal having a high signal-to-noise ratio is capable of being obtained by the utilization of production of fluorescence.

Another object of the present invention is to provide an information recording method, wherein information is capable of being recorded on the recording medium.

A further object of the present invention is to provide an apparatus for carrying out the information recording method.

A still further object of the present invention is to provide an information reproducing method, wherein a reproduced signal having a high signal-to-noise ratio is capable of being obtained from the recording medium.

Another object of the present invention is to provide an apparatus for carrying out the information reproducing method.

A further object of the present invention is to provide a recording medium, wherein a reproduced signal having a high signal-to-noise ratio is capable of being obtained by the utilization of production of fluorescence, and wherein multi-valued information is capable of being recorded at a recording unit, such as a single pit.

A still further object of the present invention is to provide a multi-valued information recording method, wherein multi-valued information is capable of being recorded on the recording medium.

Another object of the present invention is to provide an apparatus for carrying out the multi-valued information recording method.

A further object of the present invention is to provide a multi-valued information reproducing method, wherein a reproduced signal having a high signal-to-noise ratio is capable of being obtained from the recording medium.

A still further object of the present invention is to provide an apparatus for carrying out the multi-valued information reproducing method.

Another object of the present invention is to provide a recording medium, wherein multiple recording is capable of being performed, wherein a reproduced signal having a high signal-to-noise ratio is capable of being obtained, and wherein the recording medium is capable of being produced with a high producibility.

A further object of the present invention is to provide an information recording method, wherein multiple recording of information is capable of being performed at a high density on the recording medium.

A still further object of the present invention is to provide an apparatus for carrying out the information recording method for the multiple recording.

Another object of the present invention is to provide an information reproducing method, wherein a reproduced signal having a high signal-to-noise ratio is capable of being obtained from the recording medium, on which the multiple recording has been performed.

A further object of the present invention is to provide an apparatus for carrying out the information reproducing method, wherein the reproduced signal is capable of being obtained from the recording medium, on which the multiple recording has been performed.

The present invention provides a first recording medium, comprising:

i) a substrate, and ii) a recording layer overlaid on the substrate, wherein the recording layer comprises a material, which has properties such that, when recording light having a predetermined wavelength $\lambda 1$ is irradiated to the material, the material is capable of being caused to change into a fluorescent material and such that, when excitation light having a wavelength $\lambda 2$ is then irradiated to the thus formed fluorescent material, the fluorescent material is capable of being caused to produce fluorescence.

In the first recording medium in accordance with the present invention, the wavelength $\lambda 1$ of the recording light and the wavelength $\lambda 2$ of the excitation light may be identical with each other. Alternatively, the wavelength $\lambda 1$ of the recording light and the wavelength $\lambda 2$ of the excitation light may be different from each other.

Also, in the first recording medium in accordance with the present invention, the substrate should preferably be constituted of a material other than materials, which have properties such that, when the excitation light having the wavelength $\lambda 2$ is irradiated to the materials, the materials are caused to produce fluorescence having a wavelength identical with the wavelength of the fluorescence produced by the fluorescent material.

Further, the first recording medium in accordance with the present invention should preferably be modified such that the substrate comprises a dielectric material, a metal film is overlaid on one surface of the dielectric material, and the recording layer is overlaid on the metal film. In such cases, the metal film should preferably comprise a metal selected from the group consisting of gold and silver.

Furthermore, in the first recording medium in accordance with the present invention, the substrate should preferably comprise a material permeable to the excitation light having the wavelength $\lambda 2$.

The present invention also provides a first information recording method, in which information is recorded on the first recording medium in accordance with the present invention, the method comprising the step of:

irradiating the recording light having the predetermined wavelength $\lambda 1$, which recording light carries recording information, to the recording layer of the recording medium, the material, which is located at a site having been exposed to the recording light, being thereby caused to change into the fluorescent material.

In the first information recording method in accordance with the present invention, an evanescent wave, which has been radiated out from a range of a diameter shorter than the wavelength of the recording light, should preferably be employed as the recording light.

The present invention further provides a first information recording apparatus, in which information is recorded on the first recording medium in accordance with the present invention, the apparatus comprising:

recording means for irradiating the recording light having the predetermined wavelength $\lambda 1$, which recording light carries recording information, to the recording layer of the recording medium in order to cause the material, which is located at a site having been exposed to the recording light, to change into the fluorescent material.

The first information recording apparatus in accordance with the present invention should preferably be modified such that the recording means is provided with a micro-aperture probe, which is provided with a light passage aperture having a diameter shorter than the wavelength of the recording light, the light passage aperture being formed at one end of the micro-aperture probe, and the recording means irradiates an evanescent wave, which has been radiated out from the light passage aperture of the micro-aperture probe, to the recording layer.

Alternatively, the first information recording apparatus in accordance with the present invention may preferably be modified such that the recording means irradiates an evanescent wave, which has been radiated out from a solid immersion lens, to the recording layer.

The present invention still further provides a first information reproducing method for reproducing recording information from the first recording medium in accordance with the present invention, on which the recording information has been recorded, wherein the recording information has been recorded on the recording medium by irradiating the recording light having the predetermined wavelength $\lambda 1$, which recording light carries the recording information, to the recording layer of the recording medium, the material, which is located at a site having been exposed to the recording light, being thereby caused to change into the fluorescent material, the method comprising the steps of:

i) irradiating the excitation light having the wavelength $\lambda 2$, which falls within an excitation wavelength region for the fluorescent material, to the recording layer, the fluorescent material being thereby caused to produce the fluorescence, and ii) detecting the fluorescence.

The first information reproducing method in accordance with the present invention may be modified such that light having the wavelength $\lambda 2$ identical with the wavelength $\lambda 1$ of the recording light is employed as the excitation light, an intensity of the excitation light having the wavelength $\lambda 2$ is set at an intensity lower than the intensity of the recording light, and the excitation light having the thus set intensity is irradiated to the recording layer.

Alternatively, in the first information reproducing method in accordance with the present invention, light having the wavelength $\lambda 2$ different from the wavelength $\lambda 1$ of the recording light may be employed as the excitation light.

Also, the first information reproducing method in accordance with the present invention should preferably be modified such that light irradiated to a fine range is employed as the excitation light, the recording layer is scanned with the excitation light, and the fluorescence produced from the recording layer during the scanning with the excitation light is detected with respect to each of positions which are being scanned.

In such cases, an evanescent wave, which has been radiated out from a range of a diameter shorter than the wavelength of the excitation light, should preferably be employed as the excitation light.

Further, the first information reproducing method in accordance with the present invention may be modified such that the excitation light is entered into the substrate so as to propagate through repeated total reflection between two surfaces of the substrate, an evanescent wave, which oozes out from the substrate toward the recording layer when the excitation light is thus entered into the substrate, is irradiated to the recording layer, and the fluorescence, which has been produced from the recording layer when the evanescent wave is thus irradiated to the recording layer, is spatially resolved and detected.

Furthermore, in the first information reproducing method in accordance with the present invention, in cases where the recording medium is constituted such that the substrate comprises the dielectric material, the metal film is overlaid on one surface of the dielectric material, and the recording layer is overlaid on the metal film, the excitation light should preferably be irradiated from the substrate side to the recording medium such that the excitation light impinges at a specific angle of incidence upon the metal film.

The present invention also provides a first information reproducing apparatus for reproducing recording information from the first recording medium in accordance with the present invention, on which the recording information has been recorded, wherein the recording information has been recorded on the recording medium by irradiating the recording light having the predetermined wavelength $\lambda 1$, which recording light carries the recording information, to the recording layer of the recording medium, the material, which is located at a site having been exposed to the recording light, being thereby caused to change into the fluorescent material, the apparatus comprising:

i) excitation means for irradiating the excitation light having the wavelength $\lambda 2$, which falls within an excitation wavelength region for the fluorescent material, to the recording layer in order to cause the fluorescent material to produce the fluorescence, and ii) read-out means for detecting the fluorescence.

The first information reproducing apparatus in accordance with the present invention should preferably be modified such that the excitation means employs light, which has the wavelength $\lambda 2$ identical with the wavelength $\lambda 1$ of the recording light, as the excitation light, the excitation means sets an intensity of the excitation light having the wavelength $\lambda 2$ at an intensity lower than the intensity of the recording light, and the excitation means irradiates the excitation light having the thus set intensity to the recording layer.

Alternatively, the first information reproducing apparatus in accordance with the present invention may be modified such that the excitation means irradiates light, which has the wavelength $\lambda 2$ different from the wavelength $\lambda 1$ of the recording light, as the excitation light to the recording layer.

Also, the first information reproducing apparatus in accordance with the present invention should preferably be modified such that the excitation means scans the recording layer with converged beam-like excitation light, and the read-out means detects the fluorescence with respect to each of positions which are being scanned with the excitation light.

Further, in the first information reproducing apparatus in accordance with the present invention, in cases where the recording medium is constituted such that the substrate comprises the dielectric material, the metal film is overlaid on one surface of the dielectric material, and the recording layer is overlaid on the metal film, the excitation means should preferably irradiate the excitation light to the recording medium such that the excitation light impinges upon the metal film from the substrate side.

Furthermore, the first information reproducing apparatus in accordance with the present invention should preferably be modified such that the excitation means scans the recording layer with an evanescent wave, which has been radiated out from a solid immersion lens, and the read-out means detects the fluorescence with respect to each of positions which are being scanned with the evanescent wave.

Also, the first information reproducing apparatus in accordance with the present invention should preferably be modified such that the excitation means is provided with a micro-aperture probe, which is provided with a light passage aperture having a diameter shorter than the wavelength of the excitation light, the light passage aperture being formed at one end of the micro-aperture probe, the excitation means scans the recording layer with an evanescent wave, which has been radiated out from the light passage aperture of the micro-aperture probe, and the read-out means detects the fluorescence with respect to each of positions which are being scanned with the evanescent wave.

Further, the first information reproducing apparatus in accordance with the present invention should preferably be modified such that the excitation means irradiates the excitation light into the substrate such that the excitation light propagates through repeated total reflection between two surfaces of the substrate, and such that an evanescent wave, which oozes out from the substrate toward the recording layer when the excitation light is thus entered into the substrate, is irradiated to the recording layer, and the read-out means spatially resolves and detects the fluorescence, which has been produced from the recording layer when the evanescent wave is thus irradiated to the recording layer.

Furthermore, the first information reproducing apparatus in accordance with the present invention should preferably be constituted such that an optical system, through which the excitation light passes, contains only optical members other than optical members, which have properties such that, when the excitation light having the wavelength $\lambda 2$ is irradiated to the optical members, the optical members are caused to produce fluorescence having a wavelength identical with the wavelength of the fluorescence produced by the fluorescent material.

The present invention further provides a second recording medium, comprising:

i) a substrate, and ii) a recording layer overlaid on the substrate, wherein the recording layer comprises a material, which has properties such that, when recording light having a predetermined wavelength $\lambda 1$ is irradiated to the material, the material is capable of being caused to change into a fluorescent material and such that, when excitation light having a wavelength $\lambda 2$ is then irradiated to the thus formed fluorescent material, the fluorescent material is capable of being caused to produce fluorescence having an intensity in accordance with the intensity of the recording light.

In the second recording medium in accordance with the present invention, the wavelength $\lambda 1$ of the recording light and the wavelength $\lambda 2$ of the excitation light may be identical with each other. Alternatively, the wavelength $\lambda 1$ of the recording light and the wavelength $\lambda 2$ of the excitation light may be different from each other.

Also, in the second recording medium in accordance with the present invention, the substrate should preferably be constituted of a material other than materials, which have properties such that, when the excitation light having the wavelength $\lambda 2$ is irradiated to the materials, the materials are caused to produce fluorescence having a wavelength identical with the wavelength of the fluorescence produced by the fluorescent material.

Further, the second recording medium in accordance with the present invention should preferably be modified such that the substrate comprises a dielectric material, a metal film is overlaid on one surface of the dielectric material, and the recording layer is overlaid on the metal film. In such cases, the metal film should preferably comprise a metal selected from the group consisting of gold and silver.

Furthermore, in the second recording medium in accordance with the present invention, the substrate should preferably comprise a material permeable to the excitation light having the wavelength $\lambda 2$.

As a second information recording method, the present invention still further provides a multi-valued information recording method, in which multi-valued information is recorded on the second recording medium in accordance with the present invention, the method comprising the step of:

irradiating the recording light having the predetermined wavelength $\lambda 1$, which recording light has an intensity in accordance with the multi-valued information, to the recording layer of the recording medium, the material, which is located at a site having been exposed to the recording light, being thereby caused to change into the fluorescent material.

In the second multi-valued information recording method in accordance with the present invention, an evanescent wave, which has been radiated out from a range of a diameter shorter than the wavelength of the recording light, should preferably be employed as the recording light.

As a second information recording apparatus, the present invention also provides a multi-valued information recording apparatus, in which multi-valued information is recorded on the second recording medium in accordance with the present invention, the apparatus comprising:

recording means for irradiating the recording light having the predetermined wavelength $\lambda 1$, which recording light has an intensity in accordance with the multi-valued information, to the recording layer of the recording medium in order to cause the material, which is located at a site having been exposed to the recording light, to change into the fluorescent material.

The second multi-valued information recording apparatus in accordance with the present invention should preferably be modified such that the recording means is provided with a micro-aperture probe, which is provided with a light passage aperture having a diameter shorter than the wavelength of the recording light, the light passage aperture being formed at one end of the micro-aperture probe, and the recording means irradiates an evanescent wave, which has been radiated out from the light passage aperture of the micro-aperture probe, to the recording layer.

Alternatively, the second multi-valued information recording apparatus in accordance with the present invention may preferably be modified such that the recording means irradiates an evanescent wave, which has been radiated out from a solid immersion lens, to the recording layer.

As a second information reproducing method, the present invention further provides a multi-valued information reproducing method for reproducing multi-valued information from the second recording medium in accordance with the present invention, on which the multi-valued information has been recorded, wherein the multi-valued information has been recorded on the recording medium by irradiating the recording light having the predetermined wavelength $\lambda 1$, which recording light has an intensity in accordance with the multi-valued information, to the recording layer of the recording medium, the material, which is located at a site having been exposed to the recording light, being thereby caused to change into the fluorescent material, the method comprising the steps of:

i) irradiating the excitation light having the wavelength $\lambda 2$, which falls within an excitation wavelength region for the fluorescent material, to the recording layer, the fluorescent material being thereby caused to produce the fluorescence having an intensity in accordance with the intensity of the recording light, and ii) detecting the fluorescence.

The second multi-valued information reproducing method in accordance with the present invention may be modified such that light having the wavelength $\lambda 2$ identical with the wavelength $\lambda 1$ of the recording light is employed as the excitation light, an intensity of the excitation light having the wavelength $\lambda 2$ is set at an intensity lower than the intensity of the recording light, and the excitation light having the thus set intensity is irradiated to the recording layer.

Alternatively, in the second multi-valued information reproducing method in accordance with the present invention, light having the wavelength $\lambda 2$ different from the wavelength $\lambda 1$ of the recording light may be employed as the excitation light.

Also, the second multi-valued information reproducing method in accordance with the present invention should preferably be modified such that light irradiated to a fine range is employed as the excitation light, the recording layer is scanned with the excitation light, and the fluorescence produced from the recording layer during the scanning with the excitation light is detected with respect to each of positions which are being scanned.

In such cases, an evanescent wave, which has been radiated out from a range of a diameter shorter than the wavelength of the excitation light, should preferably be employed as the excitation light.

Further, the second multi-valued information reproducing method in accordance with the present invention may be modified such that the excitation light is entered into the substrate so as to propagate through repeated total reflection between two surfaces of the substrate, an evanescent wave, which oozes out from the substrate toward the recording layer when the excitation light is thus entered into the substrate, is irradiated to the recording layer, and the fluorescence, which has been produced from the recording layer when the evanescent wave is thus irradiated to the recording layer, is spatially resolved and detected.

Furthermore, in the second multi-valued information reproducing method in accordance with the present invention, in cases where the recording medium is constituted such that the substrate comprises the dielectric material, the metal film is overlaid on one surface of the dielectric material, and the recording layer is overlaid on the metal film, the excitation light should preferably be irradiated from the substrate side to the recording medium such that the excitation light impinges at a specific angle of incidence upon the metal film.

As a second information reproducing apparatus, the present invention still further provides a multi-valued information reproducing apparatus for reproducing multi-valued information from the second recording medium in accordance with the present invention, on which the multi-valued information has been recorded, wherein the multi-valued information has been recorded on the recording medium by irradiating the recording light having the predetermined wavelength $\lambda 1$, which recording light has an intensity in accordance with the multi-valued information, to the recording layer of the recording medium, the material, which is located at a site having been exposed to the recording light, being thereby caused to change into the fluorescent material, the apparatus comprising:

i) excitation means for irradiating the excitation light having the wavelength $\lambda 2$, which falls within an excitation wavelength region for the fluorescent material, to the recording layer in order to cause the fluorescent material to produce the fluorescence having an intensity in accordance with the intensity of the recording light, and ii) read-out means for detecting the fluorescence.

The second multi-valued information reproducing apparatus in accordance with the present invention should preferably be modified such that the excitation means employs light, which has the wavelength $\lambda 2$ identical with the wavelength $\lambda 1$ of the recording light, as the excitation light, the excitation means sets an intensity of the excitation light having the wavelength $\lambda 2$ at an intensity lower than the intensity of the recording light, and the excitation means irradiates the excitation light having the thus set intensity to the recording layer.

Alternatively, the second multi-valued information reproducing apparatus in accordance with the present invention may be modified such that the excitation means irradiates light, which has the wavelength $\lambda 2$ different from the wavelength $\lambda 1$ of the recording light, as the excitation light to the recording layer.

Also, the second multi-valued information reproducing apparatus in accordance with the present invention should preferably be modified such that the excitation means scans the recording layer with converged beam-like excitation light, and the read-out means detects the fluorescence with respect to each of positions which are being scanned with the excitation light.

Further, in the second multi-valued information reproducing apparatus in accordance with the present invention, in cases where the recording medium is constituted such that the substrate comprises the dielectric material, the metal film is overlaid on one surface of the dielectric material, and the recording layer is overlaid on the metal film, the excitation means should preferably irradiate the excitation light to the recording medium such that the excitation light impinges upon the metal film from the substrate side.

Furthermore, the second multi-valued information reproducing apparatus in accordance with the present invention should preferably be modified such that the excitation means scans the recording layer with an evanescent wave, which has been radiated out from a solid immersion lens, and the read-out means detects the fluorescence with respect to each of positions which are being scanned with the evanescent wave.

Also, the second multi-valued information reproducing apparatus in accordance with the present invention should preferably be modified such that the excitation means is provided with a micro-aperture probe, which is provided with a light passage aperture having a diameter shorter than the wavelength of the excitation light, the light passage aperture being formed at one end of the micro-aperture probe, the excitation means scans the recording layer with an evanescent wave, which has been radiated out from the light passage aperture of the micro-aperture probe, and the read-out means detects the fluorescence with respect to each of positions which are being scanned with the evanescent wave.

Further, the second multi-valued information reproducing apparatus in accordance with the present invention should preferably be modified such that the excitation means irradiates the excitation light into the substrate such that the excitation light propagates through repeated total reflection between two surfaces of the substrate, and such that an evanescent wave, which oozes out from the substrate toward the recording layer when the excitation light is thus entered into the substrate, is irradiated to the recording layer, and the read-out means spatially resolves and detects the fluorescence, which has been produced from the recording layer when the evanescent wave is thus irradiated to the recording layer.

Furthermore, the second multi-valued information reproducing apparatus in accordance with the present invention should preferably be constituted such that an optical system, through which the excitation light passes, contains only optical members other than optical members, which have properties such that, when the excitation light having the wavelength $\lambda 2$ is irradiated to the optical members, the optical members are caused to produce fluorescence having a wavelength identical with the wavelength of the fluorescence produced by the fluorescent material.

The present invention also provides a third recording medium, comprising:

i) a substrate, and ii) a recording layer overlaid on the substrate, wherein the recording layer comprises multiple kinds of materials uniformly mixed together, each of which has properties such that, when recording light having a predetermined wavelength $\lambda 1$ is irradiated to the material, the material is capable of being caused to change into a fluorescent material, the multiple kinds of the materials are capable of being caused by the recording light having different wavelengths $\lambda 1$ to change into fluorescent materials, the fluorescent materials, which have been formed by the multiple kinds of the materials, are capable of being caused by excitation light having different wavelengths $\lambda 2$ to produce fluorescence, and the fluorescent materials, which have been formed by the multiple kinds of the materials, produce the fluorescence having different wavelengths $\lambda 3$.

The present invention further provides a fourth recording medium, comprising:

i) a substrate, and ii) a recording layer overlaid on the substrate, wherein the recording layer comprises multiple kinds of materials uniformly mixed together, each of which has properties such that, when recording light having a predetermined wavelength $\lambda 1$ is irradiated to the material, the material is capable of being caused to change into a fluorescent material, the multiple kinds of the materials are capable of being caused by the recording light having different wavelengths $\lambda 1$ to change into fluorescent materials, the fluorescent materials, which have been formed by the multiple kinds of the materials, are capable of being caused by excitation light having an identical wavelength $\lambda 2$ to produce fluorescence, and the fluorescent materials, which have been formed by the multiple kinds of the materials, produce the fluorescence having different wavelengths $\lambda 3$.

The present invention still further provides a fifth recording medium, comprising:

i) a substrate, and ii) a recording layer overlaid on the substrate, wherein the recording layer comprises multiple kinds of materials uniformly mixed together, each of which has properties such that, when recording light having a predetermined wavelength $\lambda 1$ is irradiated to the material, the material is capable of being caused to change into a fluorescent material, the multiple kinds of the materials are capable of being caused by the recording light having different wavelengths $\lambda 1$ to change into fluorescent materials, the fluorescent materials, which have been formed by the multiple kinds of the materials, are capable of being caused by excitation light having different wavelengths $\lambda 2$ to produce fluorescence, and the fluorescent materials, which have been formed by the multiple kinds of the materials, produce the fluorescence having an identical wavelength $\lambda 3$.

In each of the third, fourth, and fifth recording media in accordance with the present invention, by way of example, the recording layer may be constituted of a thin film, which contains the multiple kinds of the materials mixed together.

Also, each of the third, fourth, and fifth recording media in accordance with the present invention should preferably be modified such that the substrate comprises a dielectric material, a metal film is overlaid on one surface of the dielectric material, and the recording layer is overlaid on the metal film. In such cases, the metal film should preferably comprise a metal selected from the group consisting of gold and silver.

Further, in each of the third, fourth, and fifth recording media in accordance with the present invention, the substrate should preferably comprise a material permeable to the excitation light having the wavelengths $\lambda 2$.

The present invention also provides a third information recording method, in which information is recorded on the third, fourth, or fifth recording medium in accordance with the present invention, the method comprising the step of:

irradiating beams of the recording light carrying recording information and having a plurality of different wavelengths, each of which wavelengths is capable of causing one of the multiple kinds of the materials to change into the fluorescent material, to the recording layer of the recording medium, such that the beams of the recording light are capable of impinging upon an identical site on the recording layer, the multiple kinds of the materials, which are located at the site having been exposed to the recording light, being thereby caused to change into the fluorescent materials.

In the third information recording method in accordance with the present invention, an evanescent wave, which has been radiated out from a range of a diameter shorter than the wavelengths of the recording light, should preferably be employed as the recording light.

The present invention further provides an apparatus for carrying out the third information recording method. Specifically, the present invention further provides a third information recording apparatus, in which information is recorded on the third, fourth, or fifth recording medium in accordance with the present invention, the apparatus comprising:

recording means for irradiating beams of the recording light carrying recording information and having a plurality of different wavelengths, each of which wavelengths is capable of causing one of the multiple kinds of the materials to change into the fluorescent material, to the recording layer of the recording medium, such that the beams of the recording light are capable of impinging upon an identical site on the recording layer, in order to cause the multiple kinds of the materials, which are located at the site having been exposed to the recording light, to change into the fluorescent materials.

The third information recording apparatus in accordance with the present invention should preferably be modified such that the recording means is provided with a micro-aperture probe, which is provided with a light passage aperture having a diameter shorter than the wavelengths of the recording light, the light passage aperture being formed at one end of the micro-aperture probe, and the recording means irradiates an evanescent wave, which has been radiated out from the light passage aperture of the micro-aperture probe, to the recording layer.

Alternatively, the third information recording apparatus in accordance with the present invention may preferably be modified such that the recording means irradiates an evanescent wave, which has been radiated out from a solid immersion lens, to the recording layer.

The present invention still further provides a third information reproducing method for reproducing recording information from the third recording medium in accordance with the present invention, on which the recording information has been recorded, wherein the recording information has been recorded on the recording medium by irradiating beams of the recording light carrying recording information and having a plurality of different wavelengths, each of which wavelengths is capable of causing one of the multiple kinds of the materials to change into the fluorescent material, to the recording layer of the recording medium, such that the beams of the recording light are capable of impinging upon an identical site on the recording layer, the multiple kinds of the materials, which are located at the site having been exposed to the recording light, being thereby caused to change into the fluorescent materials, the method comprising the steps of:

i) irradiating the excitation light having a plurality of different wavelengths, each of which wavelengths falls within an excitation wavelength region for one of the fluorescent materials, to the recording layer, the fluorescent materials being thereby caused to produce the fluorescence having different wavelengths, and ii) detecting the fluorescence through wavelength discrimination.

The term "excitation light having a plurality of different wavelengths" does not necessarily mean that the excitation light having a certain wavelength and the excitation light having a different wavelength are employed as independent excitation light. For example, the excitation light may be one kind of white light of a wide wavelength region, which ranges over the excitation wavelength regions for the plurality of the fluorescent materials.

The present invention also provides a fourth information reproducing method for reproducing recording information from the fourth recording medium in accordance with the present invention, on which the recording information has been recorded, wherein the recording information has been recorded on the recording medium by irradiating beams of the recording light carrying recording information and having a plurality of different wavelengths, each of which wavelengths is capable of causing one of the multiple kinds of the materials to change into the fluorescent material, to the recording layer of the recording medium, such that the beams of the recording light are capable of impinging upon an identical site on the recording layer, the multiple kinds of the materials, which are located at the site having been exposed to the recording light, being thereby caused to change into the fluorescent materials, the method comprising the steps of:

i) irradiating one kind of the excitation light having a wavelength, which falls within an excitation wavelength region common to the fluorescent materials, to the recording layer, the fluorescent materials being thereby caused to produce the fluorescence having different wavelengths, and ii) detecting the fluorescence through wavelength discrimination.

The present invention further provides a fifth information reproducing method for reproducing recording information from the fifth recording medium in accordance with the present invention, on which the recording information has been recorded, wherein the recording information has been recorded on the recording medium by irradiating beams of the recording light carrying recording information and having a plurality of different wavelengths, each of which wavelengths is capable of causing one of the multiple kinds of the materials to change into the fluorescent material, to the recording layer of the recording medium, such that the beams of the recording light are capable of impinging upon an identical site on the recording layer, the multiple kinds of the materials, which are located at the site having been exposed to the recording light, being thereby caused to change into the fluorescent materials, the method comprising the steps of:

i) irradiating the excitation light having a plurality of different wavelengths, each of which wavelengths falls within an excitation wavelength region for one of the fluorescent materials, with different timings to the recording layer, the fluorescent materials being thereby caused to produce the fluorescence having the identical wavelength, and ii) detecting the fluorescence.

The third, fourth, and fifth information reproducing methods in accordance with the present invention may be modified such that light having the wavelengths identical with the wavelengths of the recording light is employed as the excitation light, an intensity of the excitation light having the wavelengths is set at an intensity lower than the intensity of the recording light, and the excitation light having the thus set intensity is irradiated to the recording layer.

Alternatively, in the third, fourth, and fifth information reproducing methods in accordance with the present invention, light having the wavelengths different from the wavelengths of the recording light may be employed as the excitation light.

Also, the third, fourth, and fifth information reproducing methods in accordance with the present invention should preferably be modified such that light irradiated to a fine range is employed as the excitation light, the recording layer is scanned with the excitation light, and the fluorescence produced from the recording layer during the scanning with the excitation light is detected with respect to each of positions which are being scanned.

In such cases, an evanescent wave, which has been radiated out from a range of a diameter shorter than the wavelength of the excitation light, should preferably be employed as the excitation light.

Further, the third, fourth, and fifth information reproducing methods in accordance with the present invention may be modified such that the excitation light is entered into the substrate so as to propagate through repeated total reflection between two surfaces of the substrate, an evanescent wave, which oozes out from the substrate toward the recording layer when the excitation light is thus entered into the substrate, is irradiated to the recording layer, and the fluorescence, which has been produced from the recording layer when the evanescent wave is thus irradiated to the recording layer, is spatially resolved and detected.

Furthermore, in the third, fourth, and fifth information reproducing methods in accordance with the present invention, in cases where the recording medium is constituted such that the substrate comprises the dielectric material, the metal film is overlaid on one surface of the dielectric material, and the recording layer is overlaid on the metal film, the excitation light should preferably be irradiated from the substrate side to the recording medium such that the excitation light impinges at a specific angle of incidence upon the metal film.

The present invention still further provides a third information reproducing apparatus for reproducing recording information from the third recording medium in accordance with the present invention, on which the recording information has been recorded, wherein the recording information has been recorded on the recording medium by irradiating beams of the recording light carrying recording information and having a plurality of different wavelengths, each of which wavelengths is capable of causing one of the multiple kinds of the materials to change into the fluorescent material, to the recording layer of the recording medium, such that the beams of the recording light are capable of impinging upon an identical site on the recording layer, the multiple kinds of the materials, which are located at the site having been exposed to the recording light, being thereby caused to change into the fluorescent materials, the apparatus comprising:

i) excitation means for irradiating the excitation light having a plurality of different wavelengths, each of which wavelengths falls within an excitation wavelength region for one of the fluorescent materials, to the recording layer in order to cause the fluorescent materials to produce the fluorescence having different wavelengths, and ii) read-out means for detecting the fluorescence through wavelength discrimination.

The present invention also provides a fourth information reproducing apparatus for reproducing recording information from the fourth recording medium in accordance with the present invention, on which the recording information has been recorded, wherein the recording information has been recorded on the recording medium by irradiating beams of the recording light carrying recording information and having a plurality of different wavelengths, each of which wavelengths is capable of causing one of the multiple kinds of the materials to change into the fluorescent material, to the recording layer of the recording medium, such that the beams of the recording light are capable of impinging upon an identical site on the recording layer, the multiple kinds of the materials, which are located at the site having been exposed to the recording light, being thereby caused to change into the fluorescent materials, the apparatus comprising:

i) excitation means for irradiating one kind of the excitation light having a wavelength, which falls within an excitation wavelength region common to the fluorescent materials, to the recording layer in order to cause the fluorescent materials to produce the fluorescence having different wavelengths, and ii) read-out means for detecting the fluorescence through wavelength discrimination.

The present invention further provides a fifth information reproducing apparatus for reproducing recording information from the fifth recording medium in accordance with the present invention, on which the recording information has been recorded, wherein the recording information has been recorded on the recording medium by irradiating beams of the recording light carrying recording information and having a plurality of different wavelengths, each of which wavelengths is capable of causing one of the multiple kinds of the materials to change into the fluorescent material, to the recording layer of the recording medium, such that the beams of the recording light are capable of impinging upon an identical site on the recording layer, the multiple kinds of the materials, which are located at the site having been exposed to the recording light, being thereby caused to change into the fluorescent materials, the apparatus comprising:

i) excitation means for irradiating the excitation light having a plurality of different wavelengths, each of which wavelengths falls within an excitation wavelength region for one of the fluorescent materials, with different timings to the recording layer in order to cause the fluorescent materials to produce the fluorescence having the identical wavelength, and ii) read-out means for detecting the fluorescence.

The third, fourth, and fifth information reproducing apparatuses in accordance with the present invention should preferably be modified such that the excitation means scans the recording layer with converged beam-like excitation light, and the read-out means detects the fluorescence with respect to each of positions which are being scanned with the excitation light.

Also, in the third, fourth, and fifth information reproducing apparatuses in accordance with the present invention, in cases where the recording medium is constituted such that the substrate comprises the dielectric material, the metal film is overlaid on one surface of the dielectric material, and the recording layer is overlaid on the metal film, the excitation means should preferably irradiate the excitation light to the recording medium such that the excitation light impinges upon the metal film from the substrate side.

Further, the third, fourth, and fifth information reproducing apparatuses in accordance with the present invention should preferably be modified such that the excitation means scans the recording layer with an evanescent wave, which has been radiated out from a solid immersion lens, and the read-out means detects the fluorescence with respect to each of positions which are being scanned with the evanescent wave.

Furthermore, the third, fourth, and fifth information reproducing apparatuses in accordance with the present invention should preferably be modified such that the excitation means is provided with a micro-aperture probe, which is provided with a light passage aperture having a diameter shorter than the wavelengths of the excitation light, the light passage aperture being formed at one end of the micro-aperture probe, the excitation means scans the recording layer with an evanescent wave, which has been radiated out from the light passage aperture of the micro-aperture probe, and the read-out means detects the fluorescence with respect to each of positions which are being scanned with the evanescent wave.

Also, the third, fourth, and fifth information reproducing apparatuses in accordance with the present invention should preferably be modified such that the excitation means irradiates the excitation light into the substrate such that the excitation light propagates through repeated total reflection between two surfaces of the substrate, and such that an evanescent wave, which oozes out from the substrate toward the recording layer when the excitation light is thus entered into the substrate, is irradiated to the recording layer, and the read-out means spatially resolves and detects the fluorescence, which has been produced from the recording layer when the evanescent wave is thus irradiated to the recording layer.

With the first recording medium in accordance with the present invention, the recording layer comprises the material, which has the properties such that, when the recording light having the predetermined wavelength $\lambda 1$ is irradiated to the material, the material is capable of being caused to change into the fluorescent material and such that, when the excitation light having the wavelength $\lambda 2$ is then irradiated to the thus formed fluorescent material, the fluorescent material is capable of being caused to produce the fluorescence. Therefore, with the first information recording method in accordance with the present invention, the recording light having the predetermined wavelength $\lambda 1$, which recording light carries the recording information, may be irradiated to the recording layer of the recording medium, and the material, which is located at a site having been exposed to the recording light, may thereby be caused to change into the fluorescent material. The site, at which the material has been caused to change into the fluorescent material, may be utilized as, for example, one pit. In this manner, information, such as image information or computer data, is capable of being recorded on the first recording medium in accordance with the present invention.

Also, with the first recording medium in accordance with the present invention, wherein the recording layer comprises the material having the properties described above, in cases where the excitation light is irradiated to the recording layer when the recording information is to be reproduced from the recording medium, basically, the fluorescence is not produced from the site on the recording layer, which site has not been exposed to the recording light, and the fluorescence is produced from only the site on the recording layer, which site has been exposed to the recording light. Specifically, when the recording information is reproduced from the recording medium, the fluorescence, which will act as the background, is not produced from the site on the recording medium, which site has not been exposed to the recording light. Accordingly, a reproduced signal having a high signal-to-noise ratio is capable of being obtained.

With the first recording medium in accordance with the present invention, the substrate for supporting the recording layer may be constituted of the material other than materials, which have properties such that, when the excitation light having the wavelength $\lambda 2$ is irradiated to the materials, the materials are caused to produce fluorescence having a wavelength identical with the wavelength of the fluorescence produced by the fluorescent material. In such cases, when the excitation light is irradiated to the recording layer in order for the recording information to be reproduced from the recording medium, uniform fluorescence, which will act as the background, is not produced from the substrate. Therefore, a reproduced signal having a signal-to-noise ratio enhanced even further is capable of being obtained.

Further, the first recording medium in accordance with the present invention has a simple constitution, wherein the material capable of changing into the fluorescent material when being exposed to the light is overlaid on the substrate. Therefore, the first recording medium in accordance with the present invention is capable of being produced with a simple production process and with a high productivity.

With the first information recording method in accordance with the present invention, wherein the evanescent wave, which has been radiated out from a range of a diameter shorter than the wavelength of the recording light, is employed as the recording light having the wavelength $\lambda 1$, a pit having a size smaller than the light wavelength is capable of being formed without being limited by the limit of diffraction. Therefore, the recording information is capable of being recorded at a high density.

In cases where the evanescent wave is to be utilized in the manner described above, the recording means constituted in the manner described below may be utilized. Specifically, the recording means may be provided with the micro-aperture probe, which is provided with the light passage aperture having a diameter shorter than the wavelength $\lambda 1$ of the recording light, the light passage aperture being formed at one end of the micro-aperture probe, and the recording means may be constituted to irradiate the evanescent wave, which has been radiated out from the light passage aperture of the micro-aperture probe, to the recording layer. Alternatively, the recording means may be constituted to irradiate the evanescent wave, which has been radiated out from the solid immersion lens, to the recording layer.

With the first information reproducing method in accordance with the present invention, the excitation light having the wavelength $\lambda 2$, which falls within the excitation wavelength region for the fluorescent material and which is different from the wavelength $\lambda 1$ of the recording light, may be irradiated to the recording layer, on which the recording information has been recorded in the manner described above. In such cases, the fluorescence is produced from the site on the recording layer, at which the material constituting the recording layer has been changed into the fluorescent material, and no fluorescence is produced from the site on the recording layer, at which the material constituting the recording layer has not been changed into the fluorescent material. Therefore, for example, in cases where the recording medium is scanned with the excitation light, and the fluorescence produced from the recording medium is detected with respect to each of the positions which are being scanned, the recording information is capable of being read out in accordance with the presence or absence of the fluorescence.

Also, with the first information reproducing method in accordance with the present invention, the light having the wavelength $\lambda 2$ identical with the wavelength $\lambda 1$ of the recording light may be employed as the excitation light, and the intensity of the excitation light having the wavelength $\lambda 2$ may be set at an intensity lower than the intensity of the recording light, such that the material constituting the recording layer may not be markedly caused by the excitation light to change into the fluorescent material. In such cases, the recording information is capable of being read out appropriately.

Further, with the first information reproducing method in accordance with the present invention, instead of the recording medium being scanned with the excitation light, the excitation light may be entered into the substrate of the recording medium so as to propagate through repeated total reflection between the two surfaces of the substrate, and the evanescent wave, which oozes out from the substrate toward the recording layer when the excitation light is thus entered into the substrate, may be irradiated to the recording layer. Also, the fluorescence, which has been produced from the recording layer when the evanescent wave is thus irradiated to the recording layer, may be spatially resolved and detected. In this manner, the recording information is capable of being read out.

Furthermore, with the first information reproducing method in accordance with the present invention, wherein the evanescent wave, which has been radiated out from a range of a diameter shorter than the wavelength of the excitation light by use of the aforesaid micro-aperture probe, or the like, is employed as the excitation light, the excitation light is capable of being irradiated only to a range of a size smaller than the light wavelength without being limited by the limit of diffraction. Therefore, the recording information, which has been recorded at the pit of the small size and at a high density, is capable of being reproduced accurately.

With the first information reproducing method in accordance with the present invention, the recording information may be reproduced from the recording medium, which is constituted such that the substrate comprises the dielectric material, the metal film is overlaid on one surface of the dielectric material, and the recording layer is overlaid on the metal film. In such cases, the excitation light may be irradiated from the substrate side to the recording medium such that the excitation light impinges at a specific angle of incidence upon the metal film. As a result, surface plasmon resonance is excited at the metal film, and a plasma wave (a light wave) oozes out toward the recording layer. Therefore, the recording layer is capable of being excited by the plasma wave.

Also, with the first information reproducing method in accordance with the present invention, the excitation light may be entered into the substrate of the recording medium so as to propagate through repeated total reflection between the two surfaces of the substrate, and the evanescent wave, which oozes out from the substrate toward the recording layer when the excitation light is thus entered into the substrate, may be irradiated to the recording layer. In such cases, the evanescent wave acting as the excitation light oozes out toward the recording layer over a wide range of the recording layer. Specifically, in such cases, the evanescent wave cannot be irradiated to only the range of the size smaller than the light wavelength. However, in such cases, the fluorescence, which has been produced from the recording layer when the evanescent wave is thus irradiated to the recording layer, may be spatially resolved and detected. In this manner, the fluorescence, which is produced from the small pits described above, is capable of being detected with respect to each of the small pits.

Further, with the first information reproducing method in accordance with the present invention, wherein the excitation light is entered into the substrate of the recording medium in the manner described above, the excitation light oozes out as the evanescent wave toward the recording layer. Therefore, the problems do not occur in that strong excitation light enters into the means for detecting the fluorescence. Accordingly, in such cases, the problems do not occur in that the fluorescence detecting means detects the excitation light, which constitutes much noise components. As a result, a reproduced signal having a high signal-to-noise ratio is capable of being obtained.

With the second recording medium in accordance with the present invention, the recording layer comprises the material, which has the properties such that, when the recording light having the predetermined wavelength $\lambda 1$ is irradiated to the material, the material is capable of being caused to change into the fluorescent material and such that, when the excitation light having the wavelength $\lambda 2$ is then irradiated to the thus formed fluorescent material, the fluorescent material is capable of being caused to produce the fluorescence having an intensity in accordance with the intensity of the recording light. Therefore, with the second multi-valued information recording method in accordance with the present invention, the recording light having the predetermined wavelength $\lambda 1$, which recording light carries the recording information, may be irradiated to the recording layer of the recording medium, and the material, which is located at a site having been exposed to the recording light, may thereby be caused to change into the fluorescent material. The site, at which the material has been caused to change into the fluorescent material, may be utilized as, for example, one pit. In this manner, information, such as image information or computer data, is capable of being recorded on the second recording medium in accordance with the present invention.

Also, with the second recording medium in accordance with the present invention, when the excitation light is irradiated to the recording layer, the recording layer produces the fluorescence having an intensity in accordance with the intensity of the recording light. Therefore, in cases where the intensity of the recording light is altered in accordance with the multi-valued information, the multi-valued information having been recorded on the recording layer is capable of being reproduced in accordance with the detected intensity of the fluorescence.

Further, with the second recording medium in accordance with the present invention, wherein the recording layer comprises the material having the properties described above, in cases where the excitation light is irradiated to the recording layer when the multi-valued information is to be reproduced from the recording medium, basically, the fluorescence is not produced from the site on the recording layer, which site has not been exposed to the recording light, and the fluorescence is produced from only the site on the recording layer, which site has been exposed to the recording light. Specifically, when the multi-valued information is reproduced from the recording medium, the fluorescence, which will act as the background, is not produced from the site on the recording medium, which site has not been exposed to the recording light. Accordingly, a reproduced signal having a high signal-to-noise ratio is capable of being obtained.

With the second recording medium in accordance with the present invention, the substrate for supporting the recording layer may be constituted of the material other than materials, which have properties such that, when the excitation light having the wavelength $\lambda 2$ is irradiated to the materials, the materials are caused to produce fluorescence having a wavelength identical with the wavelength of the fluorescence produced by the fluorescent material. In such cases, when the excitation light is irradiated to the recording layer in order for the multi-valued information to be reproduced from the recording medium, uniform fluorescence, which will act as the background, is not produced from the substrate. Therefore, a reproduced signal having a signal-to-noise ratio enhanced even further is capable of being obtained.

Further, the second recording medium in accordance with the present invention has a simple constitution, wherein the material capable of changing into the fluorescent material when being exposed to the light is overlaid on the substrate. Therefore, the second recording medium in accordance with the present invention is capable of being produced with a simple production process and with a high productivity.

With the second multi-valued information recording method in accordance with the present invention, wherein the evanescent wave, which has been radiated out from a range of a diameter shorter than the wavelength of the recording light, is employed as the recording light having the wavelength $\lambda 1$, a pit having a size smaller than the light wavelength is capable of being formed without being limited by the limit of diffraction. Therefore, the multi-valued information is capable of being recorded at a high density.

In cases where the evanescent wave is to be utilized in the manner described above, the recording means constituted in the manner described below may be utilized. Specifically, the recording means may be provided with the micro-aperture probe, which is provided with the light passage aperture having a diameter shorter than the wavelength $\lambda 1$ of the recording light, the light passage aperture being formed at one end of the micro-aperture probe, and the recording means may be constituted to irradiate the evanescent wave, which has been radiated out from the light passage aperture of the micro-aperture probe, to the recording layer. Alternatively, the recording means may be constituted to irradiate the evanescent wave, which has been radiated out from the solid immersion lens, to the recording layer.

With the second multi-valued information reproducing method in accordance with the present invention, the excitation light having the wavelength $\lambda 2$, which falls within the excitation wavelength region for the fluorescent material and which is different from the wavelength $\lambda 1$ of the recording light, may be irradiated to the recording layer, on which the multi-valued information has been recorded in the manner described above. In such cases, the fluorescence is produced from the site on the recording layer, at which the material constituting the recording layer has been changed into the fluorescent material, and no fluorescence is produced from the site on the recording layer, at which the material constituting the recording layer has not been changed into the fluorescent material. Therefore, for example, in cases where the recording medium is scanned with the excitation light, and the fluorescence produced from the recording medium is detected with respect to each of the positions which are being scanned, the multi-valued information is capable of being read out in accordance with the presence or absence of the fluorescence.

Also, with the second multi-valued information reproducing method in accordance with the present invention, the light having the wavelength $\lambda 2$ identical with the wavelength $\lambda 1$ of the recording light may be employed as the excitation light, and the intensity of the excitation light having the wavelength $\lambda 2$ may be set at an intensity lower than the intensity of the recording light, such that the material constituting the recording layer may not be markedly caused by the excitation light to change into the fluorescent material. In such cases, the multi-valued information is capable of being read out appropriately.

Further, with the second multi-valued information reproducing method in accordance with the present invention, instead of the recording medium being scanned with the excitation light, the excitation light may be entered into the substrate of the recording medium so as to propagate through repeated total reflection between the two surfaces of the substrate, and the evanescent wave, which oozes out from the substrate toward the recording layer when the excitation light is thus entered into the substrate, may be irradiated to the recording layer. Also, the fluorescence, which has been produced from the recording layer when the evanescent wave is thus irradiated to the recording layer, may be spatially resolved and detected. In this manner, the multi-valued information is capable of being read out.

Furthermore, with the second multi-valued information reproducing method in accordance with the present invention, wherein the evanescent wave, which has been radiated out from a range of a diameter shorter than the wavelength of the excitation light by use of the aforesaid micro-aperture probe, or the like, is employed as the excitation light, the excitation light is capable of being irradiated only to a range of a size smaller than the light wavelength without being limited by the limit of diffraction. Therefore, the multi-valued information, which has been recorded at the pit of the small size and at a high density, is capable of being reproduced accurately.

With the second multi-valued information reproducing method in accordance with the present invention, the multi-valued information may be reproduced from the recording medium, which is constituted such that the substrate comprises the dielectric material, the metal film is overlaid on one surface of the dielectric material, and the recording layer is overlaid on the metal film. In such cases, the excitation light may be irradiated from the substrate side to the recording medium such that the excitation light impinges at a specific angle of incidence upon the metal film. As a result, surface plasmon resonance is excited at the metal film, and a plasma wave (a light wave) oozes out toward the recording layer. Therefore, the recording layer is capable of being excited by the plasma wave.

Also, with the second multi-valued information reproducing method in accordance with the present invention, the excitation light may be entered into the substrate of the recording medium so as to propagate through repeated total reflection between the two surfaces of the substrate, and the evanescent wave, which oozes out from the substrate toward the recording layer when the excitation light is thus entered into the substrate, may be irradiated to the recording layer. In such cases, the evanescent wave acting as the excitation light oozes out toward the recording layer over a wide range of the recording layer. Specifically, in such cases, the evanescent wave cannot be irradiated to only the range of the size smaller than the light wavelength. However, in such cases, the fluorescence, which has been produced from the recording layer when the evanescent wave is thus irradiated to the recording layer, may be spatially resolved and detected. In this manner, the fluorescence, which is produced from the small pits described above, is capable of being detected with respect to each of the small pits.

Further, with the second multi-valued information reproducing method in accordance with the present invention, wherein the excitation light is entered into the substrate of the recording medium in the manner described above, the excitation light oozes out as the evanescent wave toward the recording layer. Therefore, the problems do not occur in that strong excitation light enters into the means for detecting the fluorescence. Accordingly, in such cases, the problems do not occur in that the fluorescence detecting means detects the excitation light, which constitutes much noise components. As a result, a reproduced signal having a high signal-to-noise ratio is capable of being obtained.

With each of the third, fourth, and fifth recording media in accordance with the present invention, the recording layer comprises the materials, which have the properties such that, when the recording light having the predetermined wavelengths is irradiated to the materials, the materials are capable of being caused to change into the fluorescent materials. Therefore, with the third information recording method in accordance with the present invention, the recording light carrying the recording information may be irradiated to the recording layer of the recording medium, and the materials, which are located at a site having been exposed to the recording light, may thereby be caused to change into the fluorescent materials. The site, at which the materials have been caused to change into the fluorescent materials, may be utilized as, for example, one pit. In this manner, information, such as image information or computer data, is capable of being recorded on each of the third, fourth, and fifth recording media in accordance with the present invention.

Also, with the third information recording method in accordance with the present invention, wherein the evanescent wave, which has been radiated out from a range of a diameter shorter than the wavelengths of the recording light, is employed as the recording light, a pit having a size smaller than the light wavelengths is capable of being formed without being limited by the limit of diffraction. Therefore, the recording information is capable of being recorded at a high density.

In cases where the evanescent wave is to be utilized in the manner described above, the recording means constituted in the manner described below may be utilized. Specifically, the recording means may be provided with the micro-aperture probe, which is provided with the light passage aperture having a diameter shorter than the wavelengths of the recording light, the light passage aperture being formed at one end of the micro-aperture probe, and the recording means may be constituted to irradiate the evanescent wave, which has been radiated out from the light passage aperture of the micro-aperture probe, to the recording layer.

Further, with each of the third, fourth, and fifth recording media in accordance with the present invention, the recording layer comprises the multiple kinds of the materials uniformly mixed together, which materials are capable of being caused by the recording light having different wavelengths to change into the fluorescent materials. Therefore, with the third information recording method in accordance with the present invention, beams of the recording light having a plurality of different wavelengths, each of which wavelengths is capable of causing one of the multiple kinds of the materials to change into the fluorescent material, may be irradiated to the recording layer of the recording medium, such that the beams of the recording light are capable of impinging upon an identical site on the recording layer. In this manner, at the identical site on the recording layer, the multiple kinds of the materials are capable of being independently caused to change into the fluorescent materials, and the multiple recording is capable of being thereby performed. With the third, fourth, and fifth recording media in accordance with the present invention, which enables the multiple recording, the recording information is capable of being recorded at a high density.

Furthermore, each of the third, fourth, and fifth recording media in accordance with the present invention has a simple constitution, wherein the materials, such as compounds, are carried in the layer form on the substrate. Therefore, each of the third, fourth, and fifth recording media in accordance with the present invention is capable of being produced with a simple production process and with a high productivity.

With each of the third, fourth, and fifth information reproducing methods in accordance with the present invention, the excitation light having the wavelengths, which fall within the excitation wavelength regions for the fluorescent materials, may be irradiated to the recording layer, on which the recording information has been recorded in the manner described above. In such cases, the fluorescence is produced from the site on the recording layer, at which the materials constituting the recording layer have been changed into the fluorescent materials, and no fluorescence is produced from the site on the recording layer, at which the materials constituting the recording layer have not been changed into the fluorescent materials. Therefore, for example, in cases where the recording medium is scanned with the excitation light, and the fluorescence produced from the recording medium is detected with respect to each of the positions which are being scanned, the recording information is capable of being read out in accordance with the presence or absence of the fluorescence.

Also, with each of the third, fourth, and fifth information reproducing methods in accordance with the present invention, instead of the recording medium being scanned with the excitation light, the excitation light may be entered into the substrate of the recording medium so as to propagate through repeated total reflection between the two surfaces of the substrate, and the evanescent wave, which oozes out from the substrate toward the recording layer when the excitation light is thus entered into the substrate, may be irradiated to the recording layer. Also, the fluorescence, which has been produced from the recording layer when the evanescent wave is thus irradiated to the recording layer, may be spatially resolved and detected. In this manner, the recording information is capable of being read out.

With the third information reproducing method in accordance with the present invention, the excitation light having the plurality of the different wavelengths, each of which wavelengths falls within the excitation wavelength region for one of the fluorescent materials, is irradiated to the recording layer, the fluorescent materials being thereby caused to produce the fluorescence having different wavelengths, and the fluorescence is detected through wavelength discrimination. Therefore, the recording information is capable of being read out independently with respect to each of the multiple kinds of the materials. In this manner, the information having been recorded with the multiple recording is capable of being reproduced accurately.

With the fourth information reproducing method in accordance with the present invention, one kind of the excitation light having the wavelength, which falls within the excitation wavelength region common to the fluorescent materials, is irradiated to the recording layer, the fluorescent materials being thereby caused to produce the fluorescence having different wavelengths, and the fluorescence is detected through wavelength discrimination. Therefore, the recording information is capable of being read out independently with respect to each of the multiple kinds of the materials. In this manner, the information having been recorded with the multiple recording is capable of being reproduced accurately.

With the fifth information reproducing method in accordance with the present invention, the excitation light having the plurality of the different wavelengths, each of which wavelengths falls within the excitation wavelength region for one of the fluorescent materials, with different timings to the recording layer, the fluorescent materials being thereby caused to produce the fluorescence having the identical wavelength, and the fluorescence is detected. Therefore, even if the fluorescence produced by the fluorescent materials has the identical wavelength, the fluorescence is capable of being detected with different timings and independently with respect to each of the multiple kinds of the materials. Accordingly, the information having been recorded with the multiple recording is capable of being reproduced accurately.

Further, with each of the third, fourth, and fifth information reproducing methods in accordance with the present invention, wherein the evanescent wave, which has been radiated out from a range of a diameter shorter than the wavelengths of the excitation light by use of the aforesaid micro-aperture probe, or the like, is employed as the excitation light, the excitation light is capable of being irradiated only to a range of a size smaller than the light wavelengths without being limited by the limit of diffraction. Therefore, the recording information, which has been recorded at the pit of the small size and at a high density, is capable of being reproduced accurately.

With each of the third, fourth, and fifth information reproducing methods in accordance with the present invention, the recording information may be reproduced from the recording medium, which is constituted such that the substrate comprises the dielectric material, the metal film is overlaid on one surface of the dielectric material, and the recording layer is overlaid on the metal film. In such cases, the excitation light may be irradiated from the substrate side to the recording medium such that the excitation light impinges at a specific angle of incidence upon the metal film. As a result, surface plasmon resonance is excited at the metal film, and a plasma wave (a light wave) oozes out toward the recording layer. Therefore, the recording layer is capable of being excited by the plasma wave.

Also, with each of the third, fourth, and fifth information reproducing methods in accordance with the present invention, the excitation light may be entered into the substrate of the recording medium so as to propagate through repeated total reflection between the two surfaces of the substrate, and the evanescent wave, which oozes out from the substrate toward the recording layer when the excitation light is thus entered into the substrate, may be irradiated to the recording layer. In such cases, the evanescent wave acting as the excitation light oozes out toward the recording layer over a wide range of the recording layer. Specifically, in such cases, the evanescent wave cannot be irradiated to only the range of the size smaller than the light wavelength. However, in such cases, the fluorescence, which has been produced from the recording layer when the evanescent wave is thus irradiated to the recording layer, may be spatially resolved and detected. In this manner, the fluorescence, which is produced from the small pits described above, is capable of being detected with respect to each of the small pits.

Further, with each of the third, fourth, and fifth information reproducing methods in accordance with the present invention, wherein the excitation light is entered into the substrate of the recording medium in the manner described above, the excitation light oozes out as the evanescent wave toward the recording layer. Therefore, the problems do not occur in that strong excitation light enters into the means for detecting the fluorescence. Accordingly, in such cases, the problems do not occur in that the fluorescence detecting means detects the excitation light, which constitutes much noise components. As a result, a reproduced signal having a high signal-to-noise ratio is capable of being obtained.

BRIEF DESCRIPTION OF THE DRAWINGS

FIG. 3 is a side view showing a second embodiment of the information recording and reproducing apparatus in accordance with the present invention, FIG. 6 is a side view showing a fourth embodiment of the information recording and reproducing apparatus in accordance with the present invention.

DESCRIPTION OF THE PREFERRED EMBODIMENTS

Figure 1:
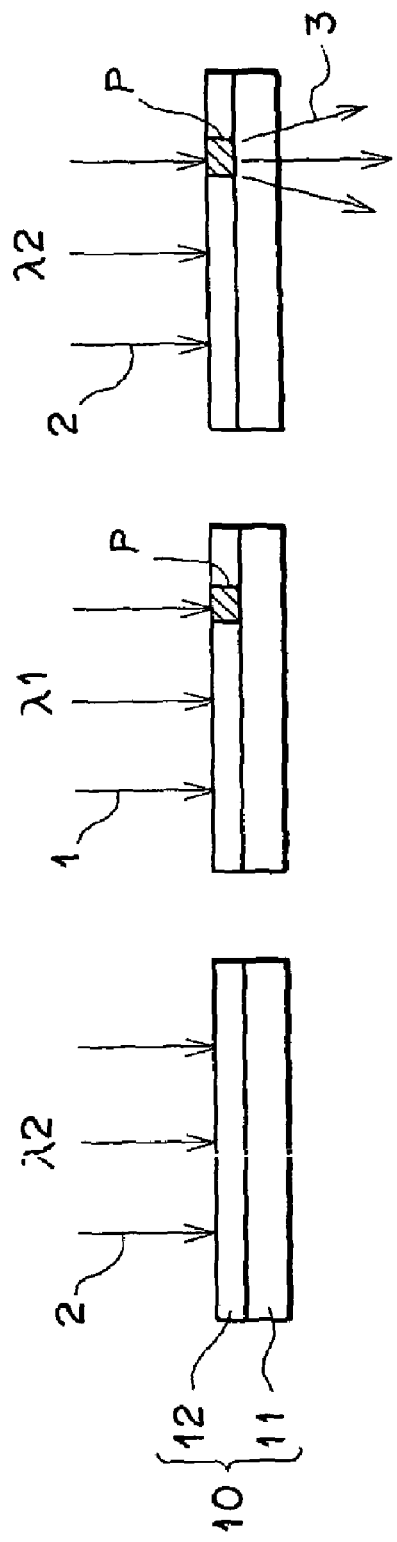
FIGS. 1A, 1B, and 1C are schematic side views showing an embodiment of the recording medium in accordance with the present invention.

The present invention will hereinbelow be described in further detail with reference to the accompanying drawings.

In the first, second, third, fourth, and fifth recording media in accordance with the present invention, the recording layer comprises the material, which has the properties such that, when the recording light having the predetermined wavelength $\lambda 1$ is irradiated to the material, the material is capable of being caused to change into the fluorescent material and such that, when the excitation light having the wavelength $\lambda 2$ is then irradiated to the material, the material is capable of being caused to produce the fluorescence. As the material constituting the recording layer of each of the first, second, third, fourth, and fifth recording media in accordance with the present invention, the following may be employed appropriately:

(1) A compound, which alone has the properties described above.

(2) A material, which comprises a combination of a plurality of compounds and which exhibits the properties described above when the plurality of the compounds are combined with one another.

By way of example, the compound, which alone has the properties described above, may be a compound, in which a certain functional group of a compound [FL] capable of producing the fluorescence has been protected with a protecting group [PR]-, and the production of the fluorescence is thereby restricted. The compound is represented by Formula (I) shown below. In the cases of the compound represented by Formula (I), the wavelength $\lambda 1$ of the recording light causing the compound to change into the fluorescent material, the wavelength $\lambda 2$ of the excitation light, and the wavelength $\lambda 3$ of the produced fluorescence are different from one another.

$$[FL]–[PR] \quad (I)$$

wherein [FL] represents the compound residue capable of producing the fluorescence, and [PR] represents the group capable of being separated from [FL] when light is irradiated to [FL].

Examples of the compounds represented by Formula (I) include the following:

(I-1)

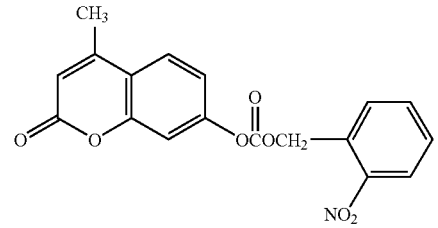
(I-2)

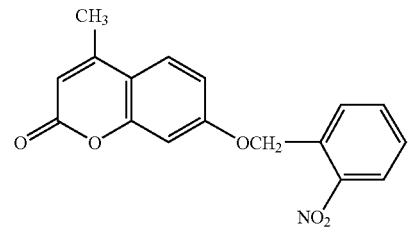
(I-3)

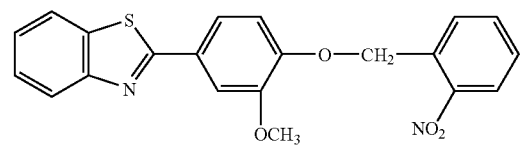
(I-4)

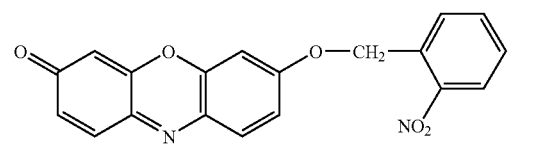
(I-5)

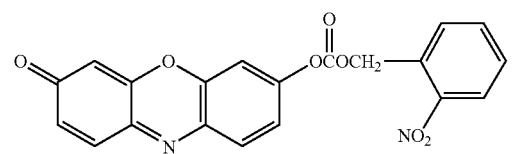

By way of example, the material, which comprises a combination of a plurality of compounds and which exhibits the properties described above when the plurality of the compounds are combined with one another, may be a material, which comprises a combination of a chemical species [FL] capable of producing the fluorescence and a chemical species [Q] capable of quenching the fluorescence. The material is represented by Formula (II) shown below. In the cases of the compound represented by Formula (II), the wavelength λ1 of the recording light causing the compound to change into the fluorescent material and the wavelength λ2 of the excitation light are identical with each other and different from the wavelength λ3 of the produced fluorescence.

[FL]+[Q]  (II)

wherein [FL] represents the chemical species capable of producing the fluorescence, and [Q] represents the chemical species capable of quenching the fluorescence.

The chemical species [FL] in the compound represented by Formula (II) should preferably be the compound represented by Formula (II-1) shown below. The chemical species [Q] in the compound represented by Formula (II) should preferably be the compound represented by Formula (II-2) shown later.

Specifically, examples of the substituents include a halogen atom or a substituent formed by combining a carbon atom, an oxygen atom, a nitrogen atom and a sulfur atom, and specifically, an alkyl group, an alkenyl group, an aralkyl group, an aryl group, a heterocyclic group, a halogen atom, a cyano group, a nitro group, a mercapto group, a hydroxyl group, an alkoxy group, an aryloxy group, an alkylthio group, an arylthio group, an acyloxy group, an amino group, an alkylamino group, an amido group, a sulfoneamido group, a sulfamoylamino group, an alkoxycarbonylamino group, an alkoxysulfonylamino group, an ureido group, a thioureido group, an acyl group, an alkoxycarbonyl group, a carbamoyl group, an alkylsulfonyl or arylsulfonyl group, an alkylsulfinyl group, a sulfamoyl group, a carboxyl group (including a salt), and a sulfo group (including a salt). The above-enumerated substituents may further be substituted with the substituents.

Examples of the substituents will hereinbelow be described in more detail.

The alkyl group may be a straight-chain, branched, or cyclic alkyl group having 1 to 18 carbon atoms (preferably

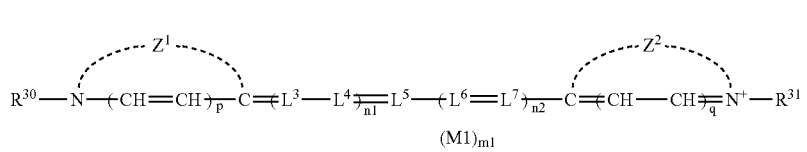

(II-1)

wherein $Z^1$ and $Z^2$ each represent an atom group necessary for forming a five-membered or six-membered, nitrogen-containing heterocyclic ring; $R^{30}$ and $R^{31}$ each independently represent an alkyl group or an aryl group; $L^3$, $L^4$, $L^5$, $L^6$, and $L^7$ each independently represent a substituted or unsubstituted methine group, provided that, in cases where $L^3$ to $L^7$ are substituted by substituents, the substituents may be connected with one another to form a ring; p and q each independently represent 0 or 1; n1 and n2 each independently represent 0, 1, or 2; M1 represents a charge balancing counter ion; and m1 represents a number necessary for keeping charge balance.

The symmetric or asymmetric cyanine dye represented by Formula (II-1) will be described hereinbelow. Examples of the nucleuses formed with $Z^1$ and $Z^2$ in Formula (II-1) include a 3,3-dialkylindolenine nucleus, a 3,3-dialkylbenzoindolenine nucleus, a thiazole nucleus, a benzothiazole nucleus, a naphthothiazolenucleus, a thiazoline nucleus, an oxazole nucleus, a benzoxazole nucleus, a naphthoxazole nucleus, an oxazoline nucleus, a selenazole nucleus, a benzoselenazole nucleus, a naphthoselenazole nucleus, a selenazoline nucleus, a tellurazole nucleus, a benzotellurazole nucleus, a naphthotellurazole nucleus, a tellurazoline nucleus, an imidazole nucleus, a benzoimidazole nucleus, a naphthoimidazole nucleus, a pyridine nucleus, a quinoline nucleus, an isoquinoline nucleus, an imidazo [4,5-b] quinoxaline nucleus, an oxadiazole nucleus, a thiadiazole nucleus, a tetrazole nucleus, and a pyrimidine nucleus.

If possible, the five-membered or six-membered nitrogen-containing heterocyclic rings enumerated above may have a substituent. Examples of the substituents include those exemplified later as the substituents $R^1$, $R^2$, and $R^3$ described with respect to Formula (II-2), which will be shown later.

1 to 8 carbon atoms), which group may optionally have a substituent. Examples of the alkyl groups include methyl, ethyl, propyl, isopropyl, butyl, isobutyl, pentyl, 2-hydroxyethyl, 4-carboxybutyl, hexyl, octyl, benzyl, and phenethyl.

The alkenyl group may be a straight-chain, branched, or cyclic alkenyl group having 2 to 18 carbon atoms (preferably 2 to 8 carbon atoms). Examples of the alkenyl groups include vinyl, allyl, 1-propenyl, 2-pentenyl, 1,3-butadienyl, and 2-octenyl.

The aralkyl group may be an aralkyl group having 7 to 10 carbon atoms and may be, for example, benzyl.

The aryl group may be an aryl group having 6 to 10 carbon atoms, which group may optionally have a substituent. Examples of the aryl groups include phenyl, naphthyl, 4-carboxyphenyl, 3-carboxyphenyl, 3,5-dicarboxyphenyl, 4-methanesulfonamidophenyl, and 4-butanesulfonamidophenyl.

The heterocyclic group may be a five-membered or six-membered, saturated or unsaturated heterocyclic group comprising a carbon atom, a nitrogen atom, an oxygen atom, or a sulfur atom, in which the number of the hetero atom and the kind of the element constituting the ring may be at least one. Examples of the heterocyclic groups include an oxazole ring, a benzoxazole ring, a 5-carboxybenzoxazole ring, a thiazole ring, an imidazole ring, a pyridine ring, a sulfolane ring, a furan ring, a thiophene ring, a pyrazole ring, a pyrrole ring, a chroman ring, and a coumarin ring.

Examples of the halogen atoms include a fluorine atom, a chlorine atom, and a bromine atom.

The alkoxy group may be an alkoxy group having 1 to 18 carbon atoms (preferably 1 to 8 carbon atoms). Examples of the alkoxy groups include methoxy, ethoxy, propoxy, and butoxy.

The aryloxy group may be an aryloxy group having 6 to 10 carbon atoms, which group may optionally have a substituent. Examples of the aryloxy groups include phenoxy and p-methoxyphenoxy.

The alkylthio group may be an alkylthio group having 1 to 18 carbon atoms (preferably 1 to 8 carbon atoms) Examples of the alkylthio groups include methylthio and ethylthio.

The arylthio group may be an arylthio group having 6 to 10 carbon atoms and may be, for example, phenylthio.

The acyloxy group may be an acyloxy group having 1 to 18 carbon atoms (preferably 1 to 8 carbon atoms). Examples of the acyloxy groups include acetoxy, propanoyloxy, pentanoyloxy, and octanoyloxy.

The alkylamino group may be an alkylamino group having 1 to 18 carbon atoms (preferably 1 to 8 carbon atoms). Examples of the alkylamino groups include methylamino, dimethylamino, diethylamino, dibutylamino, and octylamino.

The amido group may be an amido group having 1 to 18 carbon atoms (preferably 1 to 8 carbon atoms). Examples of the amido groups include acetamido, propanoylamino, pentanoylamino, octanoylamino, octanoylmethylamino, and benzamido.

The sulfonamido group may be a sulfonamido group having 1 to 18 carbon atoms (preferably 1 to 8 carbon atoms). Examples of the sulfonamido group include methanesulfonamido, ethanesulfonamido, propylsulfonamido, butanesulfonamido, and benzenesulfonamido.

The alkoxycarbonylamino group may be an alkoxycarbonylamino group having 1 to 18 carbon atoms (preferably 1 to 8 carbon atoms). Examples of the alkoxycarbonylamino groups include methoxycarbonylamino and ethoxycarbonylamino.

The alkoxysulfonylamino group may be an alkoxysulfonylamino group having 1 to 18 carbon atoms (preferably 1 to 8 carbon atoms). Examples of the alkoxysulfonylamino groups include methoxysulfonylamino and ethoxysulfonylamino.

The sulfamoylamino group may be a sulfamoylamino group having 0 to 18 carbon atoms (preferably 0 to 8 carbon atoms), which group may optionally have a substituent. Examples of the sulfamoylamino groups include methylsulfamoylamino, dimethylsulfamoylamino, ethylsulfamoylamino, propylsulfamoylamino, and octylsulfamoylamino.

The ureido group may be a ureido group having 1 to 18 carbon atoms (preferably 1 to 8 carbon atoms), which group may optionally have a substituent. Examples of the ureido groups include ureido, methylureido, N,N-dimethylureido, and octylureido.

The thioureido group may be a thioureido group having 1 to 18 carbon atoms (preferably 1 to 8 carbon atoms), which group may optionally have a substituent. Examples of the thioureido groups include thioureido, methylthioureido, N,N-dimethylthioureido, and octylthioureido.

The acyl group may be an acyl group having 1 to 18 carbon atoms (preferably 1 to 8 carbon atoms). Examples of the acyl groups include acetyl, benzoyl, and propanoyl.

The alkoxycarbonyl group may be an alkoxycarbonyl group having 1 to 18 carbon atoms (preferably 1 to 8 carbon atoms). Examples of the alkoxycarbonyl groups include methoxycarbonyl, ethoxycarbonyl, and octyloxycarbonyl.

The carbamoyl group may be a carbamoyl group having 1 to 18 carbon atoms (preferably 1 to 8 carbon atoms), which group may optionally have a substituent. Examples of the carbamoyl groups include carbamoyl, N,N-dimethylcarbamoyl, and N-ethylcarbamoyl.

The alkylsulfonyl or arylsulfonyl group may be an alkylsulfonyl or arylsulfonyl group having 1 to 18 carbon atoms (preferably 1 to 8 carbon atoms). Examples of the alkylsulfonyl or arylsulfonyl groups include methanesulfonyl, ethanesulfonyl, and benzenesulfonyl.

The alkylsulfinyl group may be an alkylsulfinyl group having 1 to 18 carbon atoms (preferably 1 to 8 carbon atoms). Examples of the alkylsulfinyl groups include methanesulfinyl, ethanesulfinyl, and octanesulfinyl.

The sulfamoyl group may be a sulfamoyl group having 0 to 18 carbon atoms (preferably 0 to 8 carbon atoms), which group may optionally have a substituent. Examples of the sulfamoyl groups include sulfamoyl, dimethylsulfamoyl, ethylsulfamoyl, butylsulfamoyl, octylsulfamoyl, and phenylsulfamoyl.

In particular, $Z^1$ and $Z^2$ should preferably each represent a substituted or unsubstituted 3,3-dialkylindolenine nucleus, or a substituted or unsubstituted 3,3-dialkylbenzoindolenine nucleus.

Also, $R^{30}$ and $R^{31}$ should preferably each independently represent an alkyl group.

The alkyl group represented by each of $R^{30}$ and $R^{31}$ may be a substituted or unsubstituted, straight-chain, branched, or cyclic alkyl group having 1 to 18 carbon atoms (preferably 1 to 8 carbon atoms). Examples of the substituents for the alkyl group include those exemplified above as the substituents for the nitrogen-containing heterocyclic ring, and preferable substituents for the alkyl group are the same as those described above with respect to the substituents for the nitrogen-containing heterocyclic ring. The alkyl group should preferably be an unsubstituted alkyl group or an alkyl group substituted by an aryl group, a halogen atom, a hydroxyl group, an alkoxy group, an acyloxy group, an amido group, a sulfonamido group, an alkoxycarbonyl group, a carboxyl group, or a sulfo group. Examples of the alkyl groups include methyl, ethyl, propyl, butyl, isobutyl, 2-ethylhexyl, octyl, benzyl, 2-phenylethyl, 2-hydroxyethyl, 3-hydroxypropyl, 2-carboxyethyl, 3-carboxypropyl, 4-carboxybutyl, carboxymethyl, 2-methoxyethyl, 2-(2-methoxyethoxy)ethyl, 2-sulfoethyl, 3-sulfopropyl, 3-sulfobutyl, 4-sulfobutyl, 2-(3-sulfopropoxy)ethyl, 2-hydroxy-3-sulfopropyl, 3-sulfopropoxyethoxyethyl, 2-acetoxyethyl, carbomethoxymethyl, and 2-methanesulfonylaminoethyl.

Further, $L^3$, $L^4$, $L^5$, $L^6$, and $L^7$ each independently represent a substituted or unsubstituted methine group. Examples of the substituents for the methine group include those exemplified above as the substituents for the nitrogen-containing heterocyclic ring, and preferable substituents for the methine group are the same as those described above with respect to the substituents for the nitrogen-containing heterocyclic ring. In cases where $L^3$ to $L^7$ are substituted by substituents, the substituents may be connected with one another to form a five-, six-, or seven-membered ring or may form a ring with an auxochrome. Examples of the five-, six-, and seven-membered rings include a cyclopentene ring, a 1-dimethylaminocyclopentene ring, a 1-diphenylaminocyclopentene ring, a cyclohexene ring, a 1-chlorocyclohexene ring, an isophorone ring, a 1-morphorinocyclopentene ring, and a cycloheptene ring.

Furthermore, n1 and n2 should preferably be such that n1 represents 0 and n2 represents 1, or such that n1 represent 2 and n2 represents 0.

Also, M1 represents a charge balancing counter ion. M1 may be a cation or an anion.

Examples of the cations include an alkali metal ion, such as a sodium ion, a potassium ion, or a lithium ion; and an organic ion, such as a tetraalkyl ammonium ion or a pyridinium ion.

The anion may be an inorganic anion or an organic anion. Examples of the anions include a halide ion (such as a fluoride ion, a chloride ion, a bromide ion, or an iodide ion), a sulfonate ion (such as a methanesulfonate ion, a trifluoromethanesulfonate ion, a methylsulfate ion, a p-toluenesulfonate ion, a p-chlorobenzenesulfonate ion, a 1,3-benzenedisulfonate ion, a 1,5-naphthalenedisulfonate ion, or a 2,6-naphthalenedisulfonate ion), a sulfate ion, a thiocyanate ion, a perchlorate ion, a tetrafluoroborate ion, a picrate ion, an acetate ion, metal complex ions represented by the formulas shown below:

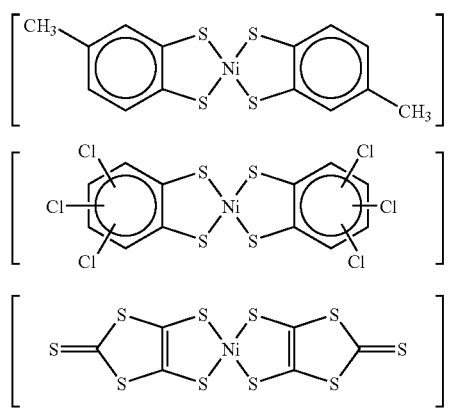

and a phosphate ion, such as a hexafluorophosphate ion or a phosphate ion represented by the formula shown below:

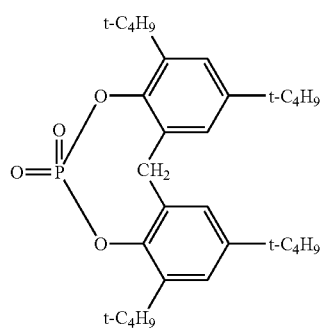

Further, m1 represents a number necessary for keeping charge balance (at least 0, preferably a number of 0 to 4). In cases where a salt is formed within the molecule, m1 represents 0. Furthermore, p and q each independently represent 0 or 1. Both p and q should preferably represent 0.

Two kinds of the compounds, which are represented by Formula (II-1), may be combined with each other on arbitrary carbon atoms to form a bis type of structure.

The compound represented by Formula (II-1) should preferably be a cyanine dye, which is represented by Formula (II-1-1):

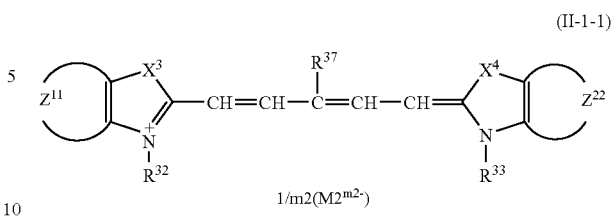

The cyanine dye compound represented by Formula (II-1-1) should more preferably be a compound having the combinations described below.

It is preferred that $X^3$ and $X^4$ each independently represent an oxygen atom, $-C(R^{34})(R^{35})-$, or $-N(R^{36})-$; $R^{32}$ and $R^{33}$ each independently represent an unsubstituted alkyl group having 1 to 6 carbon atoms or an alkyl group having 1 to 6 carbon atoms substituted with an alkoxy group or an alkylthio group; $R^{34}$, $R^{35}$ and $R^{36}$ each independently represent an unsubstituted alkyl group having from 1 to 6 carbon atoms; $R^{37}$ represents a hydrogen atom, an alkyl group having 1 to 6 carbon atoms, which may have a substituent, a phenyl group, a pyridyl group, a pyrimidyl group, a succinimido group, a benzoxazole group, or a halogen atom; $Z^{11}$ and $Z^{22}$ each independently represent an atom group for forming an unsubstituted benzene ring, an unsubstituted naphthalene ring, or an unsubstituted quinoxaline ring, or an atom group for forming a benzene ring substituted with one or two groups selected from a methyl group, a chlorine atom, a fluorine atom, a methoxy group and an ethoxy group; and M2 represents a perchlorate ion, a hexafluorophosphate ion, a metallic complex ion represented by the following formula:

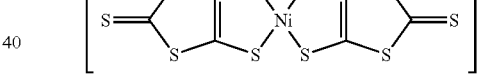

or a sulfonate ion represented by the following formula:

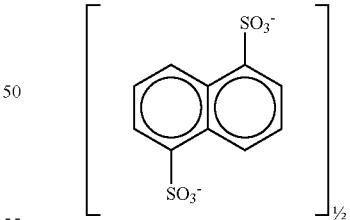

In Formula (II-1-1), m2 represents the valence number of M2.

In Formula (II-1-1), the most preferred combination is such that both $X^3$ and $X^4$ simultaneously represent $-C(R^{34})(R^{35})-$, or $-N(R^{36})-$; $R^{32}$ and $R^{33}$ each independently represent an unsubstituted alkyl group (such as a methyl group, an ethyl group, a propyl group, an isopropyl group, or a butyl group); $R^{34}$, $R^{35}$ and $R^{36}$ each independently represent a methyl group or an ethyl group; $R^{37}$ represents a hydrogen atom, a methyl group, an ethyl group, a chlorine atom, or a bromine atom; and both $Z^{11}$ and $Z^{22}$ simultaneously represent an atom group for forming an unsubstituted benzene ring, an unsubstituted naphthalene ring, or an unsubstituted quinoxaline ring.

Specific examples of compounds of the chemical species capable of producing the fluorescence, which are represented by Formula (II-1) and may be used in the invention, will be listed below.

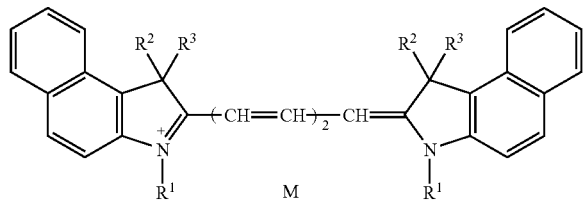

| No. | $R^1$ | $R^2$ | $R^3$ | M |
|---|---|---|---|---|
| B-1 | $CH_3$ | $CH_3$ | $CH_3$ | $ClO_4^-$ |
| B-2 | $CH_3$ | $CH_3$ | $C_2H_5$ | [naphthalene-1,5-disulfonate]$_{½}$ |
| B-3 | $CH_3$ | $CH_3$ | $C_2H_5$ | $PF_6^-$ |
| B-4 | $C_2H_5$ | $CH_3$ | $CH_3$ | $CH_3$-C$_6$H$_4$-$SO_3^-$ |
| B-5 | n-$C_3H_7$ | $CH_3$ | $CH_3$ | $CF_3SO_3^-$ |
| B-6 | n-$C_4H_9$ | $CH_3$ | $CH_3$ | $ClO_4^-$ |
| B-7 | n-$C_4H_9$ | $CH_3$ | $CH_3$ | Ni(dithiolene) complex with $OCH_3$ groups |
| B-8 | $CH_2CH(CH_3)_2$ | $CH_3$ | $CH_3$ | [naphthalene-1,5-disulfonate]$_{½}$ |
| B-9 | $CH_2CH_2CF_2H$ | $CH_3$ | $CH_3$ | $ClO_4^-$ |
| B-10 | $CH_2CH(C_2H_5)$-n-$C_4H_9$ | $CH_3$ | $CH_3$ | $PF_6^-$ |
| B-11 | $CH_3$ | $CH_3$ | $CH_3$ | $CH_3$-C$_6$H$_4$-$SO_3^-$ |
| B-12 | $CH_2CH_2OC_2H_5$ | $CH_3$ | $CH_3$ | $ClO_4^-$ |
| B-13 | n-$C_4H_9$ | $CH_3$ | $C_2H_5$ | $ClO_4^-$ |
| B-14 | n-$C_4H_9$ | $CH_3$ | $C_2H_5$ | $PF_6^-$ |
| B-15 | $C_2H_5$ | $CH_3$ | $C_2H_5$ | $ClO_4^-$ |

-continued

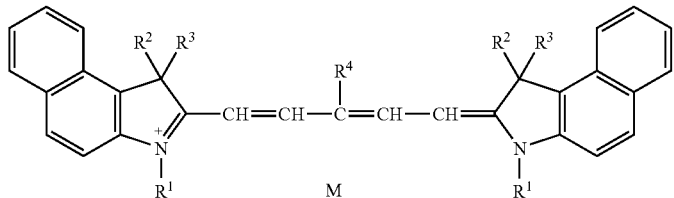

| No. | R¹ | R² | R³ | R⁴ | M |
|---|---|---|---|---|---|
| B-16 | CH₃ | CH₃ | CH₃ | CH₃ | ClO₄⁻ |
| B-17 | CH₃ | CH₃ | CH₃ | CH₃ | naphthalene-1,5-disulfonate (½) |
| B-18 | n-C₃H₇ | CH₃ | CH₃ | CH₃ | ClO₄⁻ |
| B-19 | n-C₄H₉ | CH₃ | CH₃ | CH₃ | ClO₄⁻ |
| B-20 | CH₃ | CH₃ | CH₃ | —CH₂—C₆H₅ | ClO₄⁻ |
| B-21 | CH₃ | CH₃ | CH₃ | —C₆H₅ | ClO₄⁻ |
| B-22 | CH₃ | CH₃ | CH₃ | 4-pyridyl | ClO₄⁻ |
| B-23 | CH₃ | CH₃ | CH₃ | 2-benzoxazolyl | ClO₄⁻ |
| B-24 | CH₃ | CH₃ | CH₃ | Br | ClO₄⁻ |
| B-25 | CH₃ | CH₃ | CH₃ | Cl | ClO₄⁻ |
| B-26 | CH₂CO₂C₂H₅ | CH₃ | CH₃ | H | naphthalene-1,5-disulfonate (½) |
| B-27 | —CH₂CO₂—(1-naphthyl) | CH₃ | CH₃ | H | ClO₄⁻ |

-continued

| No. | R¹ | R² | R³ | R⁴ | X | M |
|---|---|---|---|---|---|---|
| B-28 | 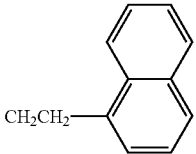 (1-naphthyl-CH₂CH₂) | CH₃ | CH₃ | | H | ClO₄⁻ |

B-29
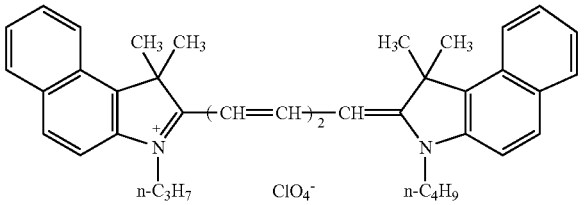
(bis-benzindolium trimethine dye with n-C₃H₇ and n-C₄H₉ on N, ClO₄⁻ counterion)

| No. | R¹ | R² | R³ | R⁴ | X | M |
|---|---|---|---|---|---|---|
| B-30 | CH₃ | CH₃ | CH₃ | | H |  (CH₂-C₆H₄-SO₃⁻) |
| B-31 | CH₃ | CH₃ | C₂H₅ | | H | ClO₄⁻ |
| B-32 | C₂H₅ | CH₃ | CH₃ | | CH₃ | ClO₄⁻ |

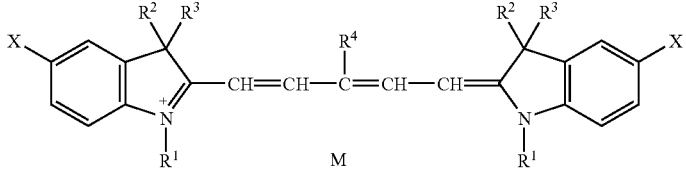

| No. | R¹ | R² | R³ | R⁴ | X | M |
|---|---|---|---|---|---|---|
| B-33 | C₂H₅ | CH₃ | CH₃ | CH₂-C₆H₅ | H | ClO₄⁻ |
| B-34 | n-C₃H₇ | CH₃ | CH₃ | H | H | 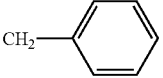 (naphthalene-1,5-disulfonate, ½) |
| B-35 | CH₂CH(CH₃)₂ | CH₃ | CH₃ | H | H | PF₆⁻ |
| B-36 | n-C₄H₉ | CH₃ | CH₃ | H | CH₃ | I⁻ |
| B-37 | CH₂CH₂OC₂H₅ | CH₃ | CH₃ | H | Cl | ClO₄⁻ |
| B-38 | n-C₃H₇ | CH₃ | CH₃ | CH₃ | OCH₃ | ClO₄⁻ |
| B-39 | CH₂CH(CH₃)₂ | CH₃ | CH₃ | H | SO₂NH₂ | ClO₄⁻ |
| B-40 | n-C₃H₇ | CH₃ | CH₃ | H | H | 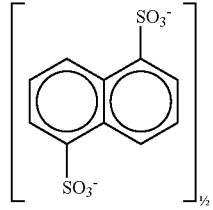 (Ni bis(dimethylbenzenedithiolate)) |
| B-41 | n-C₄H₉ | CH₃ | CH₃ | 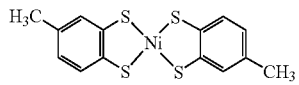 (C₆H₅) | H | ClO₄⁻ |
| B-42 | n-C₃H₇ | CH₃ | CH₃ | C₂H₅ | Cl | PF₆⁻ |
| B-43 | CH₂CH(CH₃)₂ | CH₃ | CH₃ | H | CO₂C₂H₅ | PF₆⁻ |
| B-44 | n-C₃H₇ | CH₃ | CH₃ | H | H | ClO₄⁻ |
| B-45 | n-C₃H₇ | CH₃ | C₂H₅ | H | | PF₆⁻ |
| B-46 | C₂H₅ | CH₃ | C₂H₅ | H | | ClO₄⁻ |
| B-47 | n-C₄H₉ | CH₃ | C₂H₅ | H | | ClO₄⁻ |
| B-48 | CH₃ | CH₃ | CH₃ | Br | | ClO₄⁻ |
| B-49 | CH₃ | CH₃ | CH₃ | Cl | | ClO₄⁻ |

| No. | | | | | |
|---|---|---|---|---|---|
| B-50 | CH₃ | CH₃ CH₃ |  | | I⁻ |
| B-51 | 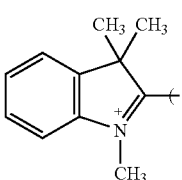 | | | | |
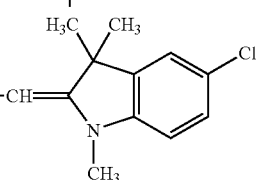
| No. | R¹ | R² | R³ | X | M |
|---|---|---|---|---|---|
| B-52 | C₂H₅ | C₂H₅ | CH₃ | H | I⁻ |
| B-53 | CH₃ | CH₃ | H | 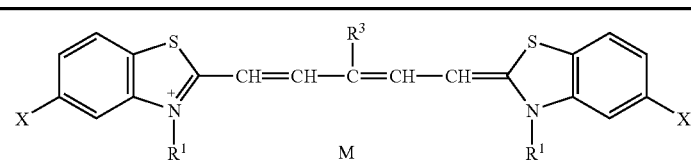 | |
| B-54 | CH₃ | CH₃ | H | CH₃ | 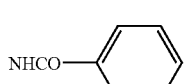 |
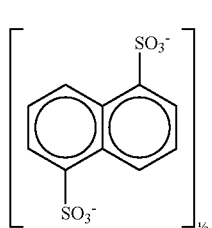
| No. | R¹ | R² | X | M |
|---|---|---|---|---|
| B-55 | CH₃ | CH₃ | X | I⁻ |
| B-56 | C₂H₅ | C₂H₅ | Br | 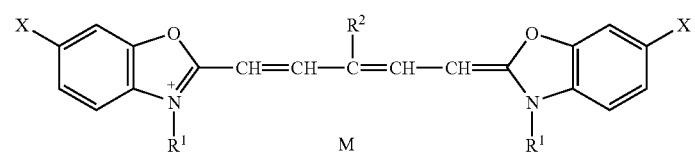 |
| B-57 | (CH₂)₂CO₂H | Br | (CH₂)₂COO⁻ | Na⁺ |
| B-58 | 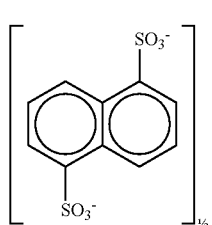 | | | |

-continued
B-59
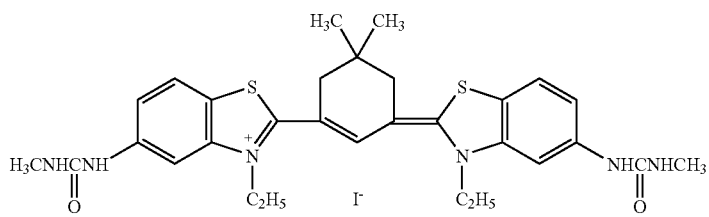
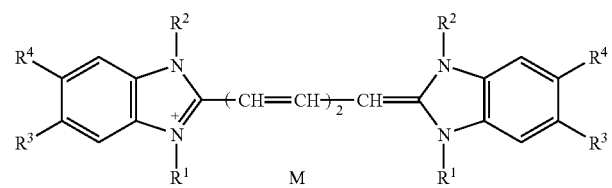
| No. | R¹ | R² | R³ | R⁴ | M |
|---|---|---|---|---|---|
| B-60 | $(CH_2)_4SO_3^-$ | $C_2H_5$ | $CF_3$ | Cl | $K^+$ |
| B-61 | $(CH_2)_4SO_3^-$ | $C_2H_5$ | CN | Cl | $K^+$ |
B-62
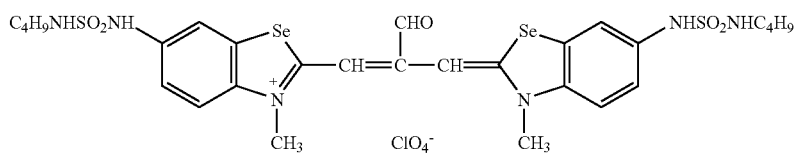
B-63
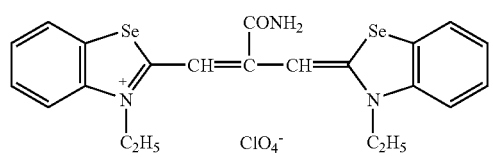
B-64
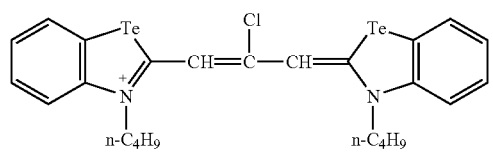
B-65
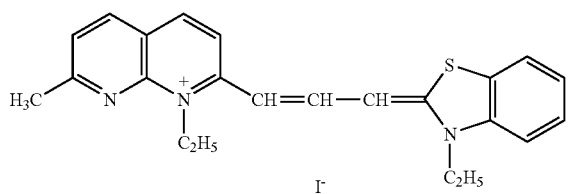
B-66
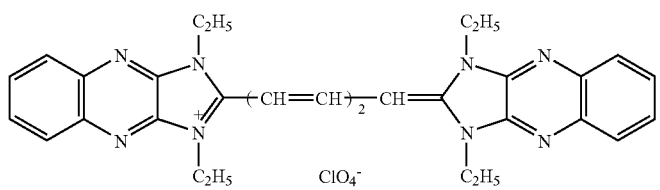

-continued
B-67
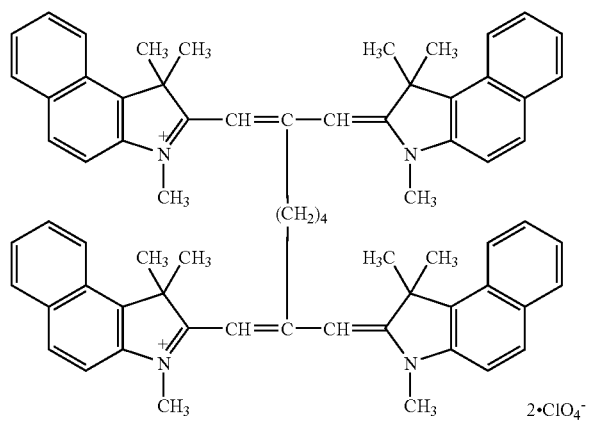
B-68
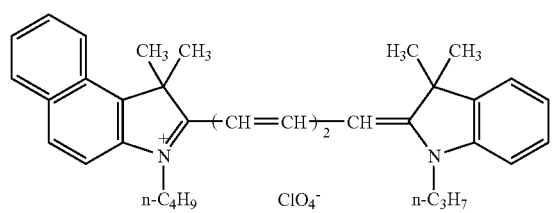
B-69
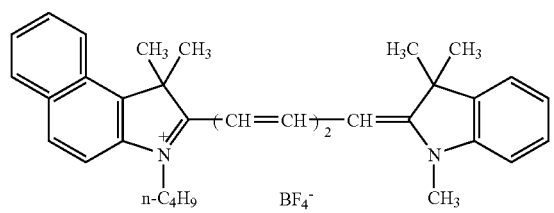
B-70
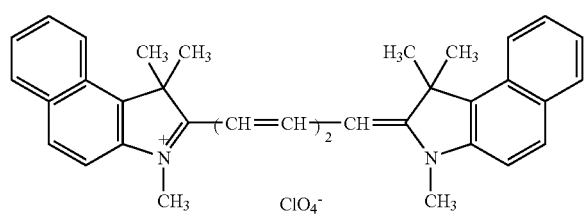
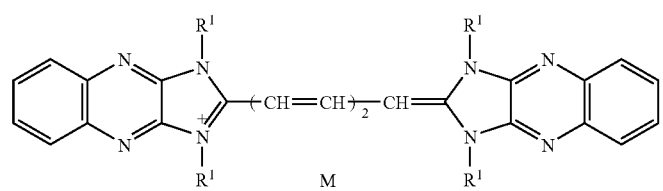
| No. | $R^1$ | M |
|---|---|---|
| B-71 | (CH$_2$)$_3$OCCH$_3$ (O) | ClO$_4^-$ |
| B-72 | (CH$_2$)$_3$SCH$_3$ | ClO$_4^-$ |
| B-73 | (CH$_2$)$_3$SCH$_3$ | BF$_4^-$ |
| B-74 | (CH$_2$)$_3$SCH$_3$ | BF$_4^-$ |

-continued
B-75 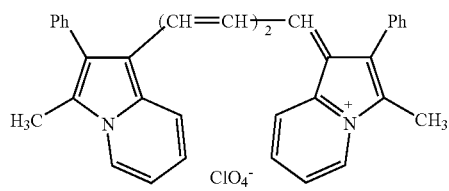
B-76 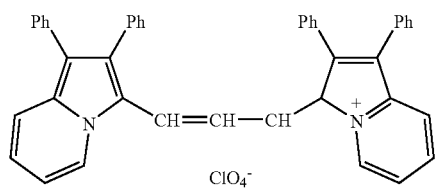
B-77 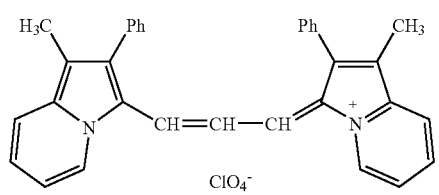
B-78 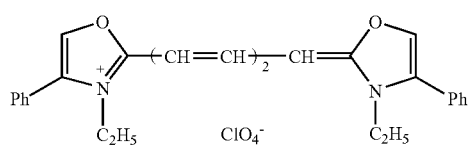
B-79 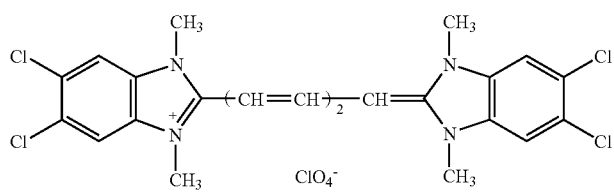
B-80 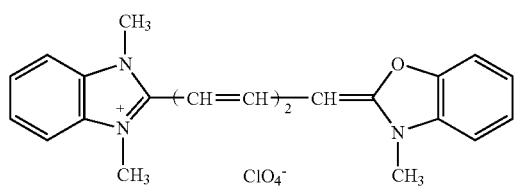
B-81 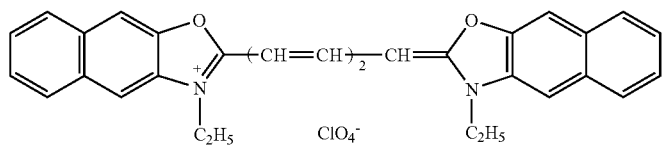
B-82 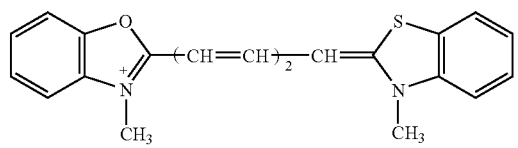

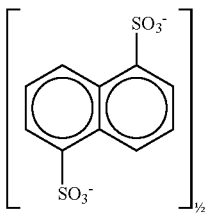

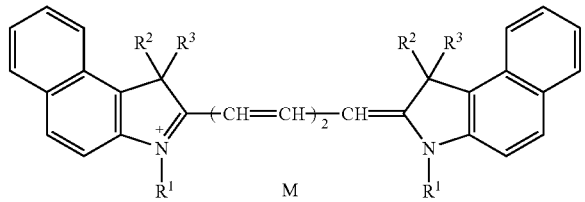

| R¹ | R² | R³ | M |
|---|---|---|---|
| n-C₄H₉ | CH₃ | CH₃ | I⁻ |

The compound represented by formula (II-1) can be synthesized according to the methods described in *Heterocyclic Compounds—Cyanine Dyes and Related Compounds*, written by F. M. Hamer, John Wiley & Sons, N.Y. and London (1964); *Heterocyclic Compounds—Special topics in heterocyclic chemistry*, written by D. M. Sturmer, John Wiley & Sons, N.Y. and London (1977), Chapter 18, Section 14, pages 482 to 515; and *Rodd's Chemistry of Carbon Compounds*, Elsevir Science Publishing Company Inc., 2nd. Ed. Vol. IV, Part B (1977), Chapter 15, pages 369 to 422.

In the present invention, the recording layer should more preferably be constituted of a material comprising a combination of the chemical species capable of producing the fluorescence, which is represented by Formula (II-1) shown above and a chemical species capable of quenching the fluorescence, which is represented by Formula (II-2) shown below.

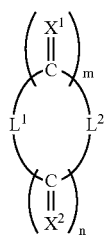

(II-2)

wherein m and n each independently represent an integer of 0 to 2; $X^1$ and $X^2$ each represent $=NR^1$ or $=CR^2R^3$, in which $R^1$, $R^2$, and $R^3$ each represent a substituent; and $L^1$ and $L^2$ each independently represent a bivalent linking group.

The chemical species capable of quenching the fluorescence, which is represented by Formula (II-2) and which may be utilized in the present invention, will be described hereinbelow.

In Formula (II-2), both m and n should preferably represent 1.

Also, $X^1$ and $X^2$ each represent $=NR^1$ or $=CR^2R^3$. Examples of the substituents represented by $R^1$, $R^2$ and $R^3$ include a halogen atom or a substituent formed by combining a carbon atom, an oxygen atom, a nitrogen atom and a sulfur atom, and specifically, an alkyl group, an alkenyl group, an aralkyl group, an aryl group, a heterocyclic group, a halogen atom, a cyano group, a nitro group, a mercapto group, a hydroxyl group, an alkoxy group, an aryloxy group, an alkylthio group, an arylthio group, an acyloxy group, an amino group, an alkylamino group, an amido group, a sulfoneamido group, a sulfamoylamino group, an alkoxycarbonylamino group, an alkoxysulfonylamino group, an ureido group, a thioureido group, an acyl group, an alkoxycarbonyl group, a carbamoyl group, an alkylsulfonyl group, an alkylsulfinyl group, a sulfamoyl group, a carboxyl group (including a salt), and a sulfo group (including a salt). The above-enumerated substituents may further be substituted with the substituents.

Examples of the substituents represented by $R^1$, $R^2$ and $R^3$ will be described in more detail below.

The alkyl group includes a straight-chain, branched or cyclic alkyl group having 1 to 18 carbon atoms (preferably 1 to 6 carbon atoms), and examples thereof include methyl, ethyl, propyl, isopropyl, t-butyl, cyclopentyl, cyclohexyl, 2-hydroxyethyl, 3-hydroxypropyl, 4-hydroxybutyl, 3-methoxypropyl, 2-aminoethyl, acetamidomethyl, 2-acetamidoethyl, carboxymethyl, 2-carboxyethyl, 2-sulfoethyl, ureidomethyl, 2-ureidoethyl, carbamoylmethyl, 2-carbamoylethyl, 3-carbamoylpropyl, pentyl, hexyl, octyl, decyl, undecyl, dodecyl, hexadecyl and octadecyl.

The alkenyl group include a straight-chain, branched and cyclic alkenyl group having 2 to 18 carbon atoms (preferably 2 to 6 carbon atoms), and examples thereof include vinyl, allyl, 1-propenyl, 2-pentenyl, 1,3-butanedienyl, 2-octenyl and 3-dodecenyl.

The aralkyl group includes an aralkyl group having 7 to 10 carbon atoms, and may be, for example, benzyl.

The aryl group includes an aryl group having 6 to 10 carbon atoms, which may have a substituent. Examples of the aryl groups include phenyl, naphthyl, p-dibutylaminophenyl and p-methoxyphenyl.

The heterocyclic group includes a five-membered or six-membered saturated or unsaturated heterocyclic group comprising a carbon atom, a nitrogen atom, an oxygen atom, or a sulfur atom, in which the number and the species of the hetero atoms constituting the ring may be single or plural, and examples thereof include furil, benzofuril, pyranyl, pyrrolyl, imidazolyl, isoxazolyl, pyrazolyl, benzotriazolyl, pyridyl, pyrimidyl, pyridazinyl, thienyl, indolyl, quinolyl, phthalazinyl, quinoxalyl, pyrrolidinyl, pyrrolinyl, imidazolidinyl, imidazolinyl, pyrazolidinyl, piperidyl, piperazinyl, indolyl and morpholinyl.

Examples of the halogen atom include a fluorine atom, a chlorine atom, and a bromine atom.

The alkoxy group includes an alkoxy group having 1 to 18 carbon atoms (preferably 1 to 6 carbon atoms), which may have a substituent, and the examples thereof include methoxy, ethoxy, propoxy, isopropoxy, butoxy, 2-methoxyethoxy, 2-methanesulfonylethoxy, pentyloxy, hexyloxy, octyloxy, undecyloxy, dodecyloxy, hexadecyloxy and octadecyloxy.

The aryloxy group includes an aryloxy group having 6 to 10 carbon atoms, which may have a substituent, and examples thereof include phenoxy and p-methoxyphenoxy.

The alkylthio group includes an alkylthio group having 1 to 18 carbon atoms (preferably 1 to 6 carbon atoms), and examples thereof include methylthio, ethylthio, octylthio, undecylthio, dodecylthio, hexadecylthio and octadecylthio.

The arylthio group includes an arylthio group having 6 to 10 carbon atoms, which may have a substituent, and examples thereof include phenylthio and 4-methoxyphenylthio.

The acyloxy group includes an acyloxy group having 1 to 18 carbon atoms (preferably 1 to 6 carbon atoms), and examples thereof include acetoxy, propanoyloxy, pentanoyloxy, octanoyloxy, dodecanoyloxy and octadecanoyloxy.

The alkylamino group includes an alkylamino group having 1 to 18 carbon atoms (preferably 1 to 6 carbon atoms), and examples thereof include methylamino, dimethylamino, diethylamino, dibutylamino, octylamino, dioctylamino and undecylamino.

The amido group includes an amido group having 1 to 18 carbon atoms (preferably 1 to 6 carbon atoms), and examples thereof include acetamido, acetylmethylamino, acetyloctylamino, acetyldecylamino, acetylundecylamino, acetyloctadecylamino, propanoylamino, pentanoylamino, octanoylamino, octanoylmethylamino, dodecanoylamino, dodecanoylmethylamino and octadecanoylamino.

The sulfonamido group includes a sulfonamido group having 1 to 18 carbon atoms (preferably 1 to 6 carbon atoms), which may have a substituent, and examples thereof include methanesulfonamido, ethanesulfonamido, propylsulfonamido, 2-methoxyethylsulfonamido, 3-aminopropylsulfonamido, 2-acetamidoethylsulfonamido, octylsulfonamido and undecylsulfonamido.

The alkoxycarbonylamino group includes an alkoxycarbonylamino group having from 2 to 18 carbon atoms (preferably from 2 to 6 carbon atoms), and examples thereof include methoxycarbonylamino, ethoxycarbonylamino, octyloxycarbonylamino and undecyloxycarbonylamino.

The alkoxysulfonylamino group includes an alkoxysulfonylamino group having from 1 to 18 carbon atoms (preferably from 1 to 6 carbon atoms), and examples thereof include methoxysulfonylamino, ethoxysulfonylamino, octyloxysufonylamino and undecyloxysulfonylamino.

The sulfamoylamino group includes a sulfamoylamino group having from 0 to 18 carbon atoms (preferably from 0 to 6 carbon atoms), and examples thereof include methylsulfamoylamino, dimethylsulfamoylamino, ethylsulfamoylamino, propylsulfamoylamino, octylsulfamoylamino and undecylsulfamoylamino.

The ureido group includes an ureido group having from 1 to 18 carbon atoms (preferably from 1 to 6 carbon atoms), which may have a substituent, and examples thereof include ureido, methylureido, N,N-dimethylureido, octylureido and undecylureido.

The thioureido group includes a thioureido group having from 1 to 18 carbon atoms (preferably from 1 to 6 carbon atoms), which may have a substituent, and examples thereof include thioureido, methylthioureido, N,N-dimethylthioureido, octylthioureido and undecylthioureido.

The acyl group includes an acyl group having from 1 to 18 carbon atoms (preferably from 1 to 6 carbon atoms), and examples thereof include acetyl, benzoyl, octanoyl, decanoyl, undecanoyl and octadecanoyl.

The alkoxycarbonyl group includes an alkoxycarbonyl group having from 2 to 18 carbon atoms (preferably from 2 to 6 carbon atoms), and examples thereof include methoxycarbonyl, ethoxycarbonyl, octyloxycarbonyl and undecyloxycarbonyl.

The carbamoyl group includes a carbamoyl group having from 1 to 18 carbon atoms (preferably from 1 to 6 carbon atoms), which may have a substituent, and examples thereof include carbamoyl, N,N-dimethylcarbamoyl, N-ethylcarbamoyl, N-octylcarbamoyl, N,N-dioctylcarbamoyl and N-undecylcarbamoyl.

The alkylsulfonyl group includes an alkylsulfonyl group having from 1 to 18 carbon atoms (preferably from 1 to 6 carbon atoms), which may have a substituent, and examples thereof include methanesulfonyl, ethanesulfonyl, 2-chloroethanesulfonyl, octanesulfonyl and undecanesulfonyl.

The alkylsulfinyl group includes an alkylsulfinyl group having from 1 to 18 carbon atoms (preferably from 1 to 6 carbon atoms), and examples thereof include methanesuflinyl, ethanesulfinyl and octanesulfinyl.

The sulfamoyl group includes a sulfamoyl group having from 0 to 18 carbon atoms (preferably from 0 to 6 carbon atoms), which may have a substituent, and examples thereof include sulfamoyl, dimethylsulfamoyl, ethylsulfamoyl, octylsulfamoyl, dioctylsulfamoyl and undecylsulfamoyl.

Further, $L^1$ and $L^2$ each independently represent a bivalent linking group. The bivalent linking group used herein comprises a carbon atom, a nitrogen atom, an oxygen atom, or a sulfur atom, and constitutes a four-membered to eight-membered ring together with the carbon atoms, to which $X^1$ and $X^2$ are connected.

Specific examples of $L^1$ and $L^2$ include a bivalent linking group constituted by combining —C($R^4$)($R^5$)—, —C($R^6$)═, —N($R^7$)—, —N═, —O— and —S—, in which $R^4$, $R^5$, $R^6$ and $R^7$ each independently represent a hydrogen atom or a substituent, the details of which are the same as those described for $R^1$, $R^2$ and $R^3$. The four-membered to eight-membered ring may form a saturated or unsaturated condensed ring, and examples of the condensed ring include a cycloalkyl ring, an aryl ring and a heterocyclic ring, the details of which are the same as those described above for $R^1$, $R^2$ and $R^3$.

The four-membered to eight-membered ring will be described in more detail below.

Examples of the four-membered ring include cyclobutanedione, cyclobutenedione and benzocyclobutenequinone.

Examples of the five-membered ring include cyclopentanedione, cyclopentenedione, cyclopentanetrione, cyclopentenetrione, indandione, indantrione, tetrahydrofurandione, tetrahydrofurantrione, tetrahydropyrroledione, tetrahydropyrroletrione, tetrahydrothiophenedione and tetrahydrothiophenetrione.

Examples of the six-membered ring include benzoquinone, quinomethane, quinodimethane, quinoneimine, quinonediimine, thiobenzoquinone, dithiobenzoquinone, naphthoquinone, anthraquinone, dihydrochromenetrione, dihydropyridinedione, dihydropyrazinedione, dihydropyrimidinedione, dihydropyridazinedione, dihydrophthalazinedione, dihydroisoquinolinedione and tetrahydroquinolinetrione.

Examples of the seven-membered ring include cycloheptanedione, cycloheptanetrione, azacycloheptanetrione, diazacycloheptanetrione, oxocycloheptanetrione, dioxocycloheptanetrione and oxoazacycloheptanetrione.

Examples of the eight-membered ring include cyclooctanedione, cyclooctanetrione, azacyclooctanetrione, diazacyclooctanetrione, oxocyclooctanetrione, dioxocyclooctanetrione, oxoazacyclooctanetrione, cyclooctenedione, cyclooctadienedione and dibenzocyclooctenedione.

The ring formed by $L^1$ and $L^2$ together with the carbon atoms, to which $X^1$ and $X^2$ are connected, is preferably a six-membered ring.

The chemical species capable of quenching the fluorescence should more preferably be a compound represented by Formula (II-2-1) shown below.

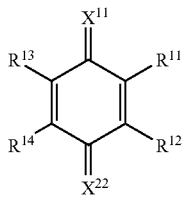

(II-2-1)

wherein $=NR^8$ and $=CR^9R^{10}$ represented by $X^{11}$ and $X^{22}$ have the same meanings as $=NR^1$ and $=CR^2R^3$ represented by $X^1$ and $X^2$ in Formula (II-2), and the preferred scopes thereof are also the same; and the substituents represented by $R^8$, $R^9$ and $R^{10}$ have the same meanings as the substituents represented by $R^1$, $R^2$ and $R^3$ in Formula (II-2), and the preferred scopes thereof are also the same.

$R^{11}$, $R^{12}$, $R^{13}$ and $R^{14}$ each independently represent a hydrogen atom or a substituent. When $R^{11}$ and $R^{12}$, or $R^{13}$ and $R^{14}$ are the substituents at the same time, these may be connected to each other to form an unsaturated condensed ring. The unsaturated condensed ring may have a substituent, and examples of the substituent include those exemplified for $R^1$ to $R^3$.

$X^{11}$ and $X^{22}$ each independently preferably represent an oxygen atom or a $=CR^9R^{10}$ group, and more preferably these simultaneously represent oxygen atoms or simultaneously represent $=CR^9R^{10}$ groups. $R^9$ and $R^{10}$ each independently preferably represent a halogen atom, a cyano group, an acyl group, an alkoxycarbonyl group or an alkylsulfonyl group.

The cases where $X^{11}$ and $X^{22}$ simultaneously represent oxygen atoms will be described hereinbelow.

In cases where $X^{11}$ and $X^{22}$ simultaneously represent oxygen atoms, it is preferred that at least two of $R^{11}$, $R^{12}$, $R^{13}$ and $R^{14}$ are electron attracting groups. The electron attracting group herein means a substituent having a positive Hammett's σp value, and specifically examples thereof include a halogen atom, a cyano group, a nitro group, an acyl group, an alkoxycarbonyl group, a carbamoyl group, an alkylsulfonyl group and an alkylsulfinyl group.

In cases where $X^{11}$ and $X^{22}$ simultaneously represent oxygen atoms, it is particularly preferred that $R^{11}$, $R^{12}$, $R^{13}$ and $R^{14}$ each independently represent a hydrogen atom, an alkyl group, a halogen atom, a cyano group, a nitro group, an alkoxy group, an alkylthio group, an amino group, an alkylamino group, an amido group, a sulfonamido group, a sulfamoylamino group, an alkoxycarbonylamino group, an alkoxysulfonylamino group, an ureido group, a thioureido group, an acyl group, an alkoxycarbonyl group, a carbamoyl group, an alkylsulfonyl group, an alkylsulfinyl group and a sulfamoyl group, provided that at least two of them are electron attracting groups.

As the most preferred combination, $R^{11}$, $R^{12}$, $R^{13}$ and $R^{14}$ each independently represent a hydrogen atom, an alkyl group having from 1 to 6 carbon atoms, a halogen atom, a cyano group, an alkoxy group having from 1 to 6 carbon atoms, an alkylthio group having from 1 to 6 carbon atoms, an amido group having from 1 to 6 carbon atoms, a sulfoneamido group having from 1 to 6 carbon atoms, an ureido group having from 1 to 6 carbon atoms, an acyl group having from 1 to 6 carbon atoms, an alkoxycarbonyl group having from 2 to 6 carbon atoms, a carbamoyl group having from 1 to 6 carbon atoms, an alkylsulfonyl group having from 1 to 6 carbon atoms or an alkylsulfinyl group having from 1 to 6 carbon atoms, provided that at least two of them are a halogen atom, a cyano group, an alkylsulfonyl group or an alkylsulfinyl group.

In cases where $X^{11}$ and $X^{22}$ simultaneously represent $=CR^9R^{10}$ groups, the chemical species capable of quenching the fluorescence should particularly preferably be a compound represented by Formula (II-2-2) shown below.

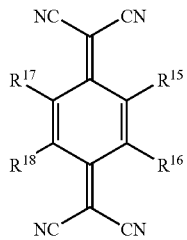

(II-2-2)

wherein $R^{15}$, $R^{16}$, $R^{17}$ and $R^{18}$ each independently have the same meanings as those described for $R^{11}$ to $R^{14}$.

The chemical species capable of quenching the fluorescence should most preferably be a compound represented by Formula (II-2-3) or (II-2-4) shown below.

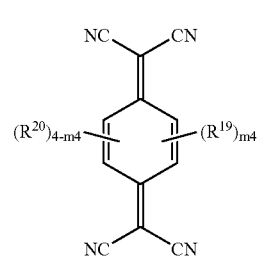

(II-2-3)

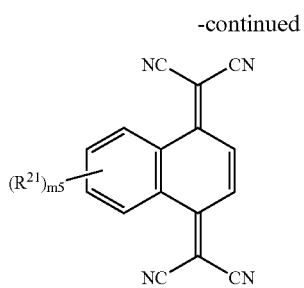
(II-2-4)

In Formula (II-2-3), R represents a halogen atom, a cyano group, an alkoxy group, an alkylthio group, an amido group, a sulfoneamido group, an ureido group, an acyl group or an alkoxycarbonyl group; $R^{20}$ has the same meaning as those explained above for $R^1$ to $R^3$; and m4 represents an integer of from 1 to 4, provided that, in cases where m4 or 4−m4 represents an integer of at least 2, the at least two $R^{19}$ may be identical or different, and the at least two $R^{20}$ may be identical or different.

In Formula (II-2-4), $R^{21}$ represents a hydrogen atom or a substituent. The substituent herein has the same meaning as explained above for $R^1$ to $R^3$, and m5 represents an integer of from 0 to 6, provided that, in cases where m5 represents an integer of 2 or more, a plurality of $R^{21}$ may be identical or different.

A preferred combination of $R^{19}$ and $R^{20}$ in Formula (II-2-3) will be described below.

A combination, in which $R^{19}$ represents a halogen atom, a cyano group, an alkoxy group having from 1 to 6 carbon atoms, an acyl group having from 1 to 8 carbon atoms or an alkoxycarbonyl group having from 2 to 6 carbon atoms, and $R^{20}$ represents a hydrogen atom or an alkyl group having from 1 to 6 carbon atoms, is preferred, and the most preferred combination is that $R^{19}$ represents an alkoxy group having from 1 to 6 carbon atoms, and $R^{20}$ represents a hydrogen atom.

The chemical species capable of quenching the fluorescence, which is represented by Formula (II-2-3) should particularly preferably be a compound represented by the following formula:

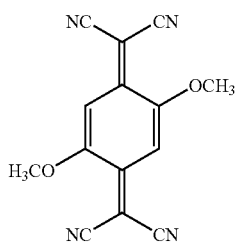

In Formula (II-2-4), $R^{21}$ preferably represents a hydrogen atom, an alkyl group, a halogen atom, a cyano group, an alkoxy group, an alkylthio group, an amido group, a sulfoneamido group, an ureido group or an acyl group; more preferably a halogen atom, an alkyl group having from 1 to 6 carbon atoms, a halogen atom, a cyano group, an alkoxy group having from 1 to 6 carbon atoms, an alkylthio group having from 1 to 6 carbon atoms, an amido group having from 1 to 6 carbon atoms, a sulfoneamido group having from 1 to 6 carbon atoms, an ureido group having from 1 to 6 carbon atoms or an acyl group having from 1 to 6 carbon atoms; particularly preferably a hydrogen atom, an alkyl group having from 1 to 6 carbon atoms, a fluorine atom, a chlorine atom, a bromine atom, a cyano group or an alkoxy group having from 1 to 6 carbon atoms; and most preferably a hydrogen atom.

Specific examples of the compounds of the chemical species capable of quenching the fluorescence, which may be utilized in the present invention, will be described below.

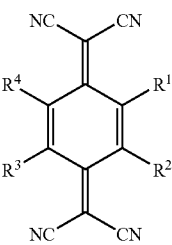

| No. | $R^1$ | $R^2$ | $R^3$ | $R^4$ |
|---|---|---|---|---|
| A-1 | H | H | H | H |
| A-2 | $CH_3$ | H | H | H |
| A-3 | $CH_3$ | H | $OCH_3$ | H |
| A-4 | $OCH_3$ | H | $OCH_3$ | H |
| A-5 | $C_{18}H_{37}$ | H | H | H |
| A-6 | F | H | H | H |
| A-7 | Cl | H | H | H |
| A-8 | Br | H | H | H |
| A-9 | $OCH_3$ | H | H | H |
| A-10 | $CH_2Ph$ | H | H | H |
| A-11 | $CH_2CO_2H$ | H | H | H |
| A-12 | $OC_2H_5$ | H | $OC_2H_5$ | H |
| A-13 | $OC_2H_5$ | H | $SCH_3$ | H |

-continued
| | | | | |
|---|---|---|---|---|
| A-14 | Cl | H | Cl | H |
| A-15 | CH$_3$ | H | Br | H |
| A-16 | CH$_3$ | H | CH$_3$ | H |
| A-17 | CO$_2$CH$_3$ | H | H | H |
| A-18 | COC$_{11}$H$_{23}$ | H | H | H |
| A-19 | Br | H | OCH$_2$CH$_2$OH | H |
| A-20 | CH$_3$ | CH$_3$ | CH$_3$ | CH$_3$ |
| A-21 | CH$_3$ | OCH$_3$ | CH$_3$ | OCH$_3$ |
| A-22 | F | H | F | H |
| A-23 | F | F | F | F |
| A-24 | CN | H | CN | H |
| A-25 | CO$_2$CH$_3$ | H | CO$_2$CH$_3$ | H |
| A-26 | Cl | NHCOC$_{11}$H$_{23}$ | Cl | NHCOC$_{11}$H$_{23}$ |
A-27 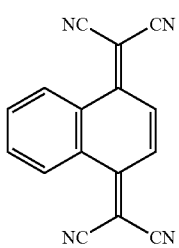
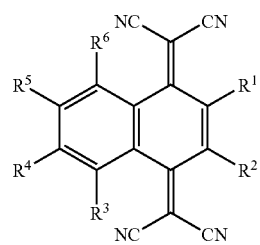
| No. | R$^1$ | R$^2$ | R$^3$ | R$^4$ | R$^5$ | R$^6$ |
|---|---|---|---|---|---|---|
| A-28 | CH$_3$ | H | H | H | H | H |
| A-29 | CH$_3$ | Cl | H | H | H | H |
| A-30 | CH$_3$ | CH$_3$ | H | H | H | H |
| A-31 | H | H | H | OCH$_3$ | H | H |
| A-32 | H | H | H | C$_8$H$_{17}$ | H | H |
| A-33 | H | H | H | SCH$_3$ | H | H |
A-34 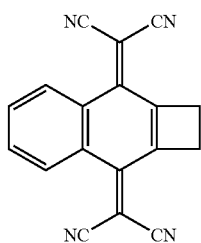
A-35 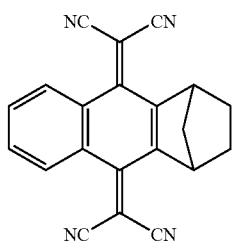

-continued
A-36 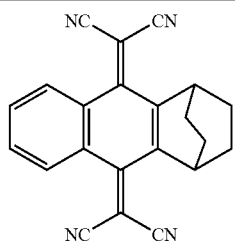
A-37 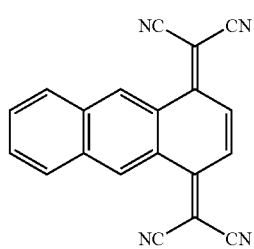
A-38 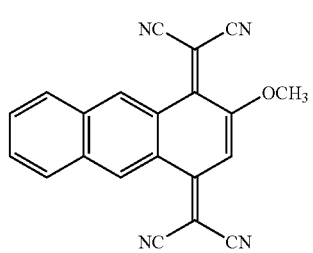
A-39 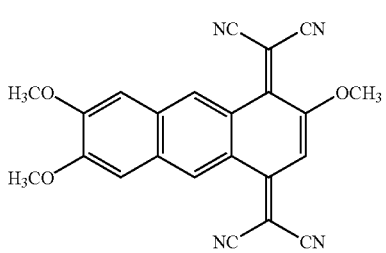
A-40 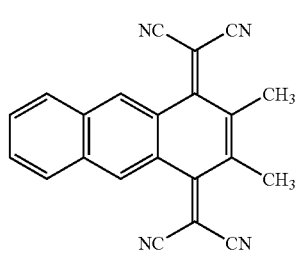
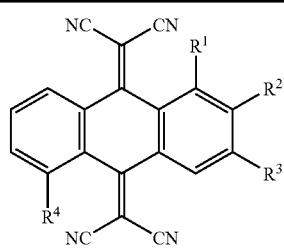
| No. | $R^1$ | $R^2$ | $R^3$ | $R^4$ |
|---|---|---|---|---|
| A-41 | H | H | H | H |
| A-42 | H | $CO_2CH_3$ | H | H |

-continued
A-43 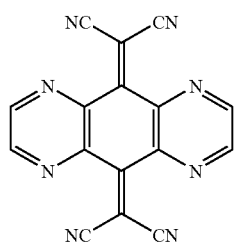
A-44 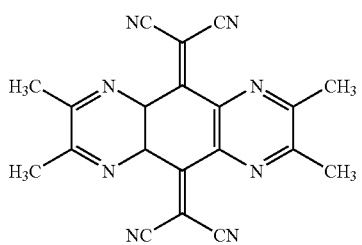
A-45 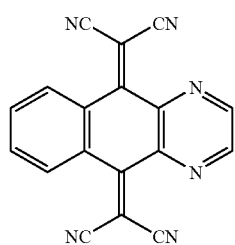
A-46 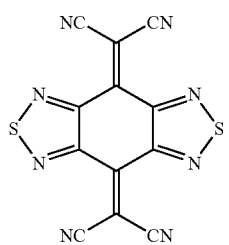
A-47 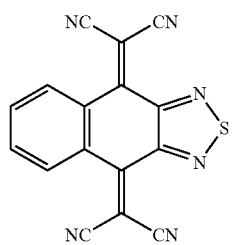
A-48 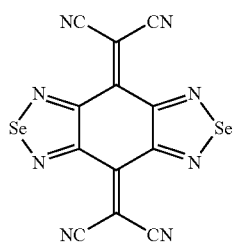

-continued

A-49 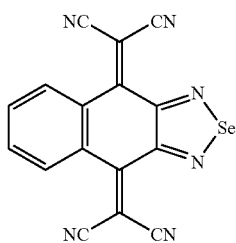

A-50 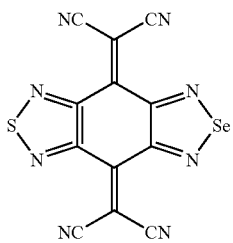

A-51 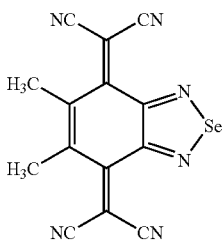

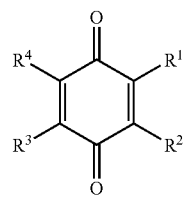

| No. | R$^1$ | R$^2$ | R$^3$ | R$^4$ |
|---|---|---|---|---|
| A-52 | Cl | Cl | Cl | Cl |
| A-53 | Cl | H | Cl | H |
| A-54 | F | F | F | F |
| A-55 | Cl | Cl | Cl | NHCOCH$_3$ |
| A-56 | Cl | Cl | Cl | 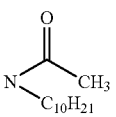 |
| A-57 | Cl | NHCOC$_5$H$_{11}$ | Cl | NHCOC$_5$H$_{11}$ |
| A-58 | Cl | NHCOC$_{11}$H$_{23}$ | Cl | NHCOC$_{11}$H$_{23}$ |
| A-59 | Cl | NHCONHC$_2$H$_5$ | Cl | NHCONHC$_2$H$_5$ |
| A-60 | Cl | NHSO$_2$CH$_3$ | Cl | NHSO$_2$CH$_3$ |
| A-61 | Cl | CO$_2$C$_2$H$_5$ | Cl | CO$_2$C$_2$H$_5$ |
| A-62 | Cl | CONHC$_8$H$_{17}$ | Cl | CONHC$_8$H$_{17}$ |
| A-63 | Cl | H | SC$_2$H$_5$ | H |
| A-64 | H | H | H | H |
| A-65 | CO$_2$C$_2$H$_5$ | CO$_2$C$_2$H$_5$ | CO$_2$C$_2$H$_5$ | CO$_2$C$_2$H$_5$ |
| A-66 | COC$_8$H$_{17}$ | COC$_8$H$_{17}$ | COC$_8$H$_{17}$ | COC$_8$H$_{17}$ |
| A-67 | CO$_2$C$_2$H$_5$ | H | CO$_2$C$_2$H$_5$ | H |
| A-68 | SC$_{12}$H$_{25}$ | H | H | H |
| A-69 | Cl | Cl | CN | CN |

-continued

A-70
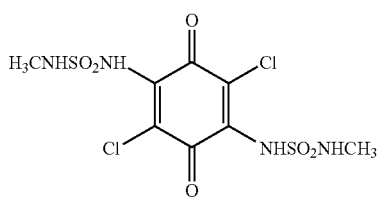

A-71
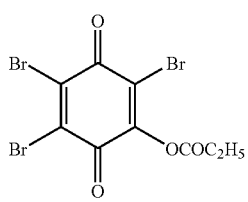

A-72
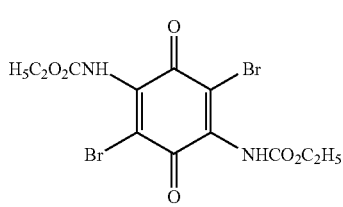

A-73
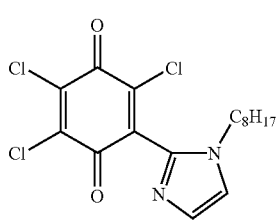

A-74
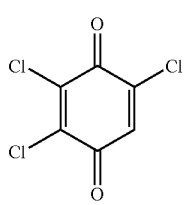

| No. | $R^1$ | $R^2$ | $R^3$ | $R^4$ |
|---|---|---|---|---|
| A-75 | $SO_2C_2H_5$ | $SO_2C_2H_5$ | $SO_2C_2H_5$ | $SO_2C_2H_5$ |
| A-76 | $SO_2C_2H_5$ | $SO_2C_2H_5$ | $SO_2C_2H_5$ | $OC_2H_5$ |
| A-77 | $SO_2C_2H_5$ | $OC_2H_5$ | $SO_2C_2H_5$ | $OC_2H_5$ |
| A-78 | $SO_2C_2H_5$ | H | $SO_2C_2H_5$ | H |
| A-79 | $C_2H_5$ | $SOC_2H_5$ | $SOC_2H_5$ | $SOC_2H_5$ |
| A-80 | $SO_2Ph$ | $SO_2Ph$ | $SO_2Ph$ | Cl |
| A-81 | $SO_2Ph$ | $SO_2Ph$ | CN | CN |
| A-82 | $SO_2Ph$ | $SO_2Ph$ | $SO_2Ph$ | $SO_2Ph$ |
| A-83 | $SCF_3$ | $SCF_3$ | $SCF_3$ | $SCF_3$ |
| A-84 | $SOCF_3$ | $SOCF_3$ | $SOCF_3$ | $SOCF_3$ |
| A-85 | $SO_2CF_3$ | $SO_2CF_3$ | $SO_2CF_3$ | $SO_2CF_3$ |
| A-86 | $SO_2CF_3$ | H | $SO_2CF_3$ | H |
| A-87 | H | H | $SO_2CF_3$ | H |
| A-88 | Cl | $SO_2CF_3$ | $SO_2CF_3$ | Cl |

A-89
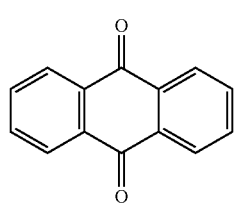

-continued
A-90
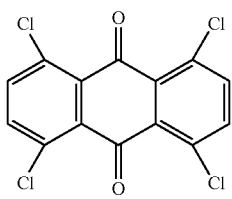
A-91
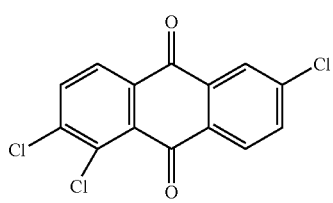
A-92
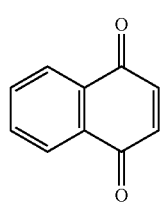
A-93
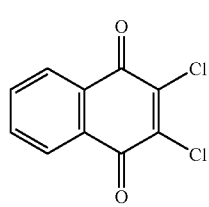
A-94
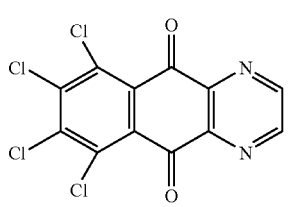
A-95
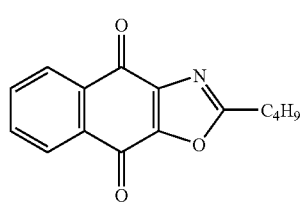
A-96
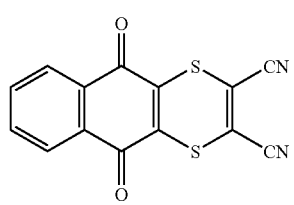

-continued
A-97
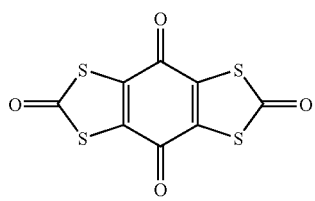
A-98
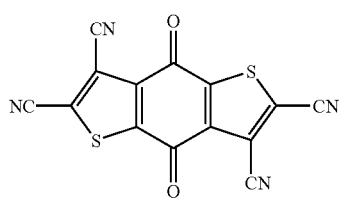
A-99
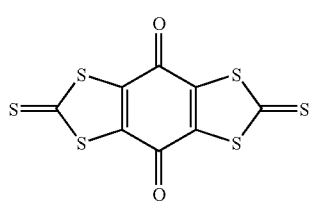
A-100
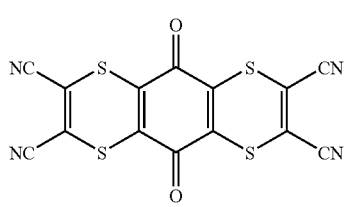
A-101
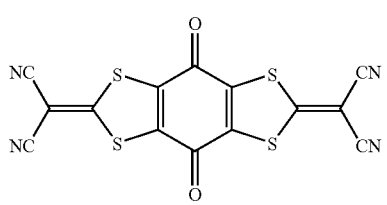
A-102
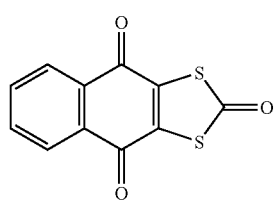
A-103
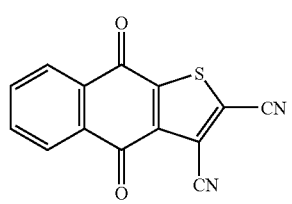

-continued
A-104 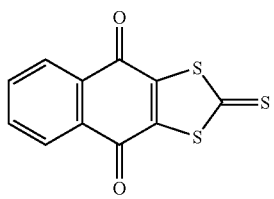
A-105 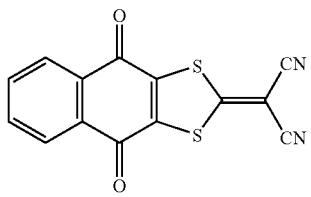
A-106 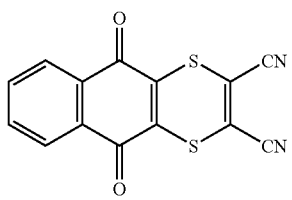
A-107 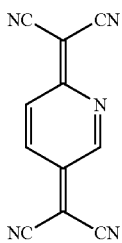
A-108 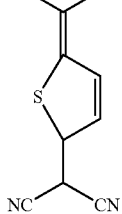
A-109 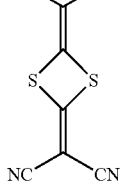
A-110 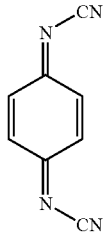

-continued
A-111 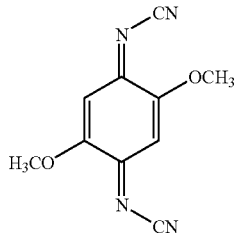
A-112 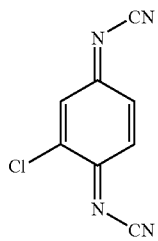
A-113 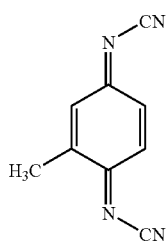
A-114 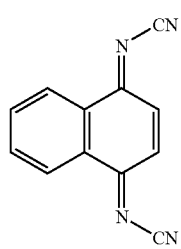
A-115 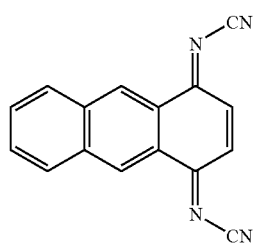
A-116 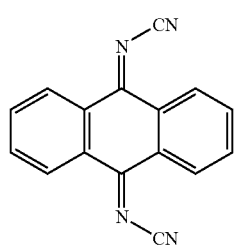

-continued
A-117 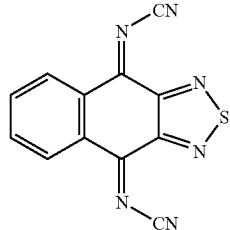
A-118 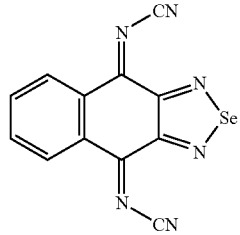
A-119 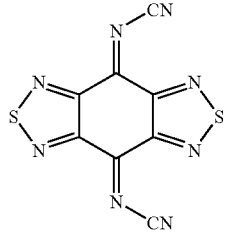
A-120 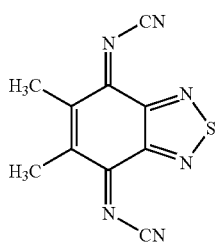
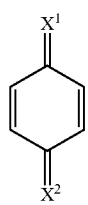
| No. | $X^1$ | $X^2$ |
| --- | --- | --- |
| A-121 | $NC_8H_{17}$ | $NC_8H_{17}$ |
| A-122 | $N^+(C_5H_{11})_2$ | O |
| A-123 | 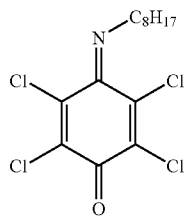 | |

-continued
A-124 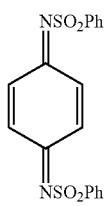
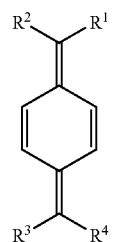
| No. | R¹ | R² | R³ | R⁴ |
|---|---|---|---|---|
| A-125 | CN | $CO_2CH_3$ | CN | $CO_2CH_3$ |
| A-126 | CN | $CO_2C_4H_9$ | CN | $CO_2C_4H_9$ |
| A-127 | CN | $CO_2C_{11}H_{23}$ | CN | $CO_2C_{11}H_{23}$ |
| A-128 | $CO_2C_2H_5$ | $CO_2C_2H_5$ | $CO_2C_2H_5$ | $CO_2C_2H_5$ |
| A-129 | $COCH_3$ | $COCH_3$ | $COCH_3$ | $COCH_3$ |
| A-130 | $SO_2C_2H_5$ | $SO_2C_2H_5$ | $SO_2C_2H_5$ | $SO_2C_2H_5$ |
| A-131 | Cl | Cl | CN | CN |
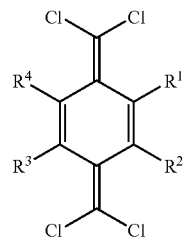
| No | R¹ | R² | R³ | R⁴ |
|---|---|---|---|---|
| A-132 | H | H | H | H |
| A-133 | Cl | Cl | Cl | Cl |
| A-134 | Cl | H | Cl | H |
A-135 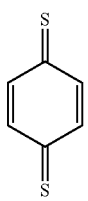
A-136 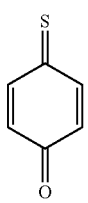

-continued
A-137 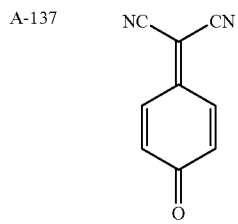
A-138 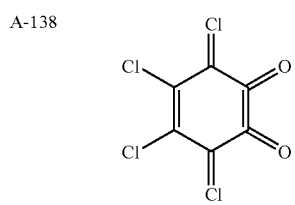
A-139 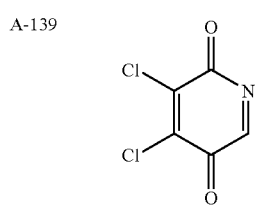
A-140 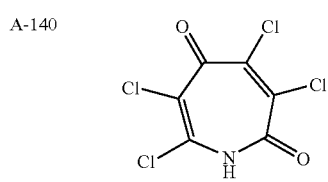
A-141 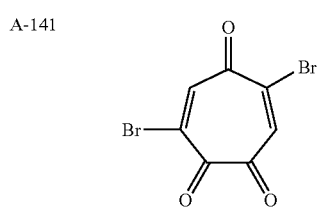
A-142 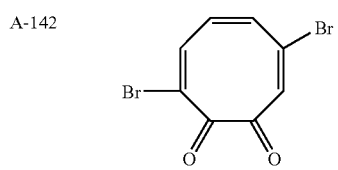
A-143 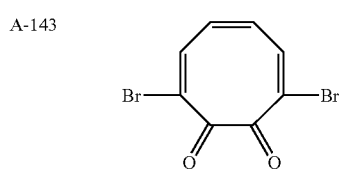
A-144 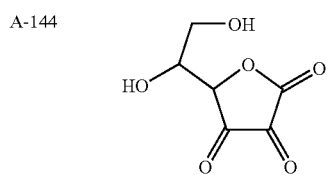

-continued

A-145 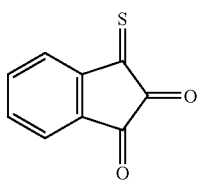

A-146 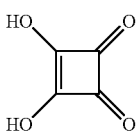

A-147 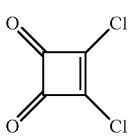

The compound represented by Formula (II-2) can be easily synthesized according to a general synthesis method described, for example, in *J. Chem. Soc. Perkin Trans.* 1, 611 (1992) and *Synthesis*, 546 (1971). Furthermore, the following synthesis example and a method according thereto may be employed.

Synthesis Example

The example compound (A-22) according to the invention was synthesized by the following scheme:

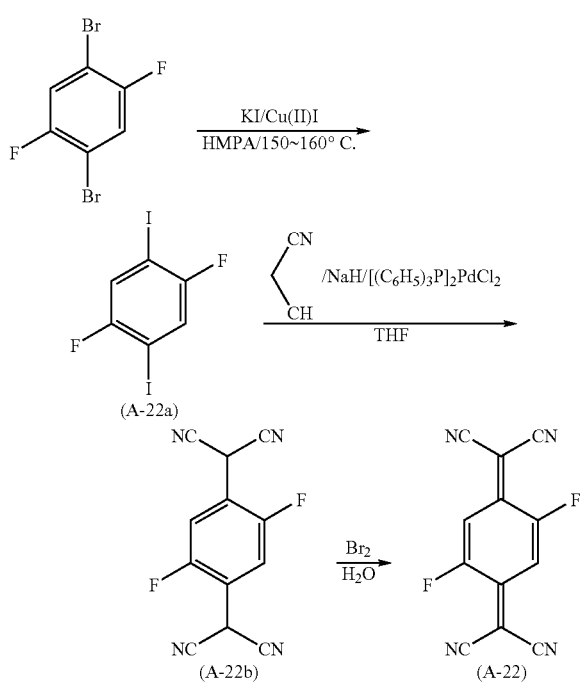

Synthesis of (A-22a)

Firstly, 2.72 g of 1,4-dibromo-2,5-difluorobenzene, 24.9 g of potassium iodide, 9.53 g of copper iodide and 30 ml of HMPA (hexamethylphosphoric triamide) were mixed, and heated to 150 to 160° C. in a nitrogen atmosphere. After completing the reaction, diluted aqueous hydrochloric acid and ether were poured into the reaction liquid, and after filtration of a copper salt, an organic layer was extracted. The organic layer was washed with aqueous sulfite, and after drying with sodium sulfate, the organic layer was filtered. The filtrate was concentrated under reduced pressure to obtain 2.93 g of (A-22a) as yellow crystals.

Synthesis of (A-22b)

Firstly, 60 ml of THF (tetrahydrofuran) was added to 3.66 g of (A-22a), 2.64 g of malononitrile, 1.44 g of sodium hydroxide and 0.21 g of bistriphenylphosphine palladium chloride, and then heated while being refluxed for 12 hours. After completing the reaction, the reaction liquid was poured into 1 N hydrochloric acid, and a white precipitate thus formed was filtered, followed by drying, to obtain 2.68 g of (A-22b) as a white solid.

Synthesis of (A-22)

Firstly, 100 ml of water was added to 3.36 g of (A-22b), and an excessive amount of bromine water was gradually added dropwise into the resulting suspension. After the mixture was allowed to stand overnight, the resulting red precipitate was filtered, and after washing with cold water, it was dissolved in 60 ml of methylene chloride. After the resulting solution was dried by use of sodium sulfate, it was treated with activated charcoal, and the solvent was distilled out to obtain 3.11 g of the objective example compound (A-22) as yellow crystals.

The example compound (A-58) according to the invention was synthesized by the following scheme:

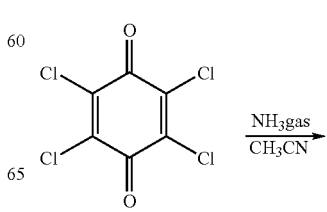

-continued

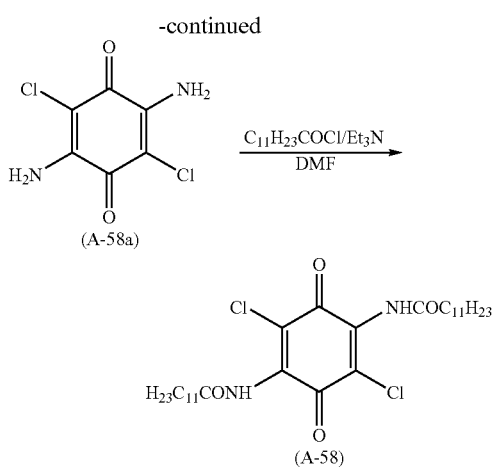

(A-58a)

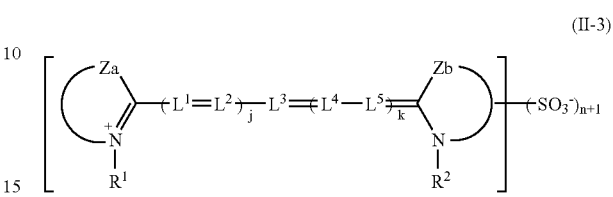

(A-58)

Synthesis of (A-58a)

Firstly, 25.0 g of chloranil was dissolved in 60 ml of acetonitrile, and an ammonia gas was continuously introduced into the resulting suspension. The resulting brown solid was filtered and washed with water and then with 100 ml of acetonitrile, and then dried under reduced pressure to obtain 19.6 g of (A-58a).

Synthesis of (A-58)

Firstly, 100 ml of DMF was added to 2.1 g of (A-58a), 4.4 g of laurylic acid chloride and 2.8 ml of triethylamine, and heated to 70° C. After heating for 7 hours, the reaction liquid was poured into 300 ml of cold water, and then extracted with ethyl acetate. After drying the resulting solution by use of sodium sulfate, it was concentrated and recrystallized from acetonitrile to obtain 1.7 g of the example compound (A-58) as yellow crystals.

The chemical species capable of quenching the fluorescence, which is represented by Formula (II-2) may be used singly or in combination with other known quenchers.

Representative examples of the other quenchers used in combination include the metallic complex, the diimmonium salt and the aminium salt represented by formulae (III), (IV) and (V) described in Japanese Unexamined Patent Publication No. 3(1991)-224793, and the nitroso compound shown in Japanese Unexamined Patent Publication No. 2(1990)-300287 and No. 2(1990)-300288. The quencher to be combined is particularly preferably a metallic complex (for example, PA-1006 (Mitsui Toatsu Finechemicals Co., Ltd.)) and a diimmonium salt (for example, IRG-023 and IRG-022 (Nippon Kayaku Co., Ltd.)), and most preferably a diimmonium salt. These quenchers may be used in combination of two or more thereof, depending on the object.

The addition amount of the chemical species capable of quenching the fluorescence, which is represented by Formula (II-2), is preferably in the range of from 1 to 100 parts by weight per 100 parts by weight of the chemical species capable of producing the fluorescence, more preferably from 1 to 50 parts by weight, particularly preferably from 1 to 25 parts by weight, and most preferably from 1 to 10 parts by weight.

The addition amount of the other quencher is preferably in the range of from 1 to 100 parts by weight per 100 parts by weight of the chemical species capable of producing the fluorescence, more preferably from 1 to 50 parts by weight, particularly preferably from 1 to 25 parts by weight, and most preferably from 1 to 10 parts by weight.

Another preferable combination of the chemical species represented by Formula (II) is the combination, in which the chemical species [FL] is an anion represented by Formula (II-3) shown below, and the chemical species [Q] is a cation represented by Formula (II-4), which will be described later. The anion is represented by Formula (II-3) shown below.

(II-3)

$$\left[ \begin{array}{c} Za \\ \diagup \\ +N \\ | \\ R^1 \end{array} \!\!\!\!=\!\! (L^1\!\!=\!\!L^2)_j\!\!-\!\!L^3\!\!=\!\!L^4\!\!-\!\!(L^5)_k\!\!\!\!\begin{array}{c} Zb \\ \diagdown \\ N \\ | \\ R^2 \end{array} \right]\!\!-\!\!(SO_3^-)_{n+1}$$

wherein Za and Zb each independently represent an atom group necessary for forming a five-membered or six-membered, nitrogen-containing heterocyclic ring; $R^1$ and $R^2$ each independently represent an alkyl group or an aryl group; $L^1$, $L^2$, $L^3$, $L^4$, and $L^5$ each independently represent a substituted or unsubstituted methine group, provided that, in cases where $L^1$ to $L^5$ are substituted by substituents, the substituents may optionally be connected with one another to form a ring; n represents an integer of at least 1; j represents 0, 1, or 2; and k represents 0 or 1.

Examples of the five-membered or six-membered nitrogen-containing heterocyclic ring (nucleus) represented by Za and Zb include a thiazole nucleus, a benzothiazole nucleus, a naphthothiazolenucleus, a thiazoline nucleus, an oxazole nucleus, a benzoxazole nucleus, a naphthoxazole nucleus, an oxazoline nucleus, a selenazole nucleus, a benzoselenazole nucleus, a naphthoselenazole nucleus, a selenazoline nucleus, a tellurazole nucleus, a benzotellurazole nucleus, a naphthotellurazole nucleus, a tellurazoline nucleus, an imidazole nucleus, a benzoimidazole nucleus, a naphthoimidazole nucleus, a pyridine nucleus, a quinoline nucleus, an isoquinoline nucleus, an imidazo [4,5-b] quinoxaline nucleus, an oxadiazole nucleus, a thiadiazole nucleus, a tetrazole nucleus, and a pyrimidine nucleus.

Among these, a benzothiazole nucleus, an imidazole nucleus, a naphthoimidazole nucleus, a quinoline nucleus, an isoquinoline nucleus, an imidazo [4,5-b] quinoxaline nucleus, a thiadiazole nucleus, a tetrazole nucleus, and a pyrimidine nucleus are preferred.

These rings may have a benzene ring or a naphthoquinone ring condensed therewith.

The five-membered or six-membered nitrogen-containing heterocyclic ring may have a substituent. Preferred examples of the substituent include a halogen atom, a substituted or unsubstituted alkyl group, and an aryl group. As a halogen atom, a chlorine atom is preferred. As an alkyl group, a straight-chain alkyl group having from 1 to 6 carbon atoms is preferred. Examples of the substituent on the alkyl group include an alkoxy group (such as methoxy) and an alkylthio group (such as methylthio). As an aryl group, a phenyl group is preferred.

The alkyl group represented by $R^1$ and $R^2$ may have a substituent. Preferred examples thereof include a straight-chain, cyclic or branched alkyl group having from 1 to 18 (more preferably from 1 to 8, and particularly from 1 to 6) carbon atoms.

The aryl group represented by $R^1$ and $R^2$ may have a substituent, and is preferably an aryl group having from 6 to 18 carbon atoms, which may have a substituent.

Preferred examples of the substituent of the alkyl group or the aryl group represented by $R^1$ and $R^2$ include a substituted or unsubstituted aryl group having from 6 to 18 carbon atoms (such as phenyl, chlorophenyl, anisyl, toluyl, 2,4-di-t-amyl, and 1-naphthyl), an alkenyl group (such as vinyl and 2-methylvinyl), an alkynyl group (such as ethynyl, 2-methylethynyl, and 2-phenylethynyl), a halogen atom (such as F, Cl, Br, and I), a cyano group, a hydroxyl group, a carboxyl group, an acyl group (such as acetyl, benzoyl, salicyloyl, and pivaloyl), an alkoxy group (such as methoxy, butoxy, and cyclohexyloxy), an aryloxy group (such as phenoxy and 1-naphthoxy), an alkylthio group (such as methylthio, butylthio, benzylthio, and 3-methoxypropylthio), an arylthio group (such as phenylthio and 4-chlorophenylthio), an alkylsulfonyl group (such as methanesulfonyl and butanesulfonyl), an arylsulfonyl group (such as benzensulfonyl and paratoluenesulfonyl), a carbamoyl group having from 1 to 10 carbon atoms, an amido group having from 1 to 10 carbon atoms, an acyloxy group having from 2 to 10 carbon atoms, an alkoxycarbonyl group having from 2 to 10 carbon atoms, a heterocyclic group (such as a heterocyclic aromatic ring, e.g., pyridyl, thienyl, furyl, thiazolyl, imidazolyl and pyrazolyl, and an aliphatic heterocyclic ring, e.g., a pyrrolidine ring, a piperidine ring, a morphorine ring, a pyran ring, a thiopyran ring, a dioxane ring and a dithiolane ring)

In the invention, $R^1$ and $R^2$ are each preferably a straight-chain alkyl group having from 1 to 8 (preferably from 1 to 6, and particularly from 1 to 4) carbon atoms having, as a substituent, an unsubstituted straight-chain alkyl group having from 1 to 8 (preferably from 1 to 6, and particularly from 1 to 4) carbon atoms, an unsubstituted alkoxy group (particularly methoxy), or an unsubstituted alkylthio group (particularly methylthio).

The methine group represented by $L^1$ to $L^5$ may have a substituent. Preferred examples of the substituent include an alkyl group having from 1 to 18 carbon atoms, an aralkyl group, and those exemplified as the preferred examples of the substituent for the alkyl group or the aryl group represented by $R^1$ and $R^2$. Among these, an alkyl group (such as methyl), an aryl group (such as phenyl), a halogen atom (such as Cl and Br), and an aralkyl group (such as benzyl) are preferred.

In the invention, j and k are preferably each independently 0 or 1.

The substituents on $L^1$ to $L^5$ may be connected to form a ring. The ring is preferably a five-membered ring or a six-membered ring, and two or more of the rings may be condensed with each other. The positions at which the rings are connected are different depending on the number of the methine chain. For example, in the case where the methine chain formed with $L^1$ to $L^5$ is a pentamethine chain, the preferred connecting positions are $L^1$ and $L^3$, $L^2$ and $L^4$, and $L^3$ and $L^5$. The connecting position in the case of forming a double condensed ring is preferably $L^1$, $L^3$ and $L^5$. In this case, $L^1$ and $R^1$, $L^5$ and $R^2$, and $L^3$ and $R^2$ may each be connected to form a ring, which is preferably a five-membered ring or a six-membered ring.

In the invention, the ring formed with the substituents on $L^1$ to $L^5$ is preferably a cyclohexene ring.

Among the anions represented by Formula (II-3), an anion represented by Formula (II-3-1) is more preferred.

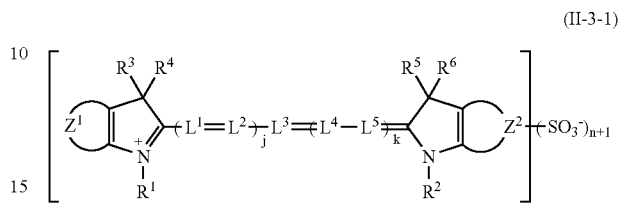

(II-3-1)

wherein $Z^1$ and $Z^2$ each independently represent an atomic group for forming an indolenine nucleus or a benzoindolenine nucleus; $R^1$ and $R^2$ each independently represent an alkyl group or an aryl group, $R^3$, $R^4$, $R^5$ and $R^6$ each independently represent an alkyl group; $L^1$, $L^2$, $L^3$, $L^4$ and $L^5$ each independently represent a substituted or unsubstituted methine group (provided that when $L^1$ to $L^5$ have substituents, they may be connected to form a ring); n represents an integer of at least 1; j represents 0, 1 or 2; and k represents 0 or 1.

The indolenine nucleus or the benzoindolenine nucleus represented by $Z^1$ and $Z^2$ may have a substituent. Examples of the substituent (atom) include a halogen atom and an aryl group. As a halogen atom, a chlorine atom is preferred. As an aryl group, a phenyl group is preferred.

The alkyl group represented by $R^3$, $R^4$, $R^5$ and $R^6$ is preferably a straight-chain, branched or cyclic alkyl group having from 1 to 18 carbon atoms. $R^3$ and $R^4$, $R^5$ and $R^6$ may be connected to each other to form a ring.

The alkyl group represented by $R^3$, $R^4$, $R^5$ and $R^6$ may have a substituent. Preferred examples of the substituent include those exemplified as the preferred substituents for the alkyl group or the aryl group represented by $R^1$ and $R^2$.

In the invention, the alkyl group represented by $R^3$, $R^4$, $R^5$ and $R^6$ is preferably a straight-chain unsubstituted alkyl group having from 1 to 6 carbon atoms (particularly methyl and ethyl).

In Formula (II-3-1), $R^1$, $R^2$, $L^1$, $L^2$, $L^3$, $L^4$, $L^5$, j, k, and n have the same meanings as those in Formula (II-3). Preferred examples thereof are also the same as those in Formula (II-3).

The $(SO_3^-)$ group in $-(SO_3^-)_{n+1}$ is preferably connected to the end of $R^1$ and $R^2$ in Formula (II-3) and Formula (II-3-1).

Specific examples in Formula (II-3) will be listed below.

A-1

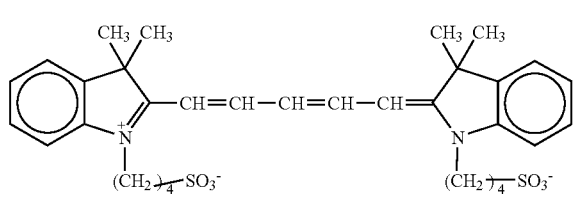

A-2

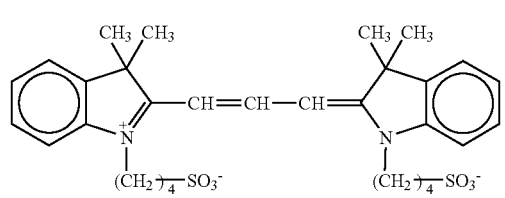

-continued
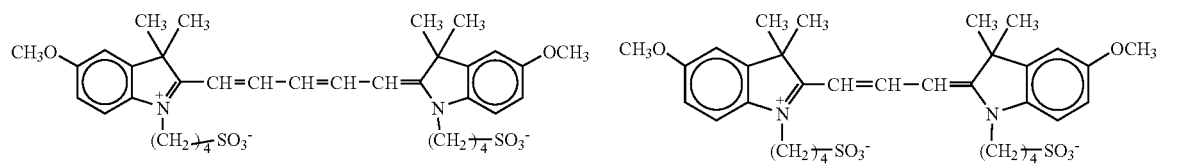
A-3
A-4
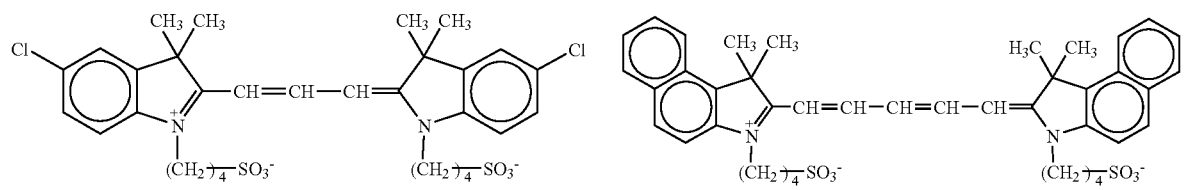
A-5
A-11
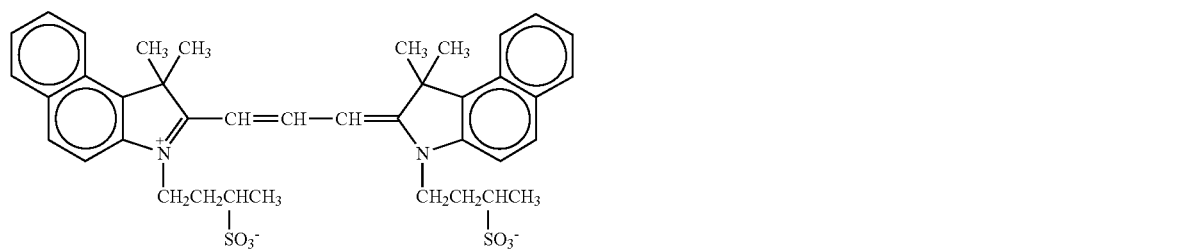
A-12
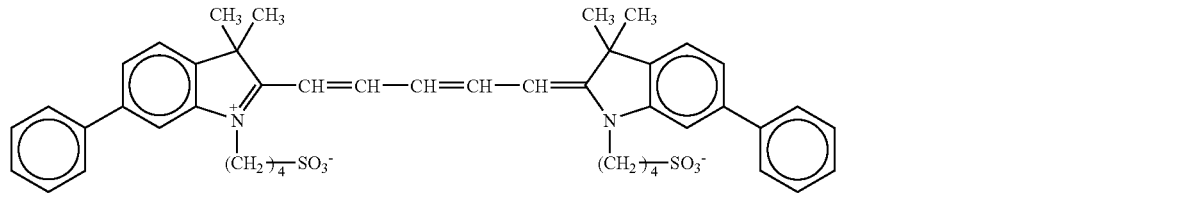
A-13
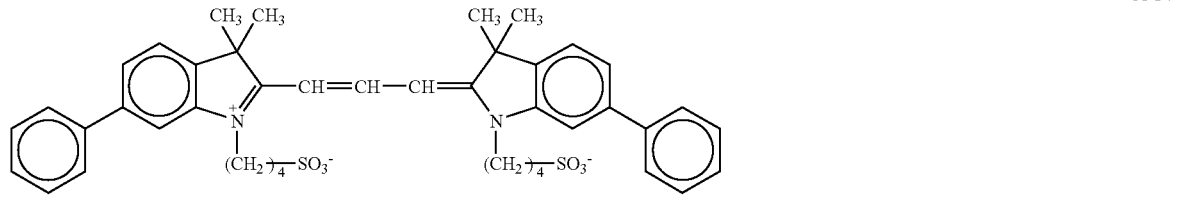
A-14
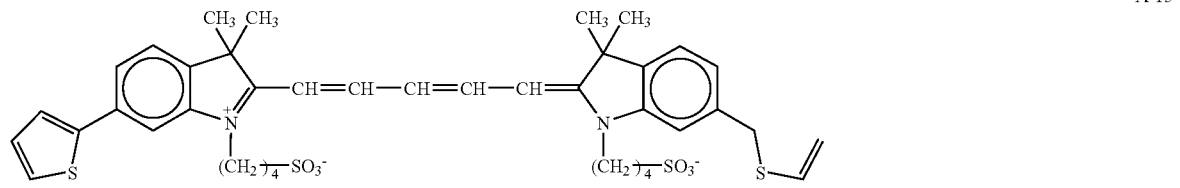
A-15
A-16
A-17

-continued
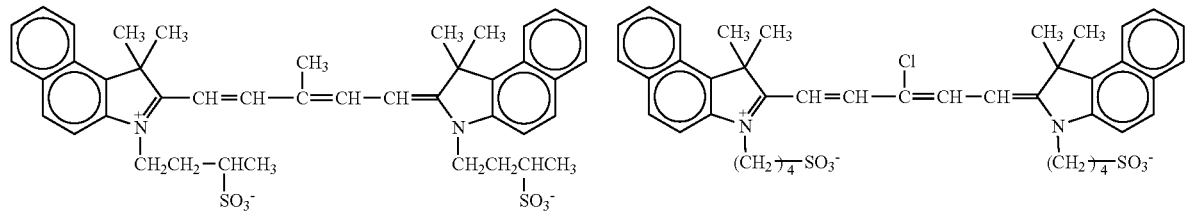
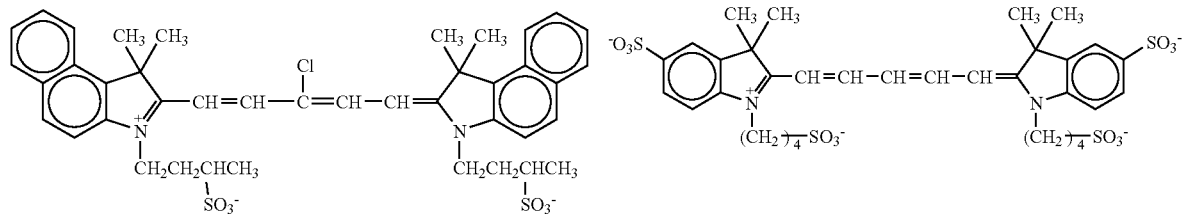
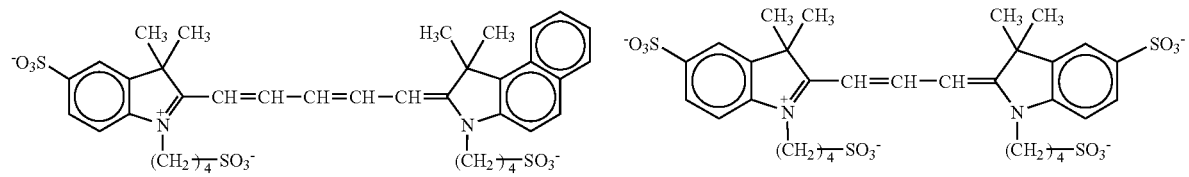
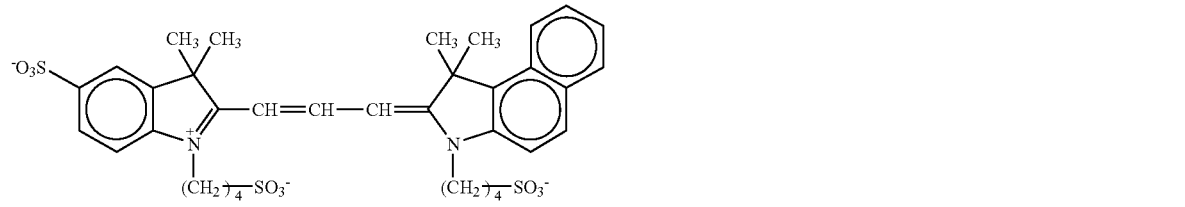
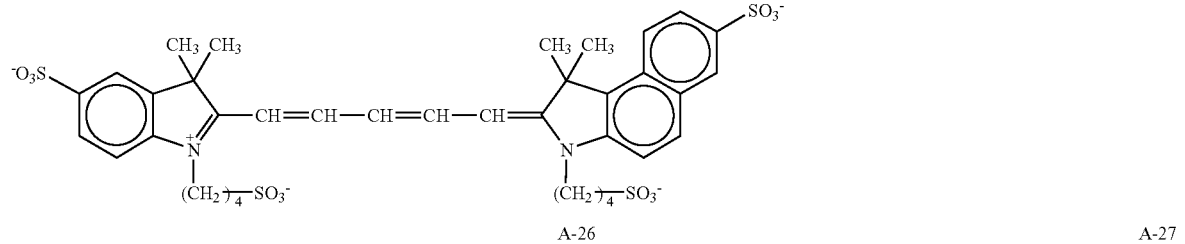
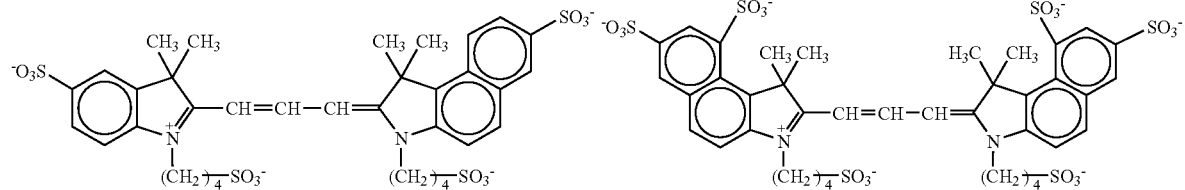
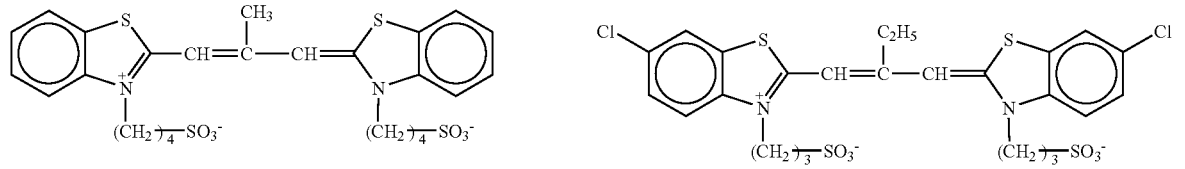

-continued
A-30
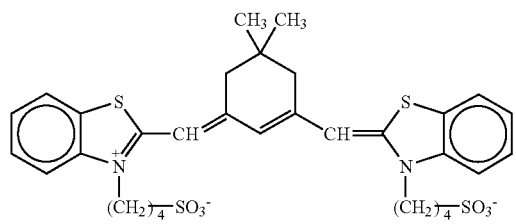
A-31
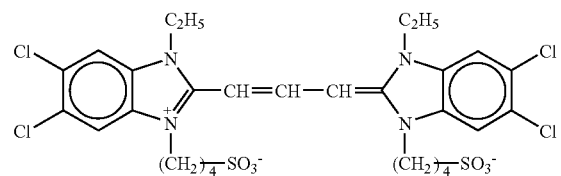
A-32
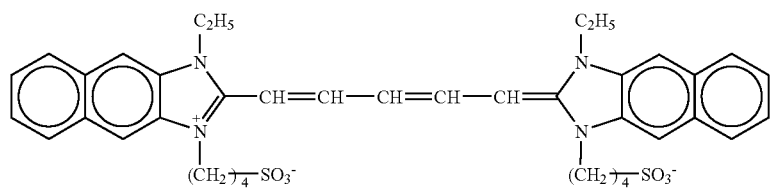
A-33
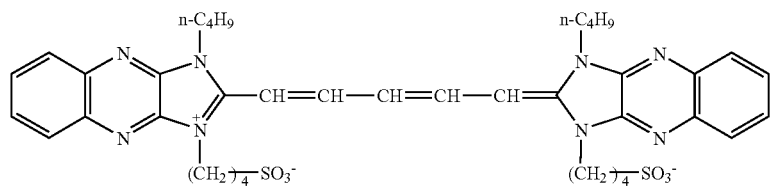
A-34
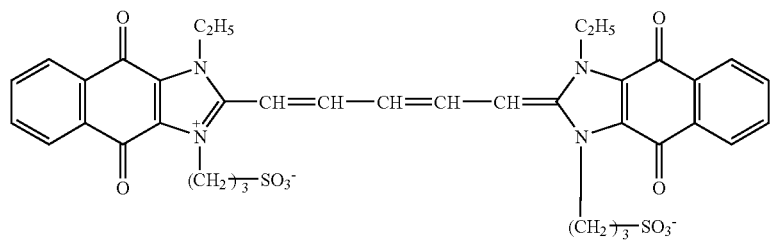
A-35
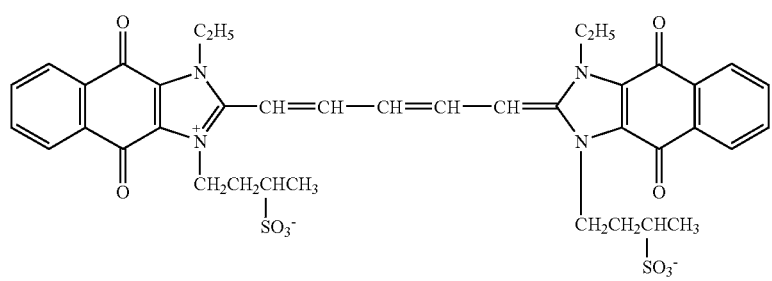
A-36
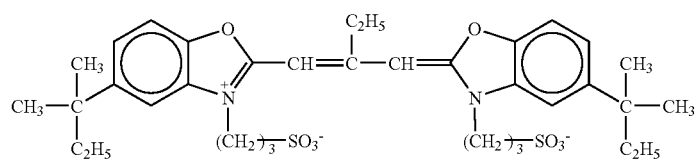
A-37
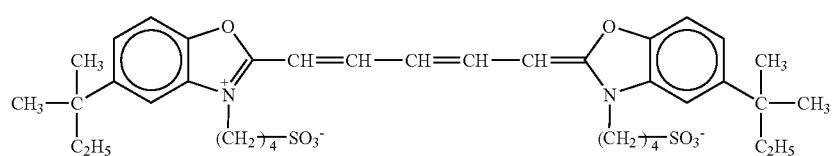

-continued

A-38

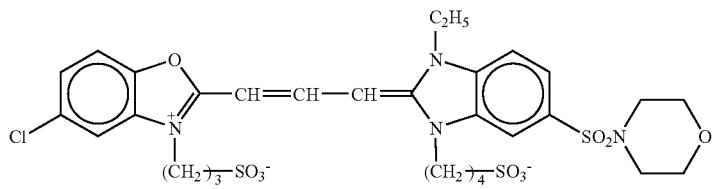

The cation represented by Formula (II-4) will be described hereinbelow. The cation is represented by the formula shown below.

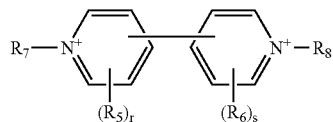

(II-4)

wherein $R_5$ and $R_6$ each independently represent a substituent group; $R_7$ and $R_8$ each independently represent an alkyl group, an alkenyl group, an alkynyl group, an aralkyl group, an aryl group or a heterocyclic group, provided that $R_5$ and $R_6$, $R_5$ and $R_7$, $R_6$ and $R_8$, or $R_7$ and $R_8$ may be connected with each other to form a ring; and r and s each independently represent an integer of 0 to 4, provided that, in cases where r and s each represent an integer of at least 2, the at least two substituents $R_5$ may be identical or different, and the at least two substituents $R_6$ may be identical or different.

As the alkyl group represented by $R_7$ and $R_8$, a substituted or unsubstituted alkyl group having from 1 to 18 carbon atoms is preferred, and more preferably a substituted or unsubstituted alkyl group having from 1 to 8 carbon atoms. The alkyl group may be straight-chain, branched or cyclic. Examples thereof include methyl, ethyl, n-propyl, isopropyl, n-butyl, isobutyl, t-butyl, n-hexyl, neopentyl, cyclohexyl, adamantyl, and cyclopropyl.

Examples of the substituent for the alkyl group include the following:

a substituted or unsubstituted alkenyl group having from 2 to 18 carbon atoms (preferably from 2 to 8 carbon atoms) (such as vinyl);

a substituted or unsubstituted alkynyl group having from 2 to 18 carbon atoms (preferably from 2 to 8 carbon atoms) (such as ethynyl);

a substituted or unsubstituted aryl group having from 6 to 10 carbon atoms (such as phenyl and naphthyl);

a halogen atom (such as F, Cl and Br);

a substituted or unsubstituted alkoxy group having from 1 to 18 carbon atoms (preferably from 1 to 8 carbon atoms) (such as methoxy and ethoxy);

a substituted or unsubstituted aryloxy group having from 6 to 10 carbon atoms (such as phenoxy and p-methoxyphenoxy);

a substituted or unsubstituted alkylthio group having from 1 to 18 carbon atoms (preferably from 1 to 8 carbon atoms) (such as methyltho and ethylthio);

a substituted or unsubstituted arylthio group having from 6 to 10 carbon atoms (such as phenylthio);

a substituted or unsubstituted acyl group having from 2 to 18 carbon atoms (preferably from 2 to 8 carbon atoms) (such as acetyl and propyonyl);

a substituted or unsubstituted alkylsulfonyl group or arylsulfonyl group having from 1 to 18 carbon atoms (preferably from 1 to 8 carbon atoms) (such as methanesulfonyl and p-toluenesulfonyl);

a substituted or unsubstituted acyloxy group having from 2 to 18 carbon atoms (preferably 2 to 8 carbon atoms) (such as acetoxy and propionyloxy);

a substituted or unsubstituted alkoxycarbonyl group having from 2 to 18 carbon atoms (preferably from 2 to 8 carbon atoms) (such as methoxycarbonyl and ethoxycarbonyl);

a substituted or unsubstituted aryloxycarbonyl group having from 7 to 11 carbon atoms (such as naphthoxycarbonyl);

an unsubstituted amino group, or a substituted amino group having from 1 to 18 carbon atoms (preferably from 1 to 8 carbon atoms) (such as methylamino, dimethylamino, diethylamino, anilino, methoxyphenylamino, chlorophenylamino, pyridylamino, methoxycarbonylamino, n-butoxycarbonylamino, phenoxycarbonylamino, methylcarbamoylamino, ethylthiocarbamoylamino, phenylcarbamoylamino, acetylamino, ethylcarbonylamino, ethylthiocarbamoylamino, cyclohexylcarbonylamino, benzoylamino, chloroacetylamino, and methylsulfonylamino);

a substituted or unsubstituted carbamoyl group having from 1 to 18 carbon atoms (preferably from 1 to 8 carbon atoms) (such as unsubstituted carbamoyl, methylcarbamoyl, ethylcarbamoyl, n-butylcarbamoyl, t-butylcarbamoyl, dimethylcarbamoyl, morpholinocarbamoyl, and pyrrolidinocarbamoyl);

an unsubstituted sulfamoyl group, or a substituted sulfamoyl group having from 1 to 18 carbon atoms (preferably from 1 to 8 carbon atoms) (such as methylsulfamoyl and phenylsulfamoyl);

a cyano group, a nitro group, a carboxyl group, and a hydroxyl group; and a heterocyclic group (such as an oxazole ring, a benzoxazole ring, a thiazole ring, a benzothiazole ring, an imidazole ring, a benzoimidazole ring, an indolenine ring, a pyridine ring, a piperidine ring, a pyrrolidine ring, a morphorine ring, a sulfolane ring, a furan ring, a thiophene ring, a pyrazole ring, a pyrrole ring, a chroman ring, and a coumarin ring).

As the alkenyl group represented by $R_7$ and $R_8$, a substituted or unsubstituted alkenyl group having from 2 to 18 carbon atoms, and more preferably a substituted or unsubstituted alkenyl group having from 2 to 8 carbon atoms, such as vinyl, allyl, 1-propenyl, and 1,3-butadienyl is used.

As the substituent for the alkenyl group, those exemplified above as the substituents for the alkyl group are preferred.

As the alkynyl group represented by $R_7$ and $R_8$, a substituted or unsubstituted alkynyl group having from 2 to 18 carbon atoms, and more preferably a substituted or unsubstituted alkynyl group having from 2 to 8 carbon atoms, such as ethynyl and 2-propynyl is used.

As the substituent for the alkynyl group, those exemplified above as the substituents for the alkyl group are preferred.

As the aralkyl group represented by $R_7$ and $R_8$, a substituted or unsubstituted aralkyl group having from 7 to 18 carbon atoms, such as benzyl and methylbenzyl are preferred.

As the aryl group represented by $R_7$ and $R_8$, a substituted or unsubstituted aryl group having from 6 to 18 carbon atoms, such as phenyl or naphthyl, is preferred.

As the substituent for the aryl group, those exemplified above as the substituents for the alkyl group are preferred. In addition to these, an alkyl group (such as methyl and ethyl) is also preferred.

The heterocyclic group represented by $R_7$ and $R_8$ includes a saturated or unsaturated five-membered or six-membered heterocyclic ring constituted with a carbon atom, a nitrogen atom, an oxygen atom or a sulfur atom, and examples thereof include an oxazole ring, a benzoxazole ring, a thiazole ring, a benzothiazole ring, an imidazole ring, a benzoimidazole ring, an indolenine ring, a pyridine ring, a piperidine ring, a pyrrolidine ring, a morphorine ring, a sulfolane ring, a furan ring, a thiophene ring, a pyrazole ring, a pyrrole ring, a chroman ring, and a coumarin ring. The heterocyclic group may have a substituent, and as the substituent in this case, those exemplified above as the substituents for the alkyl group are preferred.

The substituent represented by $R_5$ and $R_6$ is the same as those exemplified as the substituents for the alkyl group. In addition to these, an alkyl group (such as methyl and ethyl) is also exemplified.

In the invention, the substituent represented by $R_5$ and $R_6$ is preferably a hydrogen atom or an alkyl group, and particularly preferably a hydrogen atom.

The partial structure represented by Formula (II-4) is particularly preferably the one represented by Formula (II-4-1) or (II-4-2) shown below.

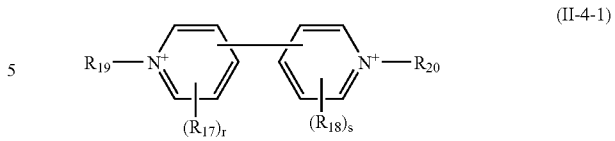
(II-4-1)

wherein $R_{17}$ and $R_{18}$ have the same meanings as the substituents represented by $R_5$ and $R_6$ described above, and the preferred scopes thereof are also the same; $R_{19}$ and $R_{20}$ have the same meanings as the substituents represented by $R_7$ and $R_8$, and the preferred scopes thereof are also the same; and r and s each independently represent an integer of from 0 to 4, provided that when r and s are 2 or more, plural groups represented by r and s may be the same or different.

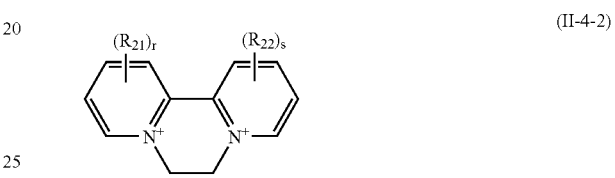
(II-4-2)

wherein $R_{21}$ and $R_{22}$ have the same meanings as the substituents represented by $R_5$ and $R_6$ described above, and the preferred scopes thereof are also the same, $R_{21}$ and $R_{22}$ are preferred to be connected to each other to form a carbon ring or a heterocyclic ring, and are particularly preferred to be a condensed aromatic ring combined with the pyridine ring, to which $R_{21}$ and $R_{22}$ are connected; and r and s each independently represent an integer of from 0 to 4, provided that when r and s are 2 or more, plural groups represented by r and s may be the same or different.

Specific examples of the part represented by Formula (II-4) in the compound represented by Formula (II) used in the invention will be listed below.

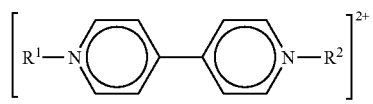

| No. | $R^1$ | $R^2$ |
|---|---|---|
| B-1 | $CH_3$ | $CH_3$ |
| B-2 | $C_2H_5$ | $C_2H_5$ |
| B-3 | $n\text{-}C_3H_7$ | $n\text{-}C_3H_7$ |
| B-4 | $n\text{-}C_4H_9$ | $n\text{-}C_4H_9$ |
| B-5 | $iso\text{-}C_4H_9$ | $iso\text{-}C_4H_9$ |
| B-6 | $n\text{-}C_6H_{13}$ | $n\text{-}C_6H_{13}$ |
| B-7 | $—C(CH_3)_3$ | $—C(CH_3)_3$ |
| B-8 | $—CH_2CH_2C(CH_3)_3$ | $—CH_2CH_2C(CH_3)_3$ |
| B-9 | $CH_2=CH$ | $CH_2=CH$ |
| B-10 | $NCCH_2$ | $NCCH_2$ |
| B-11 | $EtO_2C—CH_2$ | $EtO_2C—CH_2$ |
| B-12 | $HOCH_2CH_2$ | $HOCH_2CH_2$ |
| B-13 | $EtOCH_2CH_2$ | $EtOCH_2CH_2$ |
| B-14 | cyclohexyl | cyclohexyl |
| B-15 | $CH_3$ | $PhCH_2$ |

-continued

| | | |
|---|---|---|
| B-16 | CH₃COCH₂ | CH₃COCH₂ |
| B-17 | (1-methyladamantyl) | (1-methyladamantyl) |
| B-18 | CF₃CH₂ | CF₃CH₂ |
| B-19 | Ph | Ph |
| B-20 | CH₃-C₆H₄- | CH₃-C₆H₄- |
| B-21 | CH₃O-C₆H₄- | CH₃O-C₆H₄- |
| B-22 | F-C₆H₄- | F-C₆H₄- |
| B-23 | NC-C₆H₄- | NC-C₆H₄- |
| B-24 | O₂N-C₆H₄- (meta) | O₂N-C₆H₄- (meta) |

B-25: [1,1'-dimethyl-3,3'-dimethyl-4,4'-bipyridinium]²⁺

B-26: [ethylene-bridged 2,2'-bipyridinium]²⁺

B-27: [ethylene-bridged 6,6'-dimethyl-2,2'-bipyridinium]²⁺

B-28: [ethylene-bridged 1,10-phenanthrolinium]²⁺

-continued
B-29 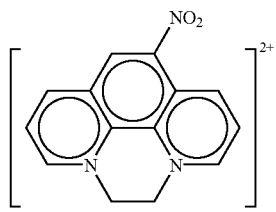
B-30 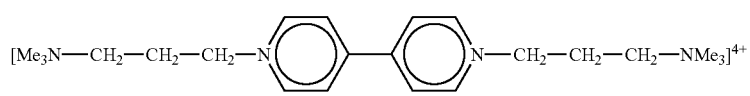
B-31 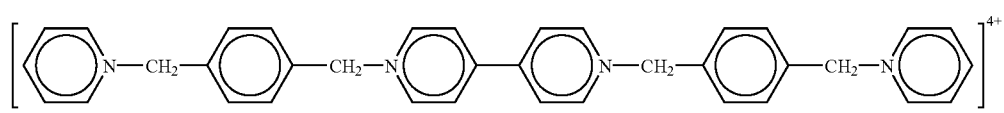
B-32 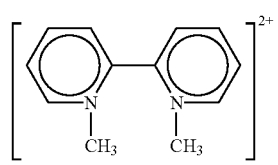
B-33 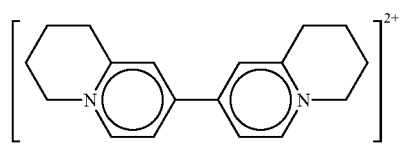
B-34 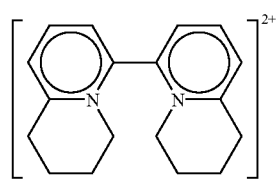
B-35 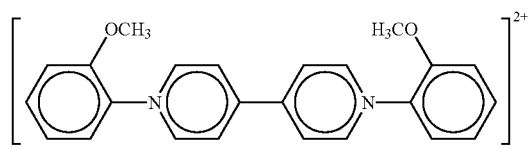
B-36 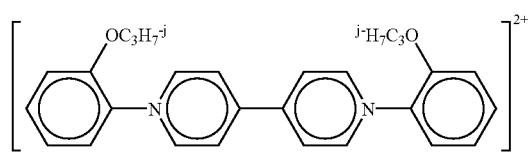
B-37 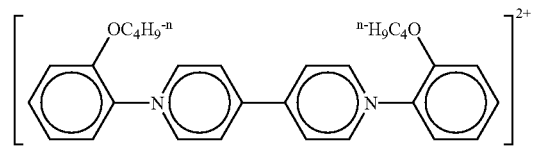
B-38 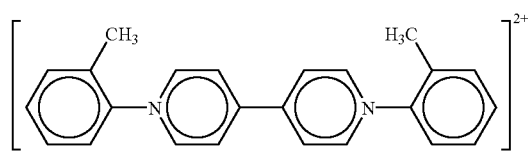

-continued
B-39 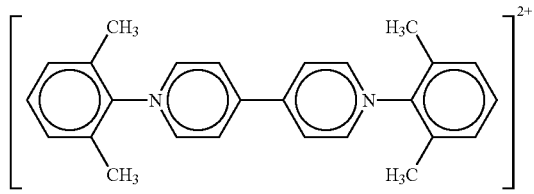
B-40 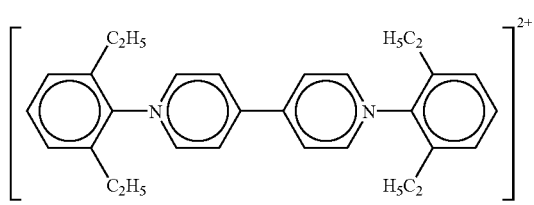
B-41 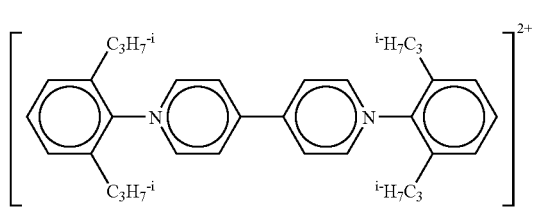
B-42 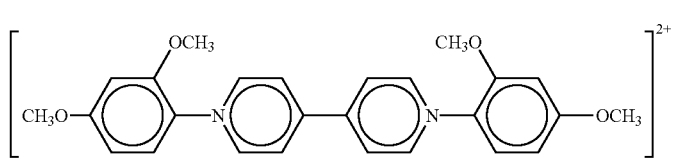
B-43 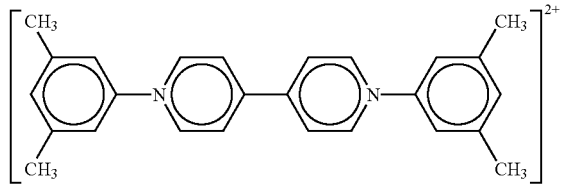
B-44 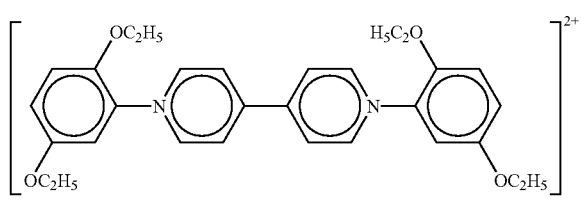
B-45 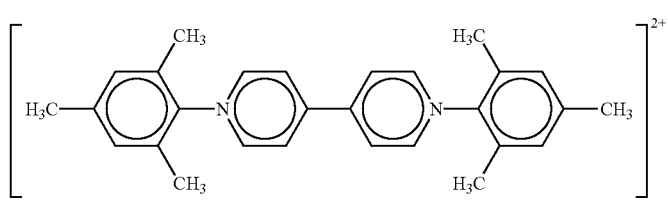
B-46 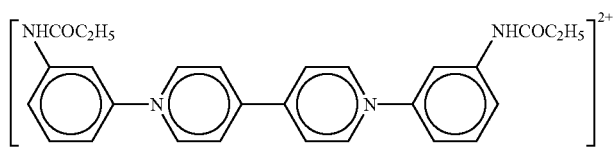

-continued
B-47 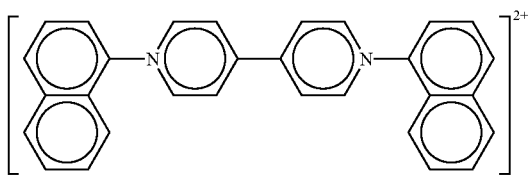
B-48 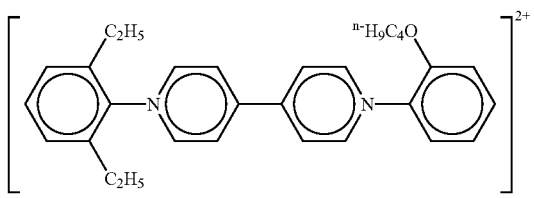
B-49 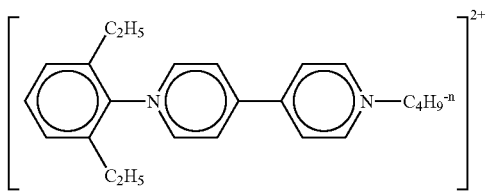
B-50 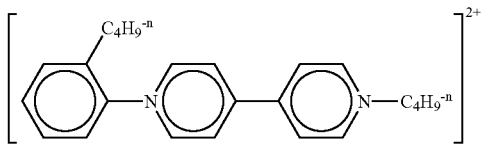
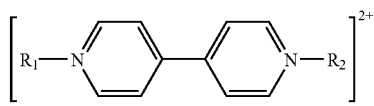
| No. | $R_1$ |
|---|---|
| B-51 | iso-$C_5H_{11}$ |
| B-52 | 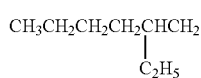 |
| B-53 | 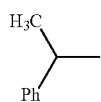 |
| B-54 | $PhCH_2CH_2$ |
| B-55 | 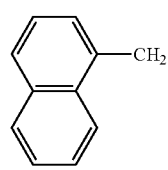 |
| B-56 | 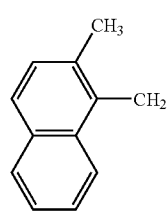 |

-continued
| | | |
|---|---|---|
| B-57 | | 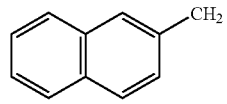 |
| B-58 | | 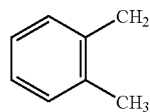 |
| B-59 | | 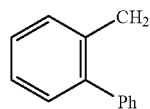 |
| B-60 | | CH$_2$=CH—CH$_2$ |
| B-61 | | 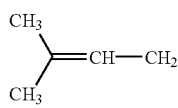 |
| B-62 | | 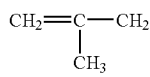 |
| B-63 | | Ph$_3$C |
| B-64 | | 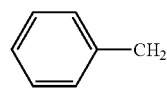 |
| B-65 | | CH≡C—CH$_2$ |
| B-66 | | CH$_3$SO$_2$CH$_2$CH$_2$ |
| B-67 | | 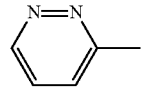 |
| B-68 | | 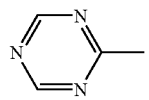 |
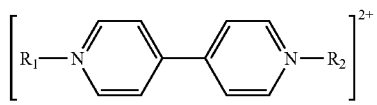
| No. | R$_1$ | R$_2$ |
|---|---|---|
| B-69 | 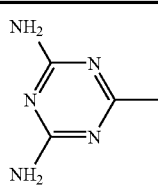 | 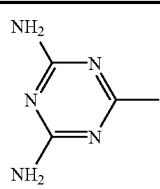 |
| B-70 | 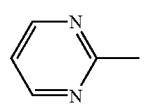 | 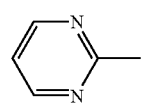 |
| B-71 | 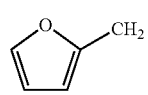 | 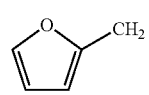 |

-continued

| | | |
|---|---|---|
| B-72 | 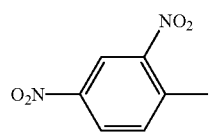 | 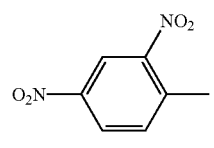 |
| B-73 | 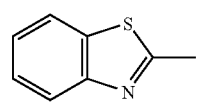 | 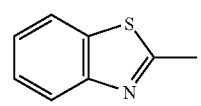 |
| B-74 | 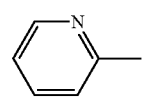 | 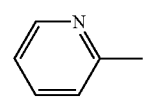 |
| B-75 | iso-$C_4H_9$ | $PhCH_2$ |

A further preferable example of the chemical species represented by Formula (II) is a combination, in which the chemical species [FL] is an anion represented by either one of Formula (II-5) and Formula (II-6) shown below, and the chemical species [Q] is the cation represented by Formula (II-4) shown above. The anion is represented by Formula (II-5) or (II-6) shown below.

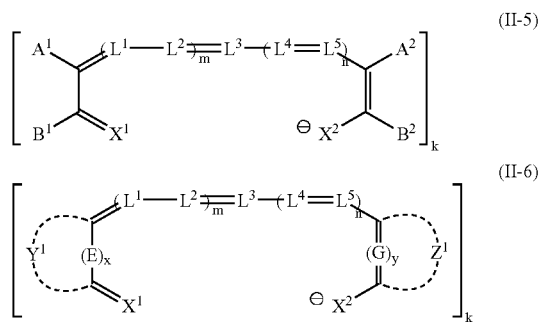

wherein $A^1$, $A^2$, $B^1$, and $B^2$ each independently represent a substituent; $L^1$, $L^2$, $L^3$, $L^4$, and $L^5$ each represent a methine group; $X^1$ represents =O, =NR, or =C(CN), in which R represents a substituent; $X^2$ represents —O, —NR, or —C(CN)$_2$, in which R represents a substituent; m and n each represent an integer of 0 to 2; $Y^1$ and E each represent an atom or an atom group necessary for forming a carbocyclic ring or a heterocyclic ring; $Z^1$ and G each represent an atom or an atom group necessary for forming a carbocyclic ring or a heterocyclic ring; x and y each independently represent 0 or 1; $M^{k+}$ represents an onium ion; and k represents the number of charges.

The anion represented by Formula (II-5) or (II-6) will be described in detail below.

In the formulae, examples of the substituents represented by $A^1$, $A^2$, $B^1$ and $B^2$ include the following:

a substituted or unsubstituted straight-chain, branched or cyclic alkyl group having from 1 to 18 carbon atoms (preferably from 1 to 8 carbon atoms) (such as methyl, ethyl, propyl, isopropyl, n-butyl, isobutyl, sec-butyl, t-butyl, cyclohexyl, methoxyethyl, ethoxycarbonylethyl, cyanoethyl, diethylaminoethyl, hydroxyethyl, chloroethyl, acetoxyethyl and trifluoromethyl);

a substituted or unsubstituted aralkyl group having from 7 to 18 carbon atoms (preferably from 7 to 12 carbon atoms) (such as benzyl and carboxybenzyl);

an alkenyl group having from 2 to 18 carbon atoms (preferably from 2 to 8 carbon atoms) (such as vinyl);

an alkynyl group having from 2 to 18 carbon atoms (preferably from 2 to 8 carbon atoms) (such as ethynyl);

a substituted or unsubstituted aryl group having from 6 to 18 carbon atoms (preferably from 6 to 10 carbon atoms) (such as phenyl, 4-methylphenyl, 4-methoxyphenyl, 4-carboxyphenyl and 3,5-dicarboxyphenyl);

a substituted or unsubstituted acyl group having from 2 to 18 carbon atoms (preferably from 2 to 8 carbon atoms) (such as acetyl, propyonyl, butanoyl and chloroacetyl);

a substituted or unsubstituted alkylsulfonyl or arylsulfonyl group having from 1 to 18 carbon atoms (preferably from 1 to 8 carbon atoms) (such as methanesulfonyl and p-toluenesulfonyl);

an alkylsulfinyl group having from 1 to 18 carbon atoms (preferably from 1 to 8 carbon atoms) (such as methanesulfinyl, ethanesulfinyl and octanesulfinyl);

an alkoxycarbonyl group having from 2 to 18 carbon atoms (preferably from 2 to 8 carbon atoms) (such as methoxycarbonyl and ethoxycarbonyl);

an aryloxycarbonyl group having from 7 to 18 carbon atoms (preferably from 7 to 12 carbon atoms) (such as phenoxycarbonyl, 4-methylphenoxycarbonyl and 4-methoxyphenylcarbonyl);

a substituted or unsubstituted alkoxy group having from 1 to 18 carbon atoms (preferably from 1 to 8 carbon atoms) (such as methoxy, ethoxy, n-butoxy and methoxyethoxy);

a substituted or unsubstituted aryloxy group having from 6 to 18 carbon atoms (preferably from 6 to 10 carbon atoms) (such as phenoxy and 4-methoxyphenoxy);

an alkylthio group having from 1 to 18 carbon atoms (preferably from 1 to 8 carbon atoms) (such as methylthio and ethylthio);

an arylthio group having from 6 to 10 carbon atoms (such as phenylthio);

a substituted or unsubstituted acyloxy group having from 2 to 18 carbon atoms (preferably from 2 to 8 carbon atoms) (such as acetoxy, ethylcarbonyloxy, cyclohexylcarbonyloxy, benzoyloxy and chloroacetyloxy);

a substituted or unsubstituted sulfonyloxy group having from 1 to 18 carbon atoms (preferably from 1 to 8 carbon atoms) (such as methanesulfonyloxy);

a substituted or unsubstituted carbamoyloxy group having from 2 to 18 carbon atoms (preferably from 2 to 8 carbon atoms) (such as methylcarbamoyloxy and diethylcarbamoyloxy);

a substituted or unsubstituted amino group having from 0 to 18 carbon atoms (preferably from 0 to 8 carbon atoms) (such as unsubstituted amino, methylamino, dimethylamino, diethylamino, anilino, methoxyphenylamino, chlorophenylamino, morphorino, piperidino, pyrrolidino, pyridylamino, methoxycarbonylamino, n-butoxycarbonylamino, phenoxycarbonylamino, methylcarbamoylamino, phenylcarbamoylamino, ethylthiocarbamoylamino, methylsulfamoylamino, phenylsulfamoylamino, acetylamino, ethylcarbonylamino, ethylthiocarbonylamino, cyclohexylcarbonylamino, benzoylamino, chloroacetylamino, methanesulfonylamino and benzenesulfonylamino);

a substituted or unsubstituted carbamoyl group having from 1 to 18 carbon atoms (preferably from 1 to 8 carbon atoms) (such as unsubstituted carbamoyl, methylcarbamoyl, ethylcarbamoyl, n-butylcarbamoyl, t-butylcarbamoyl, dimethylcarbamoyl, morphorinocarbamoyl and pyrrolidinocarbamoyl);

a substituted or unsubstituted sulfamoyl group having from 0 to 18 carbon atoms (preferably from 0 to 8 carbon atoms) (such as unsubstituted sulfamoyl, methylsulfamoyl and phenylsulfamoyl);

a halogen atom (such as fluorine, chlorine and bromine), a hydroxyl group, a nitro group; a cyano group; a carboxyl group; and a heterocyclic group (such as oxazole, benzoxazole, thiazole, benzothiazole, imidazole, benzoimidazole, indolenine, pyridine, sulfolane, furan, thiophene, pyrazole, pyrrole, chroman and coumarin).

The substituent represented by $A^1$ and $A^2$ preferably has a Hammett's substituent constant (σp) of 0.2 or more. The Hammett's substituent constant is described, for example, in Chem. Rev., vol. 91, p. 165 (1991). Particularly preferred examples of the substituent include a cyano group, a nitro group, an alkoxycarbonyl group, an acyl group, a carbamoyl group, a sulfamoyl group, an alkylsulfonyl group, and an arylsulfonyl group.

The substituent represented by $B^1$ and $B^2$ is preferably an alkyl group, an aryl group, an alkoxy group, and an amino group.

Because $[-C(=L^1)-(E)_x-C(=X^1)-]$ (hereinafter referred to as W1 for convenience) connected to $Y^1$ and $[-C(-L^5)=(G)_y=C(-X^{2-})-]$ (hereinafter referred to as W2 for convenience) connected to $Z^1$ are in a conjugated state, it is considered that the carbon ring or the heterocyclic ring formed with $Y^1$ and W1, and the carbon ring or the heterocyclic ring formed with $Z^1$ and W2 are each one of the resonance structures.

The carbon ring or the heterocyclic ring formed with $Y^1$ and W1, and $Z^1$ and W2 is preferably a four-membered to seven-membered ring, and particularly preferably a five-membered ring or a six-membered ring. These rings may form a condensed ring with other four-membered to seven-membered rings. These rings may have a substituent. Examples of the substituent include those exemplified as the substituents represented by $A^1$, $A^2$, $B^1$ and $B^2$. Preferred examples of the hetero atom forming the heterocyclic ring include B, N, O, S, Se, and Te. It is particularly preferably N, O, and S.

Also, x and y each independently represent 0 or 1, and preferably both of them are 0.

$X^1$ represents =O, =NR or =C(CN)$_2$. $X^2$ represents —O, —NR or —C(CN)$_2$. R represents a substituent.

Examples of the substituent represented by R include those exemplified above as the substituents represented by $A^1$, $A^2$, $B^1$ and $B^2$. R preferably represents an aryl group, and particularly preferably phenyl.

In the invention, it is preferred that $X^1$ is =O, and $X^2$ is —O.

Examples of the carbon ring formed with $Y^1$ and W1, and $Z^1$ and W2 include the following, in which Ra and Rb each independently represent a hydrogen atom or a substituent:

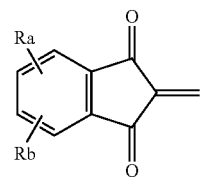

A-1

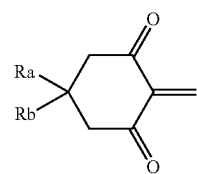

A-2

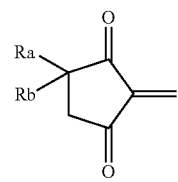

A-3

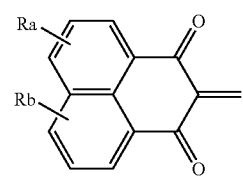

A-4

Preferred carbon rings are carbon rings represented by A-1 and A-4.

Examples of the heterocyclic ring formed with $Y^1$ and W1, and $Z^1$ and W2 include the following, in which Ra, Rb and Rc each independently represent a hydrogen atom or a substituent:

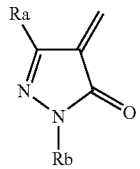

A-5

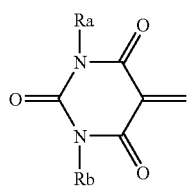

A-6

-continued
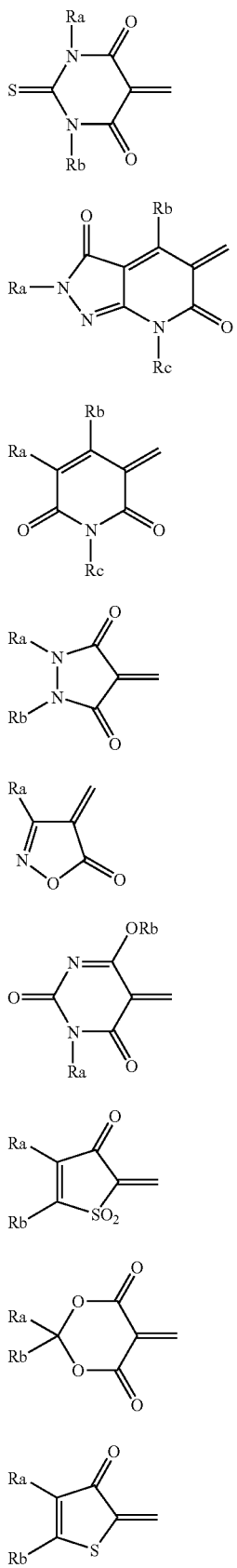
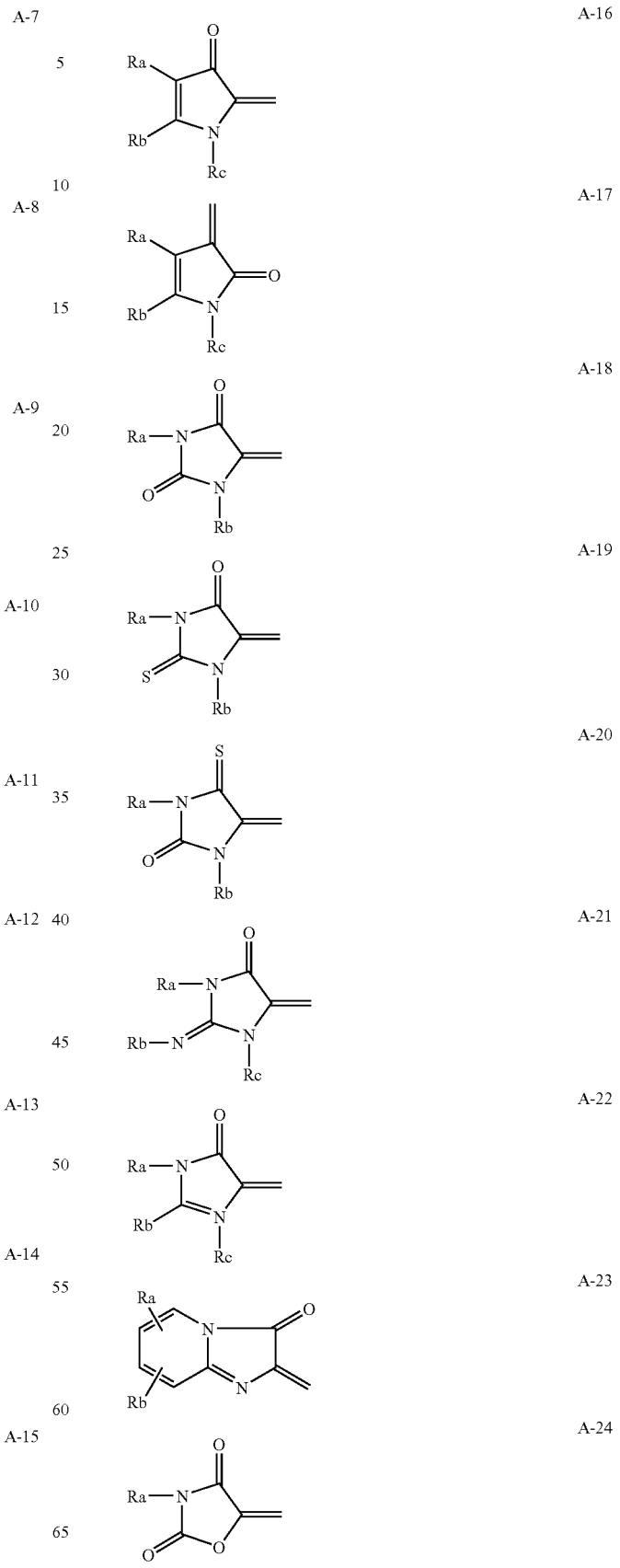

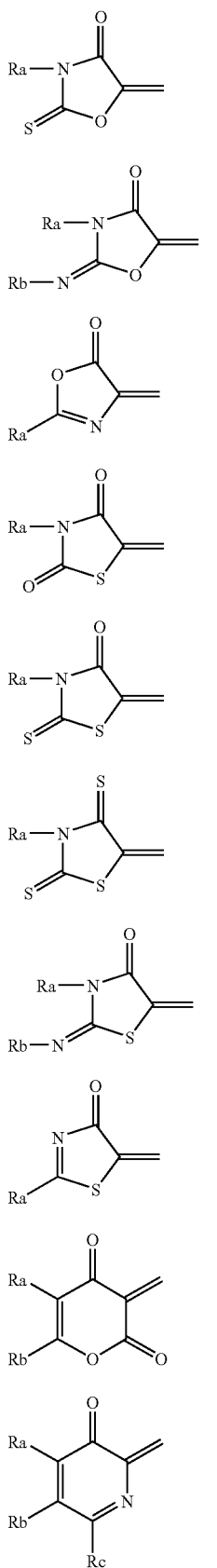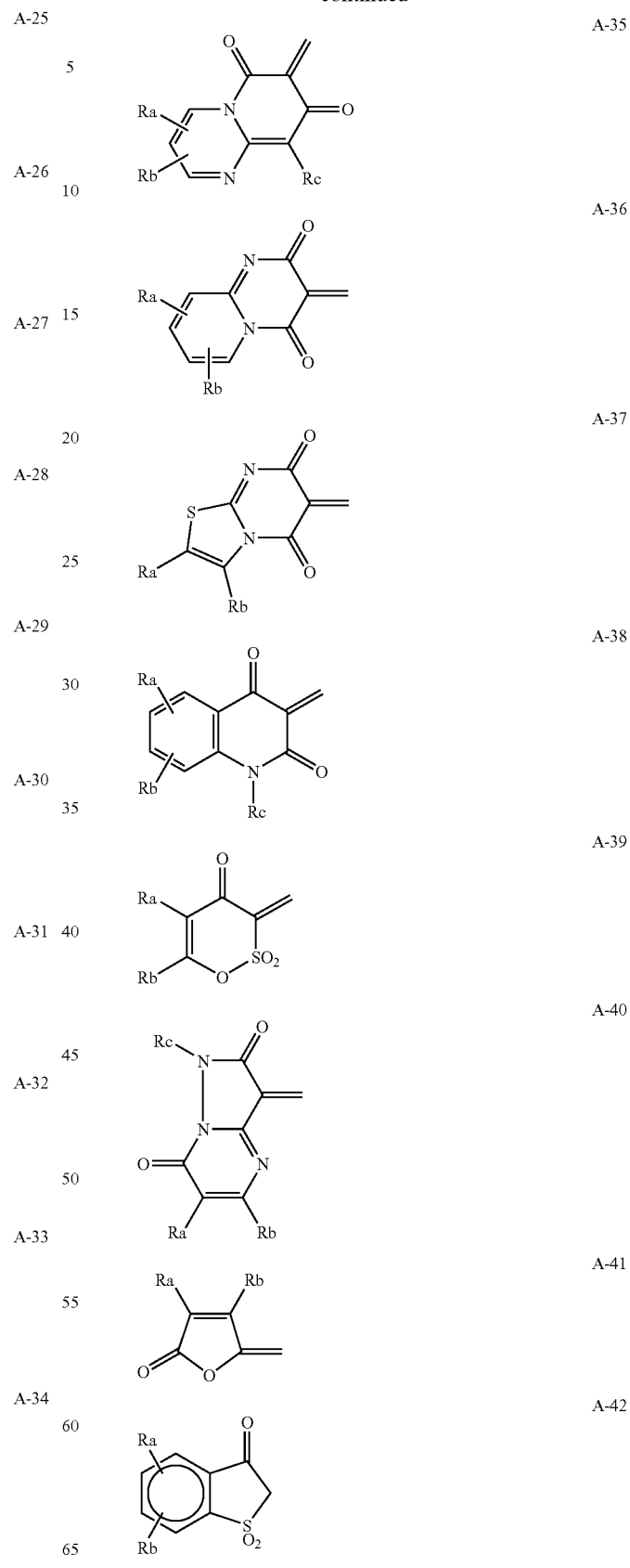

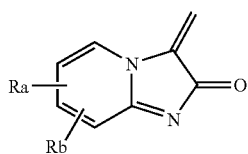
A-43

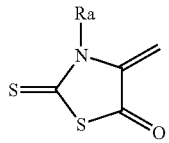
A-44

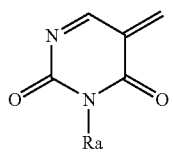
A-45

Preferred heterocyclic rings are heterocyclic rings represented by A-5, A-6 and A-7.

Examples of the substituents represented by Ra, Rb and Rc include those exemplified above as the substituents represented by $A^1$, $A^2$, $B^1$ and $B^2$.

Ra, Rb and Rc may be connected to each other to form a carbon ring or a heterocyclic ring.

The methine groups represented by $L^1$, $L^2$, $L^3$, $L^4$ and $L^5$ are each independently a methine group, which may have a substituent. Examples of the substituent include, for example, those exemplified above as the substituents represented by $A^1$, $A^2$, $B^1$ and $B^2$. Preferred examples of the substituent include an alkyl group, an aralkyl group, an aryl group, an alkoxy group, an aryloxy group, an alkylthio group, an arylthio group, a halogen atom, an amino group, a carbamoyl group and a heterocyclic group. A plurality of the substituents may be connected to each other to form a five-membered to seven-membered ring (such as a cyclopentene ring, a 1-dimethylaminocyclopentene ring, a 1-diphenylaminocyclopentene ring, a cyclohexene ring, a 1-chlorocyclohexene ring, an isophorone ring, a 1-morphorinocyclopentene ring and a cycloheptene ring).

Further, k represents the nubmer necessary for neutralizing the chage of the counter cation.

In the invention, it is preferred that both m and n are 1; m is 0 and n is 2; or m is 2 and n is 0.

Examples of the anions represented by Formula (II-5) and Formula (II-6) will be described in detail below.

| No. | Ra | Rb |
|---|---|---|
| B-1 | COOEt | H |
| B-2 | COOEt | CH₃ |
| B-3 | COOEt | Ph |
| B-4 | COOEt | —CH₂CH₂OH |
| B-5 | COOCH₃ | Ph |
| B-6 | COOEt | 2,4,6-trichlorophenyl |
| B-7 | COOEt | CONHC₄H₉(n) |
| B-8 | COOEt | CONHPh |
| B-9 | CN | Ph |

-continued
| No. | | | |
|---|---|---|---|
| B-10 | COCH$_3$ | 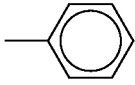 | |
| B-11 | CF$_3$ | 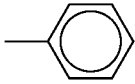 | |
| B-12 | CONHCH$_3$ | CH$_3$ | |
| B-13 | CONHCH$_3$ | 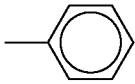 | |
| B-14 | CONHC$_4$H$_9$(n) | 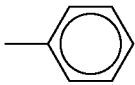 | |
| B-15 | 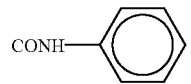 | 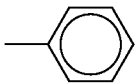 | |
| B-16 | CONHCH$_3$ | 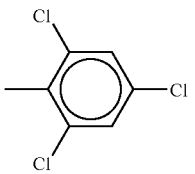 | |
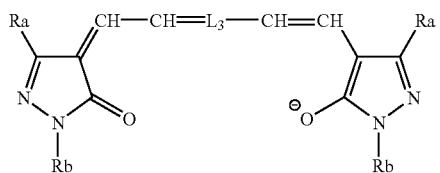
| No. | Ra | Rb | L$_3$ |
|---|---|---|---|
| B-17 | CONHC$_4$H$_9$(n) | CONHC$_4$H$_9$(n) | CH |
| B-18 | 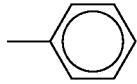 | H | " |
| B-19 | 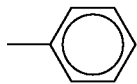 | CH$_3$ | " |
| B-20 | 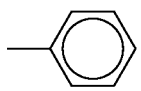 | 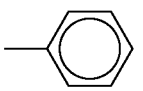 | " |
| B-21 | 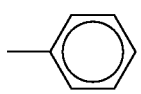 | 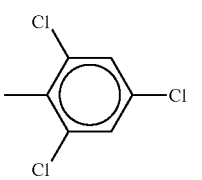 | " |
| B-22 | 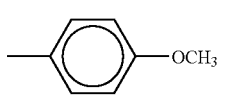 | 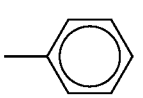 | " |

-continued
| No. | Ra | Rb | L₃ | | |
|---|---|---|---|---|---|
| B-23 | [4-methylphenyl]-NHCOCH₃ | [phenyl] | " | | |
| B-24 | [4-methylphenyl]-CH₃ | [phenyl] | " | | |
| B-25 | [phenyl] | [2,4,6-trichlorophenyl] | C(CH₃) | | |
| B-26 | [phenyl] | CONHC₄H₉(n) | CH | | |
| B-27 | [phenyl] | [2-methylphenyl] | " | | |
| B-28 | —COOEt | CH₂Ph | " | | |
| B-29 | —SO₂CH₃ | [phenyl] | " | | |
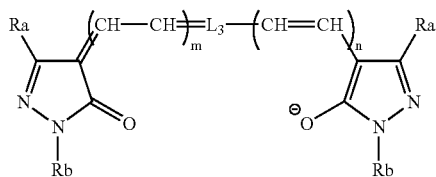
| No. | Ra | Rb | L₃ | m | n |
|---|---|---|---|---|---|
| B-30 | CH₂SO₂NH— | [phenyl] | CH | 1 | 1 |
| B-31 | HO | [phenyl] | C(CONH₂) | 1 | 1 |
| B-32 | CH₃ | [phenyl] | C(Ph) | 1 | 1 |
| B-33 | CH₃ | [phenyl] | C(CH₂Ph) | 1 | 1 |
| B-34 | CH₃ | [phenyl] | C(-4-pyridyl) | 1 | 1 |
| B-35 | EtO— | [phenyl] | CH | 1 | 1 |

-continued
| No. | Ra | Rb | L | m | n |
|---|---|---|---|---|---|
| B-36 | —NHCOCH$_3$ | Ph (phenyl) | CH | 1 | 1 |
| B-37 | —NHCOPh | Ph | CH | 1 | 1 |
| B-38 | —NHCOPh | —CONHC$_4$H$_9$(n) | CH | 1 | 1 |
| B-39 | —NHCOPh | —CONHPh | CH | 1 | 1 |
| B-40 | —COOEt | 2,4,6-trichlorophenyl | CH | 1 | 0 |
| B-41 | —CN | 2,4,6-trichlorophenyl | CH | 1 | 0 |
| B-42 | —CF$_3$ | Ph | CH | 1 | 0 |
| B-43 | —CONHC$_4$H$_9$(n) | Ph | CH | 1 | 0 |
| B-44 | —NHCOC$_4$H$_9$(n) | Ph | CH | 1 | 0 |
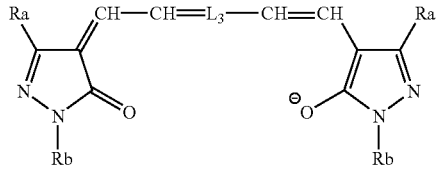
| No. | Ra | Rb | L$_3$ |
|---|---|---|---|
| B-45 | —NH-(3-NHAc-4-Cl-phenyl) | 2,4,6-trichlorophenyl | CH |
| B-46 | —NH$_2$ | Ph | " |
| B-47 | —NHCONHC$_4$H$_9$(n) | Ph | " |

-continued
| | | | |
|---|---|---|---|
| B-48 | —NHCOOC$_4$H$_9$(n) | 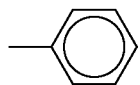 | " |
| B-49 | 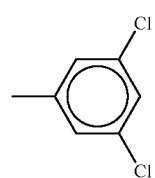 | CH$_2$Ph | " |
| B-50 | 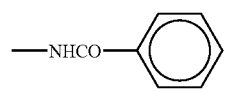 | 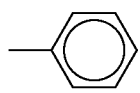 | C(Ph) |
| B-51 | 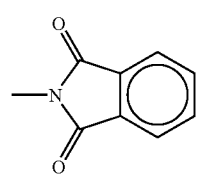 | 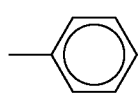 | CH |
| B-52 | 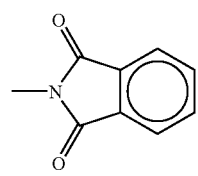 | 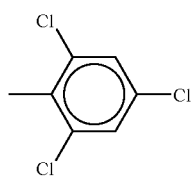 | " |
| B-53 | —CN | 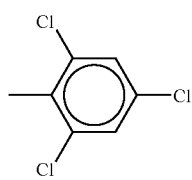 | " |
| B-54 | —CF$_3$ | 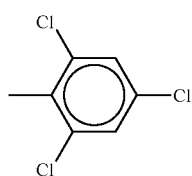 | " |
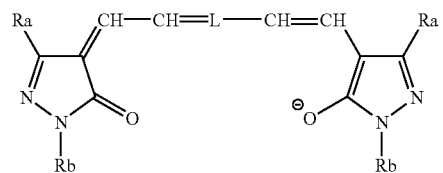
| No. | Ra | Rb | L |
|---|---|---|---|
| B-55 | —COOEt | 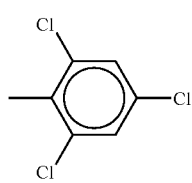 | C(CH$_3$) |

-continued
| | | | |
|---|---|---|---|
| B-56 | —CN | 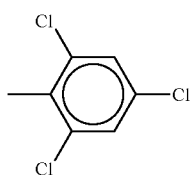 | " |
| B-57 | —CF$_3$ | 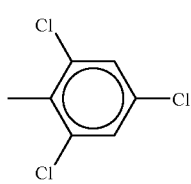 | " |
| B-58 | —COCH$_3$ | 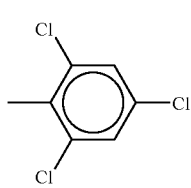 | " |
| B-59 | —COOEt | 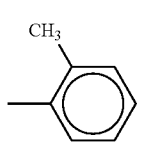 | " |
| B-60 | —CN | 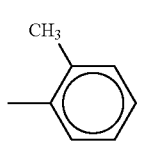 | " |
| B-61 | —COOEt | 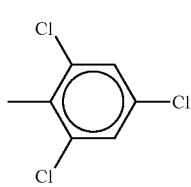 | C(Br) |
| B-62 | —COOEt | 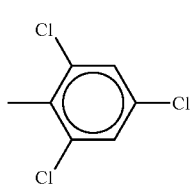 | C(Cl) |
| B-63 | —CN | 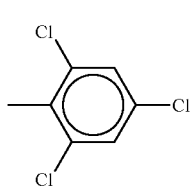 | C(Br) |

-continued
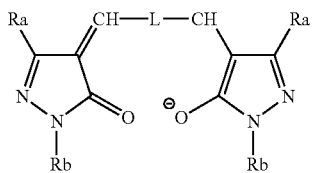
| No. | Ra | Rb | L |
|---|---|---|---|
| B-64 | —CN | ⟨tolyl⟩ | C(Br) |
| B-65 | —COOEt | ⟨tolyl⟩ | C(Cl) |
| B-66 | —COOEt | ⟨tolyl⟩ | CH |
| B-67 | —CONHCH$_3$ | ⟨tolyl⟩ | CH |
| B-68 | —NHCOCH$_3$ | ⟨tolyl⟩ | CH |
| B-69 | —CH$_3$ | ⟨tolyl⟩ | CH |
| B-70 | —NH$_2$ | ⟨tolyl⟩ | CH |
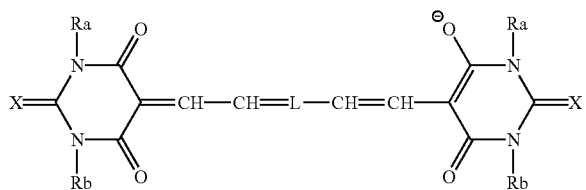
| No. | Ra | Rb | X | L |
|---|---|---|---|---|
| B-71 | H | H | O | CH |
| B-72 | H | CH$_3$ | O | " |
| B-73 | H | nC$_4$H$_9$ | O | " |
| B-74 | nC$_4$H$_9$ | nC$_4$H$_9$ | O | " |
| B-75 | H | Ph | O | " |
| B-76 | H | Ph | O | C(Ph) |
| B-77 | Ph | Ph | O | CH |
| B-78 | H | ⟨2,3-dimethylphenyl⟩ | O | " |
| B-79 | H | ⟨4-methylphenyl⟩ | O | " |
| B-80 | H | H | S | " |

-continued
| No. | Ra | Rb | | | |
|---|---|---|---|---|---|
| B-81 | H | C₂H₅ | | S | " |
| B-82 | C₂H₅ | C₂H₅ | | S | " |
| B-83 | H | nC₄H₉ | | O | C(CH₂Ph) |
| B-84 | H | Ph | | O | C(CH₃) |
| B-85 | H | Ph | | S | CH |
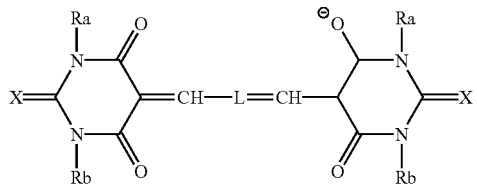
| No. | Ra | Rb | X | L |
|---|---|---|---|---|
| B-86 | H | nC₄H₉ | O | CH |
| B-87 | H | Ph | O | " |
| B-88 | CH₃ | CH₃ | O | " |
| B-89 | Ph | Ph | O | " |
| B-90 | H | Ph | O | C(CH₃) |
| B-91 | H | —⟨C₆H₄⟩—CH₃ | O | C(CH₂Ph) |
| B-92 | H | nC₄H₉ | S | CH |
| B-93 | H | Ph | S | " |
| B-94 | Ph | Ph | S | " |
| B-95 | Et | Et | S | " |
| B-96 | H | Ph | S | C(CH₃) |
B-97
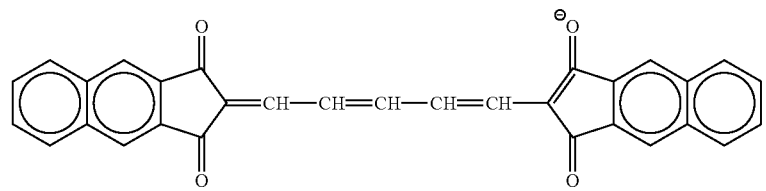
B-98
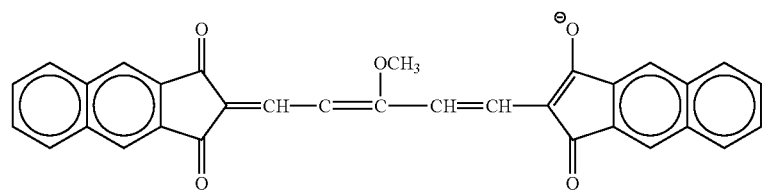
B-99
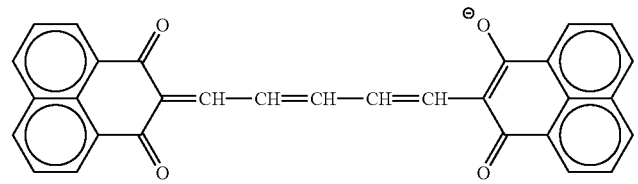

-continued
B-100
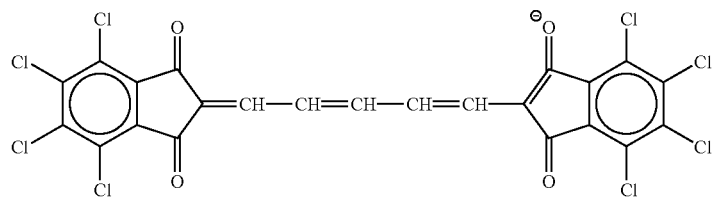
B-101
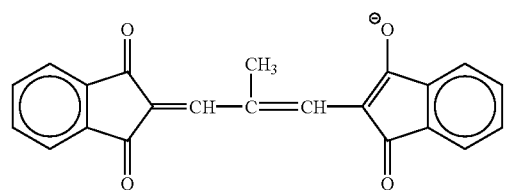
B-102
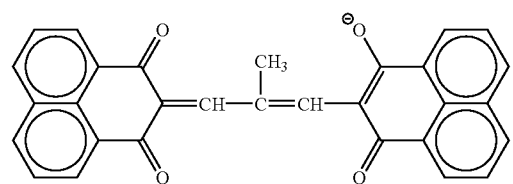
B-103
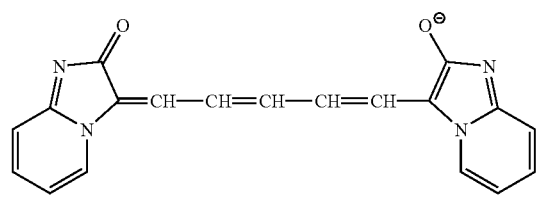
B-104
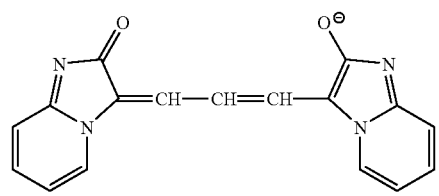
B-105
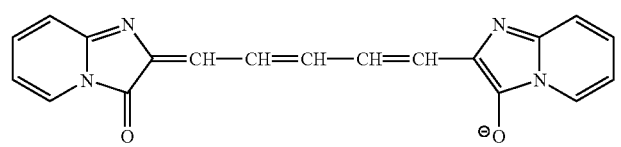

-continued
B-106
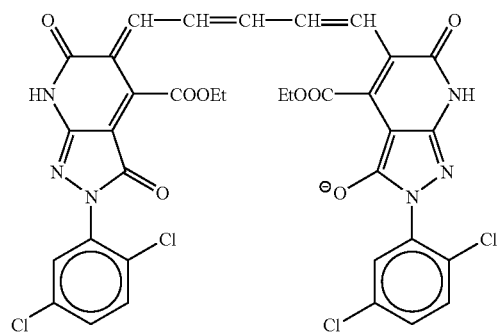
B-107
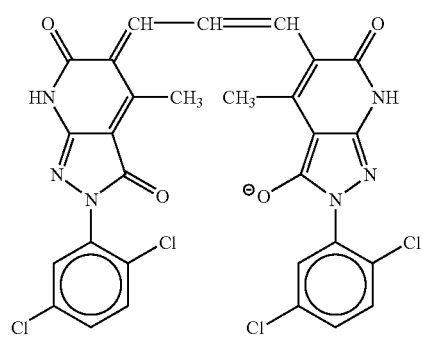
B-108
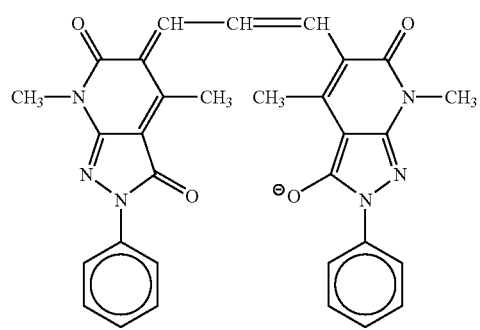
B-109
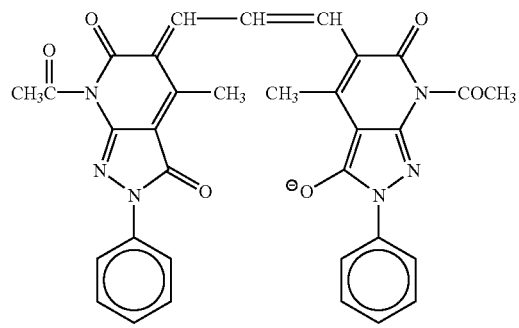

B-110
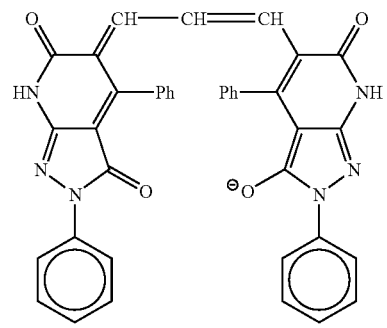
B-111
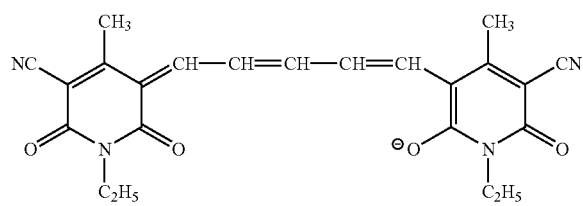
B-112
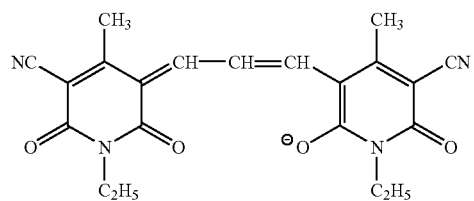
B-113
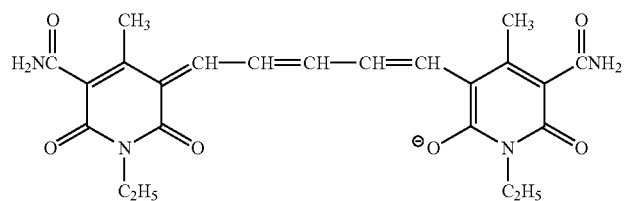
B-114
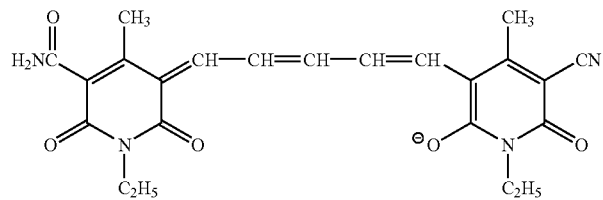

-continued
B-115
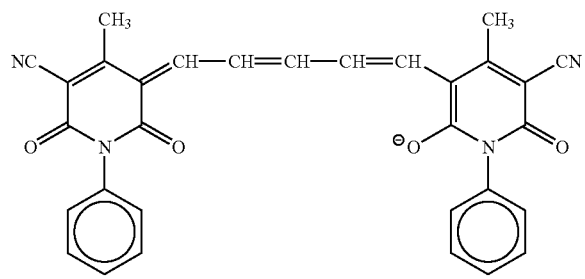
B-116
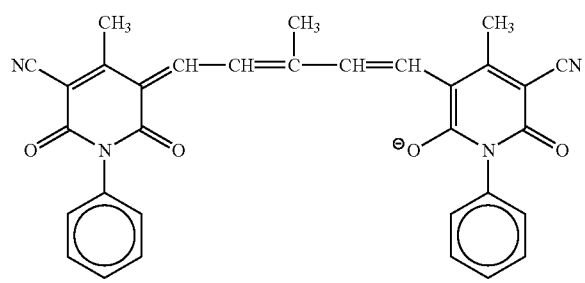
B-117
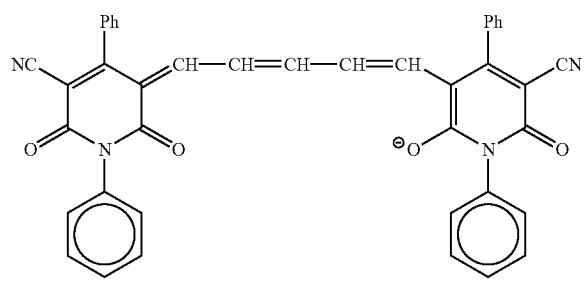
B-118
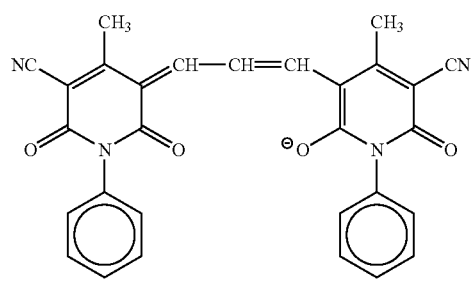
B-119
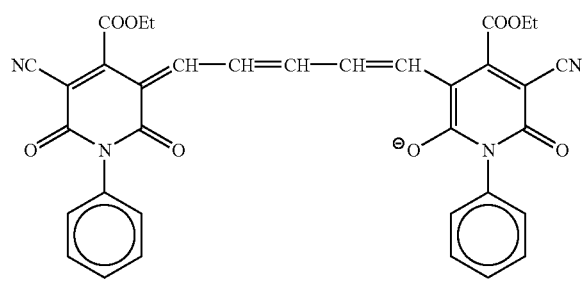

-continued
B-120
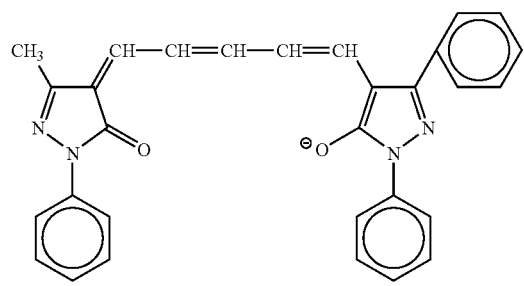
B-121
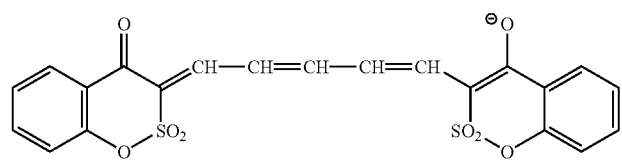
B-122
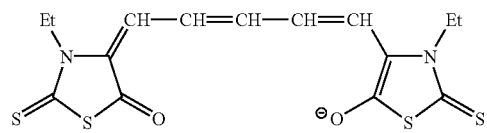
B-123
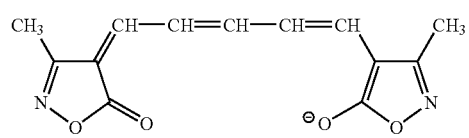
B-124
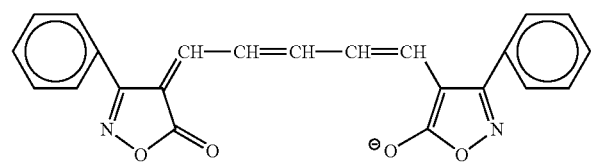
B-125
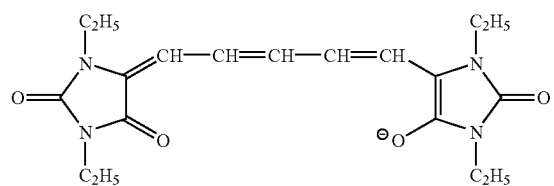
B-126
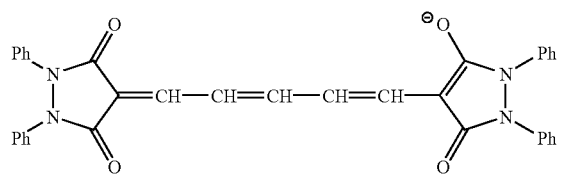

-continued
B-127
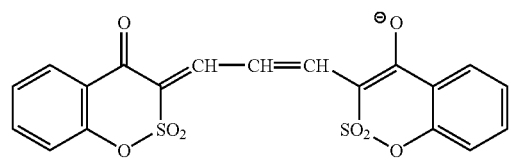
B-128
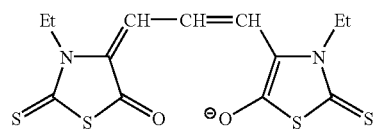
B-129
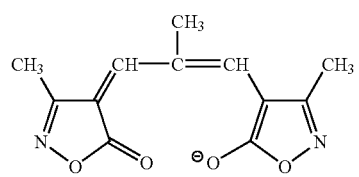
B-130
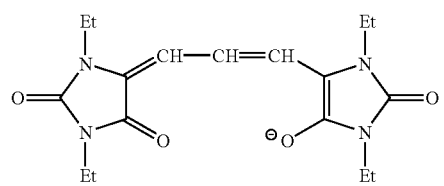
B-131
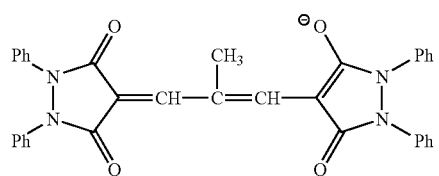
B-132
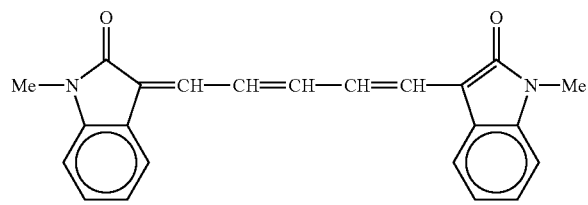
B-133
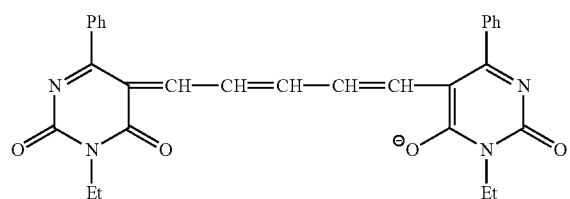

-continued
B-134
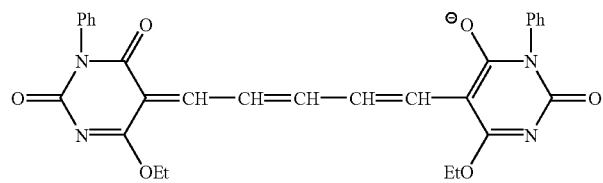
B-135
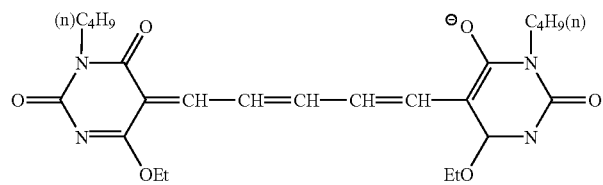
B-136
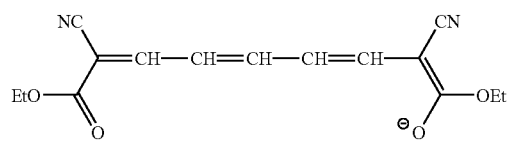
B-137
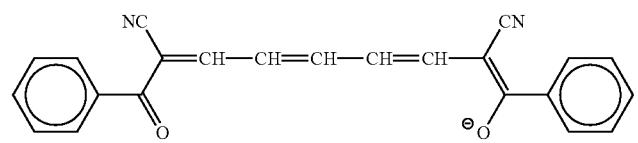
B-138
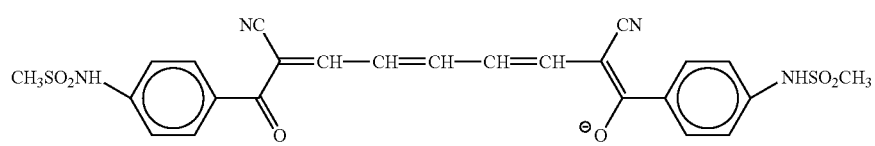
B-139
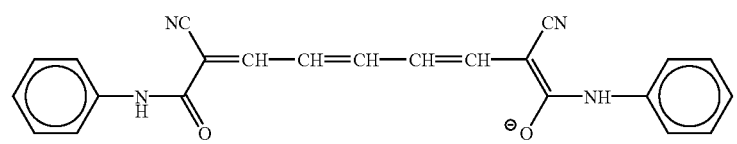
B-140
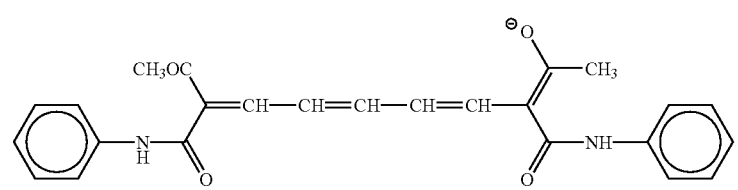

-continued
B-141
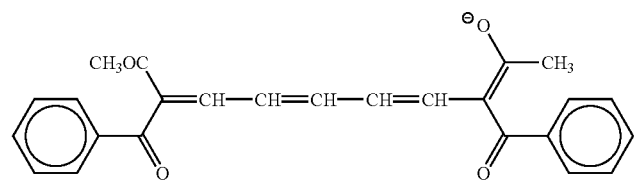
B-142
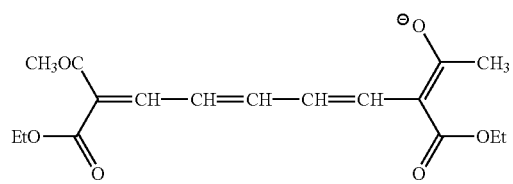
B-143
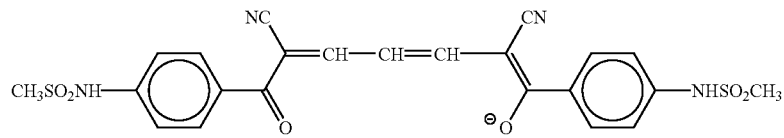
B-144
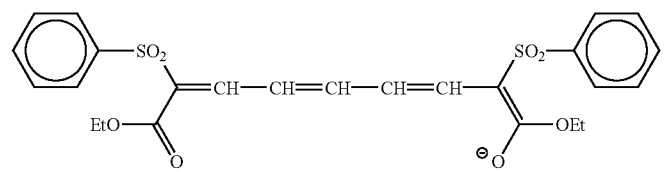
B-145
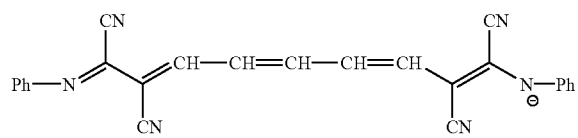
B-146
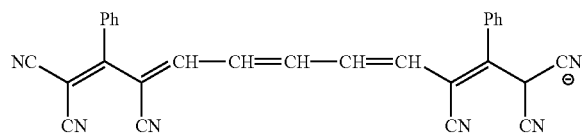
B-147
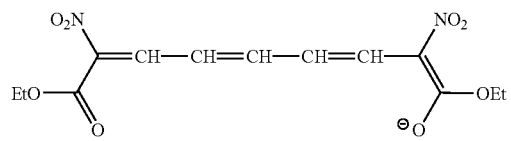
B-148
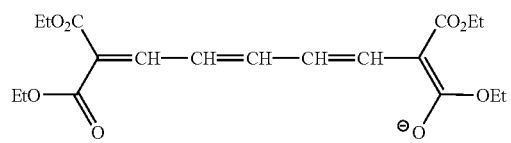

B-149
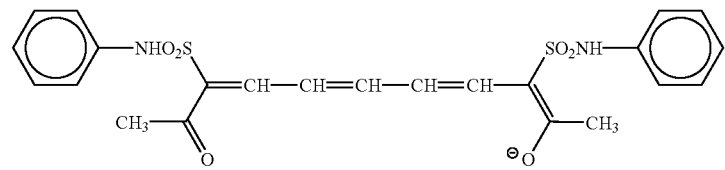
B-150
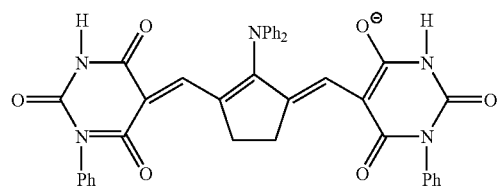
B-151
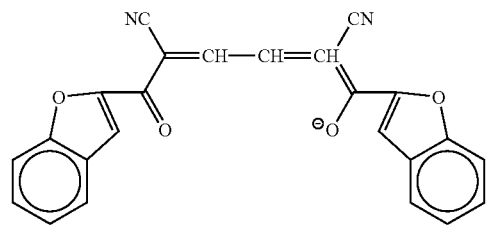
B-152
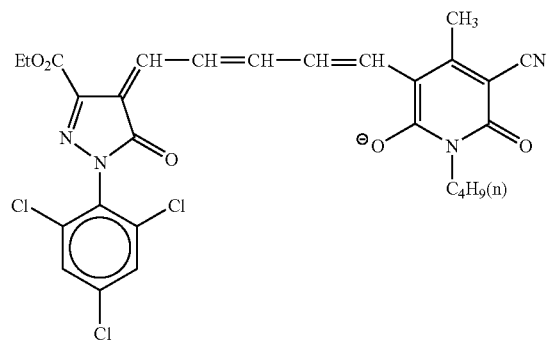
B-153
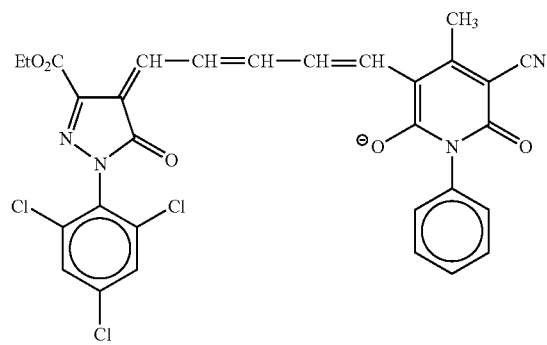

-continued
B-154
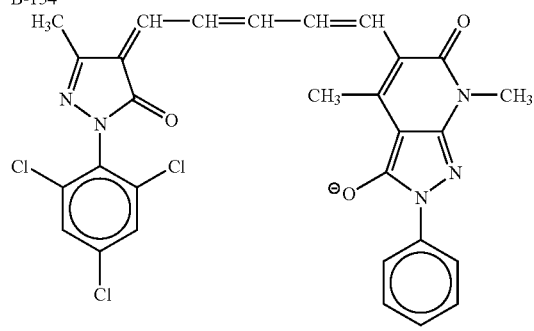
B-155
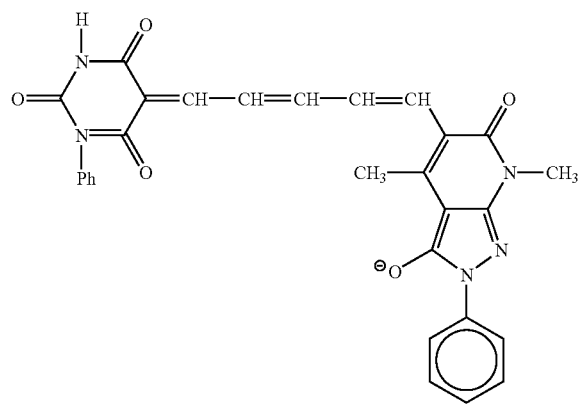
B-156
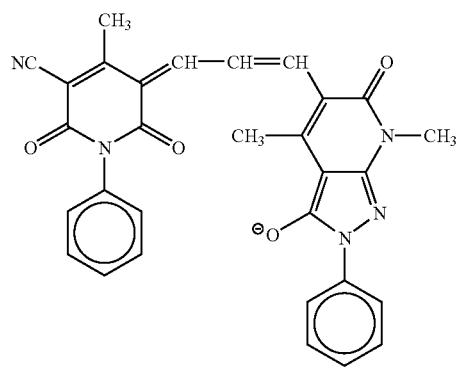
B-157
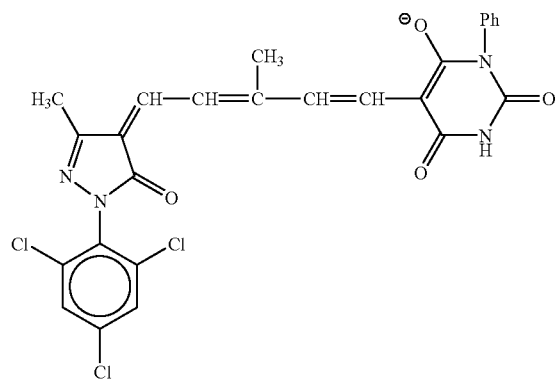

B-158

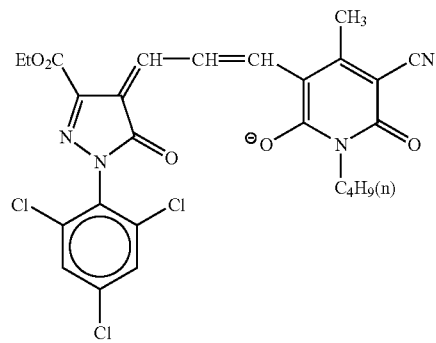

B-159

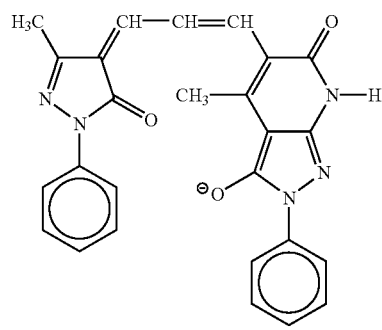

FIGS. 1A, 1B, and 1C are schematic side views showing an embodiment of the recording medium in accordance with the present invention. As illustrated in FIG. 1A, a recording medium 10 comprises a transparent substrate 11 and a recording layer 12 overlaid on the substrate 11.

The recording layer 12 is formed from a material, which is originally not a fluorescent material and which has the properties such that, when recording light having a predetermined wavelength λ1 is irradiated to the material, the material is capable of being caused to change into a fluorescent material. By way of example, in this embodiment of the recording medium in accordance with the present invention, the recording layer 12 is formed from a material comprising a combination of the compound represented by the formula shown below, which is one of the compounds represented by Formula (II-1) shown above and acting as the chemical species [FL] capable of producing the fluorescence:

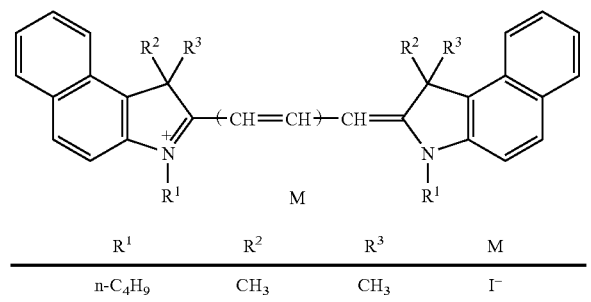

| $R^1$ | $R^2$ | $R^3$ | M |
|---|---|---|---|
| n-$C_4H_9$ | $CH_3$ | $CH_3$ | $I^-$ | and the compound A-1, which is one of the compounds represented by Formula (II-2) shown above and acting as the chemical species [Q] capable of quenching the fluorescence.

The material constituting the recording layer 12 has the properties such that, when the recording light having the predetermined wavelength λ1 is irradiated to the material, the material is capable of being caused to change into the fluorescent material and such that, when excitation light having a predetermined wavelength λ2 is then irradiated to the thus formed fluorescent material, the fluorescent material is capable of being caused to produce fluorescence having a wavelength λ3. FIGS. 1A, 1B, and 1C show the properties of the material constituting the recording layer 12. Specifically, as illustrated in FIG. 1A, even if excitation light 2 having the wavelength λ2 is irradiated to the material, while the material is being in its original state, the material does not produce the fluorescence. However, as illustrated in FIG. 1B, when recording light 1 having the wavelength λ1 is irradiated to the material, the material, which is located at a site P having been exposed to the recording light 1, is caused to change into the fluorescent material. Also, as illustrated in FIG. 1C, when the excitation light 2 having the wavelength λ2 is then irradiated to the site P, the fluorescent material having been formed at the site P is caused to produce fluorescence 3 having the wavelength λ3.

As described above, in this embodiment of the recording medium in accordance with the present invention, the recording layer 12 is formed from the material comprising the combination of the compound represented by the formula shown above, which is one of the compounds represented by Formula (II-1) shown above and acting as the chemical species [FL] capable of producing the fluorescence, and the compound A-1, which is one of the compounds represented by Formula (II-2) shown above and acting as the chemical species [Q] capable of quenching the fluorescence. In such cases, $\lambda1=\lambda2\ne\lambda3$.

Embodiments of the information recording and reproducing apparatuses in accordance with the present invention, in which the recording medium 10 is employed, will be described hereinbelow.

Figure 2:
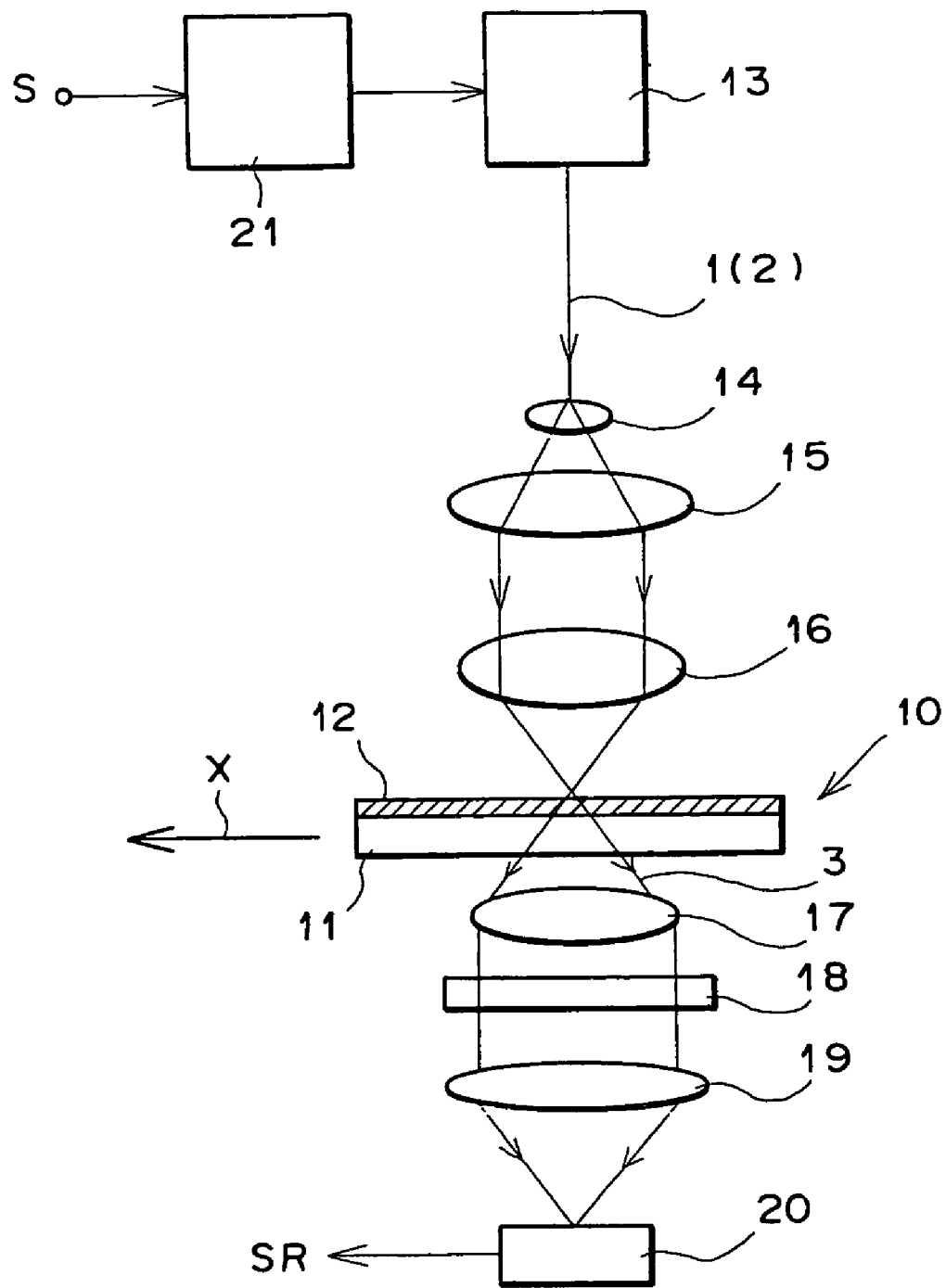
FIG. 2 is a side view showing a first embodiment of the information recording and reproducing apparatus in accordance with the present invention.

FIG. 2 is a side view showing a first embodiment of the information recording and reproducing apparatus in accordance with the present invention. With reference to FIG. 2, the information recording and reproducing apparatus comprises a recording light source 13 for producing the recording light 1 having the wavelength $\lambda1$ of 532 nm. The information recording and reproducing apparatus also comprises a lens 14 for diverging the recording light 1, and a collimator lens 15 for collimating the recording light 1, which has been radiated out in the state of divergent light from the lens 14. The information recording and reproducing apparatus further comprises a converging lens 16 for converging the recording light 1, which has been collimated by the collimator lens 15, onto the recording layer 12 of the recording medium 10. The information recording and reproducing apparatus still further comprises an objective lens 17 for converging the fluorescence 3, which has been produced from the recording layer 12 in the manner described later. The information recording and reproducing apparatus also comprises a filter 18 for transmitting only the light having wavelengths falling within the wavelength region of the fluorescence 3, and a converging lens 19 for converging the fluorescence 3, which has passed through the filter 18. The information recording and reproducing apparatus further comprises a photodetector 20 for detecting the fluorescence 3, which has been converged by the converging lens 19. The photodetector 20 may be constituted of, for example, photodiodes.

The recording layer 12 formed with the material comprising the combination of the compounds described above has the properties such that, when the recording light 1 having the wavelength $\lambda1$ of 532 nm is irradiated to the recording layer 12, the material, which is located at the site having been exposed to the recording light 1, changes into the fluorescent material and such that, when the excitation light 2 having the wavelength $\lambda2$ of 532 nm is then irradiated to the site, the fluorescent material having been formed at the site produces the fluorescence 3 having the wavelength $\lambda3$ of 650 nm.

By way of example, the recording light source 13 may be constituted of a combination of a semiconductor laser and an optical wavelength converting device. A modulation driving circuit 21 receives a digital signal S and drives the recording light source 13 in accordance with the digital signal S. The photodetector 20 may be constituted of, for example, photodiodes having sensitivity with respect to the wavelength region of the fluorescence 3.

How the first embodiment of the information recording and reproducing apparatus in accordance with the present invention operates will be described hereinbelow.

Firstly, how information is recorded on the recording medium 10 will be described hereinbelow. The digital signal S, such as an image signal or computer data, is fed into the modulation driving circuit 21. In accordance with the digital signal S, the modulation driving circuit 21 drives the recording light source 13 and performs on-off modulation of the recording light 1.

As described above with reference to FIG. 1B, when the recording light 1, which has been converged by the converging lens 16 into a fine light spot, is irradiated to the recording layer 12 of the recording medium 10, the material constituting the recording layer 12, which material is located at the site having been exposed to the recording light 1, changes into the fluorescent material, and a fine pit is thereby formed with the fluorescent material in the recording layer 12.

When the pit is formed in the manner described above, the recording medium 10 is moved by a known linear movement mechanism (not shown) and in the direction indicated by the arrow X. Therefore, a plurality of pits are formed so as to stand in a line on the recording medium 10. After the pits standing in a line have been formed, the recording medium 10 may be moved in a direction approximately normal to the direction indicated by the arrow X. In this manner, the pits are capable of being formed such that the pits are arrayed in two-dimensional directions in the plane of the recording layer 12.

How the information, which has been recorded in the form of the pit on the recording medium 10, is reproduced will be described herein below. When the information is to be reproduced from the recording medium 10, the recording medium 10 is linearly moved in the same manner as that in the recording of the information, and the recording light source 13 is driven. At this time, the recording light source 13 is driven so as to produce the light 2 having a predetermined intensity, which is lower than the intensity of the recording light 1, such that the material constituting the recording layer 12 may not be markedly caused by the light 2 to change into the fluorescent material. In this embodiment, the light 2 has the wavelength $\lambda2$ of 532 nm, which is identical with the wavelength $\lambda1$ of the recording light 1. The light 2 employed for the reproduction of the information is herein referred to as the excitation light 2.

As described above, when the excitation light 2 is irradiated to the recording layer 12 of the recording medium 10, the fluorescence 3 having the wavelength $\lambda3$ of 650 nm is produced from the site at which the pit has been formed, i.e. the site at which the fluorescent material has been formed. However, the fluorescence 3 is not produced from a site at which no pit has been formed.

The fluorescence 3 is detected by the photodetector 20 via the filter 18. A fluorescence detection signal SR in accordance with the intensity of the fluorescence 3 is obtained from the photodetector 20. Therefore, byway of example, the fluorescence detection signal SR having been obtained as a time-series signal may be sampled and quantized by being synchronized with the movement of the recording medium 10. In this manner, the digital signal S is capable of being reproduced from the recording medium 10.

The excitation light 2 having the wavelength of 532 nm is filtered out by the filter 18 and is therefore not detected by the photodetector 20. In lieu of the optical filter 18, a prism, a grating, a holographic element, or the like, may be employed as the wavelength selecting means.

As will be understood from the foregoing, in this embodiment, the recording light source 13 also acts as the source of the excitation light for the reproduction of the information.

A second embodiment of the information recording and reproducing apparatus in accordance with the present invention will be described herein below with reference to FIG. 3. In FIG. 3 (and those that follow), similar elements are numbered with the same reference numerals with respect to FIG. 2.

The second embodiment of the information recording and reproducing apparatus in accordance with the present invention, which is shown in FIG. 3, is constituted basically in the same manner as that in the first embodiment of the information recording and reproducing apparatus shown in FIG. 2, except that a disk-like recording medium 30 is employed in lieu of the recording medium 10. The disk-like recording medium 30 comprises the substrate and the recording layer, which are of the same types as those in the recording medium 10. In the second embodiment, the direction of the optical path of each of the recording light 1 and the excitation light 2 is changed by a mirror 31 toward the lens 14.

When the information is to be recorded and reproduced, the recording medium 30 is rotated by driving means (not shown) and in the direction indicated by the arrow R. Also, the entire optical system is moved with respect to the recording medium 30 and in the radial direction of the recording medium 30. In this manner, the recording light 1 or the excitation light 2 scans the recording medium 30 in two-dimensional directions and along a spiral path or concentric circular paths. In order to track the pits arrayed along the spiral line or concentric circular lines, conventional tracking techniques for optical disks may be utilized. The other operations for the information recording and the information reproduction are performed in the same manner as that in the first embodiment of FIG. 2.

Figure 4:
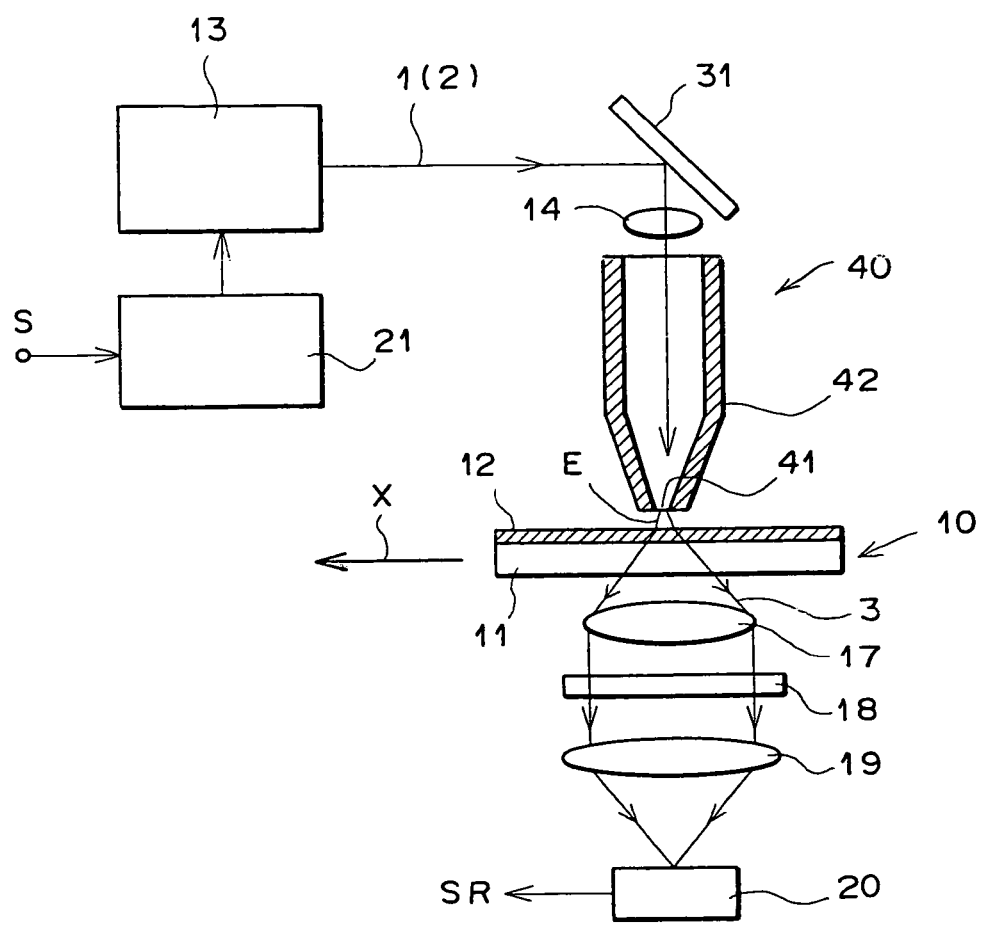
FIG. 4 is a side view showing a third embodiment of the information recording and reproducing apparatus in accordance with the present invention.

A third embodiment of the information recording and reproducing apparatus in accordance with the present invention will be described hereinbelow with reference to FIG. 4. The third embodiment of the information recording and reproducing apparatus in accordance with the present invention, which is shown in FIG. 4, is constituted basically in the same manner as that in the first embodiment of the information recording and reproducing apparatus shown in FIG. 2, except that a near field light head 40 is employed in lieu of the collimator lens 15 and the converging lens 16.

The near field light head 40 has a micro-aperture 41 at a bottom end. The micro-aperture 41 has a diameter (of, by way of example, approximately several nanometers) shorter than the wavelength of the recording light 1. The micro-aperture 41 can be formed by, for example, pointing a bottom end portion of a core of an optical fiber, forming an opaque metal film 42 on the core of the optical fiber with a vacuum evaporation process, and thereafter removing the metal film 42 from only the bottom end of the core of the optical fiber.

When the recording light 1 is introduced into the near field light head 40, evanescent wave E is radiated out from the micro-aperture 41 formed at the bottom end of the near field light head 40. When the evanescent wave E is irradiated to the recording layer 12 of the recording medium 10, the material constituting the recording layer 12, which material is located at the site having been exposed to the evanescent wave E, changes into the fluorescent material, and a fine pit is thereby formed with the fluorescent material in the recording layer 12. Since the evanescent wave E is radiated out from the range of a diameter shorter than the wavelength of the recording light 1, the diameter of the pit is shorter than the wavelength of the recording light 1. Therefore, the recording density is capable of being enhanced markedly.

Reproduction of the information from the recording medium 10 is performed in the same manner as that in the first embodiment of FIG. 2. In such cases, the evanescent wave E acting as the excitation light, which is irradiated from the near field light head 40 to the recording layer 12, is radiated out from the range of a diameter shorter than the wavelength of the excitation light 2, which is introduced into the near field light head 40. Therefore, the evanescent wave E is capable of being irradiated independently to each of the pits, which have been formed in the recording layer 12 and which have a diameter shorter than the wavelength of the recording light 1.

Figure 5:
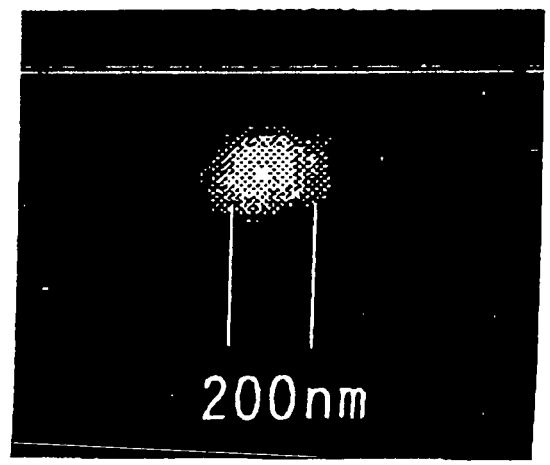
FIG. 5 is a diagram showing a microscope photograph of a pit having been formed on the recording medium with the information recording and reproducing apparatus of FIG. 4.

FIG. 5 shows an image of a pit having been formed on the recording medium 10 with the third embodiment of FIG. 4, which image has been detected with a near field optical microscope. As illustrated in FIG. 5, it has been confirmed that a pit having a diameter shorter than the wavelength $\lambda 1$ (=532 nm) of the recording light 1 has been formed on the recording medium 10.

A fourth embodiment of the information recording and reproducing apparatus in accordance with the present invention will be described hereinbelow with reference to FIG. 6. The fourth embodiment of the information recording and reproducing apparatus in accordance with the present invention, which is shown in FIG. 6, is constituted basically in the same manner as that in the first embodiment of the information recording and reproducing apparatus shown in FIG. 2, except that a solid immersion lens 50 is located between the converging lens 16 and the recording medium 10. In cases where the solid immersion lens 50 is utilized in air, the solid immersion lens 50 has the characteristics such that, when light is entered from one end side of the solid immersion lens 50 into the solid immersion lens 50, the solid immersion lens 50 radiates out the evanescent wave E from the other end (i.e., the bottom end in FIG. 6).

In cases where the solid immersion lens 50 is employed, as in cases where the near field light head 40 is employed in the third embodiment of FIG. 4, the diameter of the formed pit becomes shorter than the wavelength of the recording light 1, and therefore the recording density is capable of being enhanced markedly.

Figure 7:
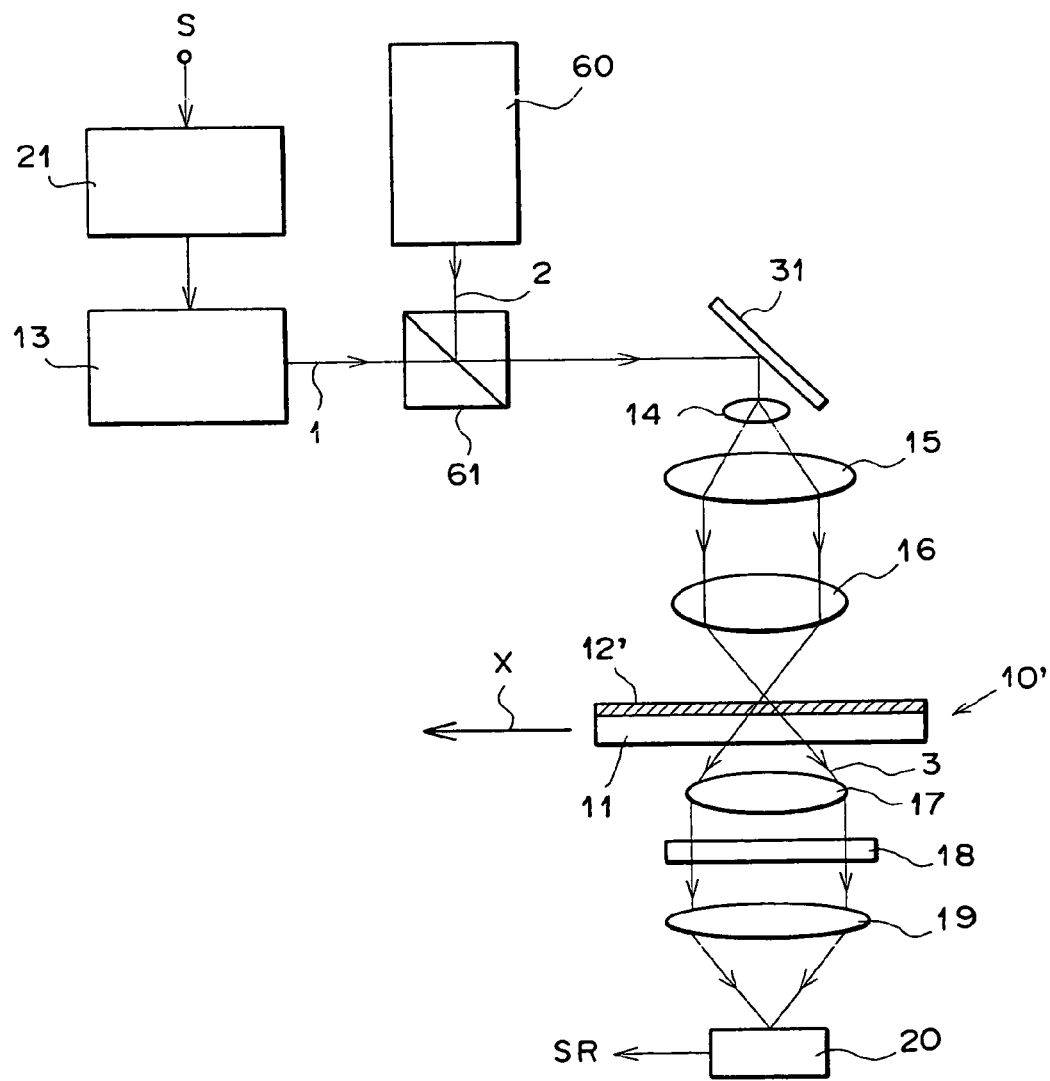
FIG. 7 is a side view showing a fifth embodiment of the information recording and reproducing apparatus in accordance with the present invention.

A fifth embodiment of the information recording and reproducing apparatus in accordance with the present invention will be described hereinbelow with reference to FIG. 7. The fifth embodiment of the information recording and reproducing apparatus in accordance with the present invention, which is shown in FIG. 7, is constituted basically in the same manner as that in the first embodiment of the information recording and reproducing apparatus shown in FIG. 2, except that, besides the recording light source 13, an excitation light source 60 is employed for the reproduction of the information. Also, the excitation light 2, which has been produced by the excitation light source 60, is reflected by a beam splitter 61, which has been inserted into the optical path of the recording light 1. The excitation light 2, which has been reflected by the beam splitter 61, follows the same optical path as that of the recording light 1.

In the fifth embodiment of FIG. 7, as the recording light source 13, a light source producing the recording light 1 having the wavelength $\lambda 1$ of 350 nm is employed. Also, as the excitation light source 60, a light source producing the excitation light 2 having the wavelength $\lambda 2$ of 532 nm is employed. Further, as a recording medium 10', a recording medium comprising a recording layer 12' formed from a specific material is employed. The material constituting the recording layer 12' has the properties such that, when the recording light 1 having the wavelength $\lambda 1$ of 350 nm is irradiated to the material, the material is capable of being caused to change into a fluorescent material and such that, when the excitation light 2 having the wavelength $\lambda 2$ of 532 nm is then irradiated to the thus formed fluorescent material, the fluorescent material is capable of being caused to produce the fluorescence 3 having the wavelength $\lambda 3$ of 600 nm. As the material constituting the recording layer 12', for example, the compound represented by Formula (I-4), which is one of the compounds represented by Formula (I) shown above, may be employed.

In the fifth embodiment of FIG. 7, the recording of the information on the recording medium 10' is performed in the same manner as that in the first embodiment of FIG. 2. Also, the reproduction of the information from the recording medium 10' is performed by irradiating the excitation light 2, which has been produced by the excitation light source 60 and which has a predetermined intensity, to the recording layer 12' of the recording medium 10'. In such cases, even if the material constituting the recording layer 12' is exposed to the excitation light 2 having the wavelength λ2 of 532 nm, the material will not change into the fluorescent material. Therefore, when the information is to be reproduced from the recording medium 10', the intensity of the excitation light 2 need not particularly be set at a low intensity.

Figure 8:
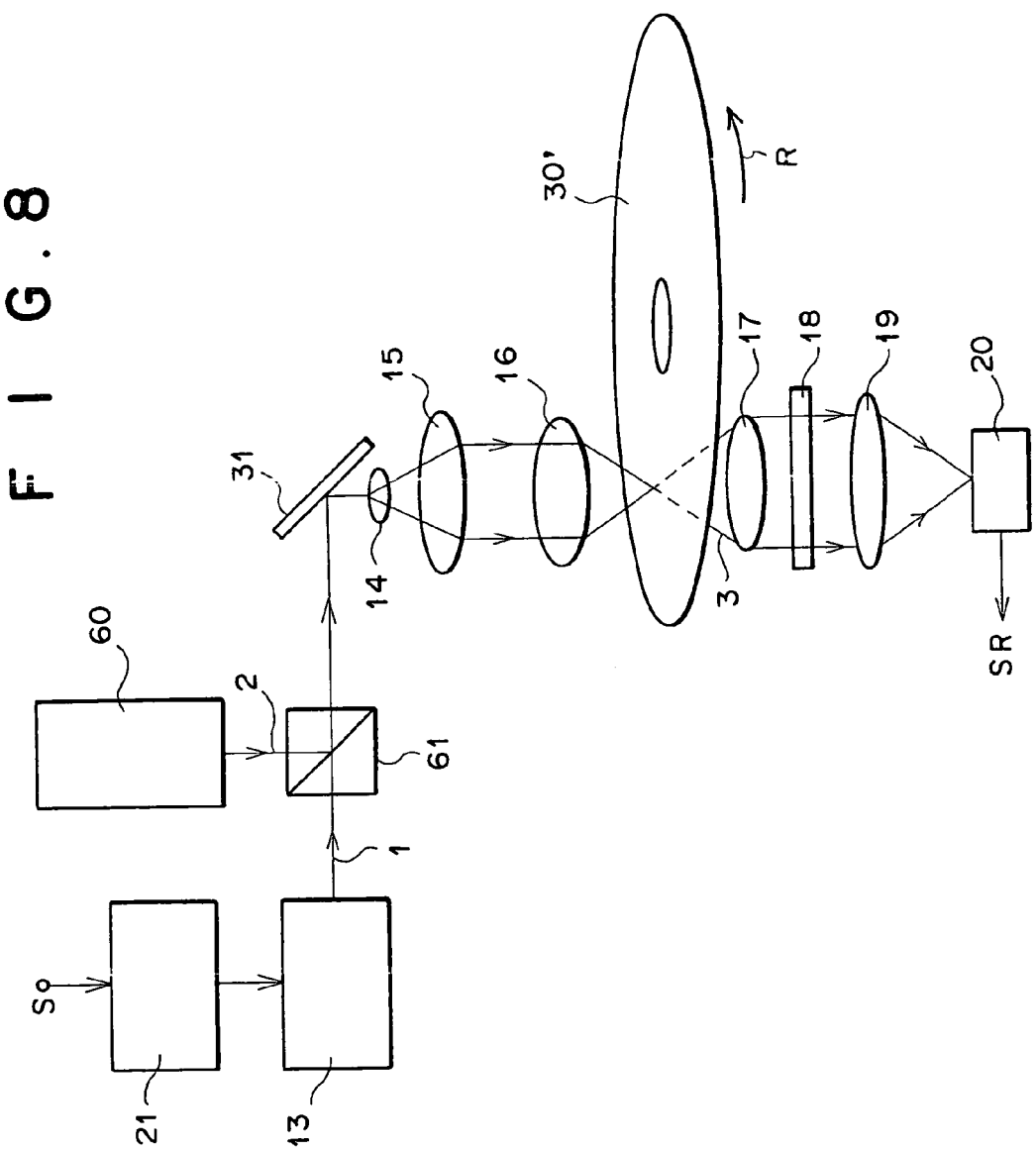
FIG. 8 is a side view showing a sixth embodiment of the information recording and reproducing apparatus in accordance with the present invention.

A sixth embodiment of the information recording and reproducing apparatus in accordance with the present invention will be described hereinbelow with reference to FIG. 8. The sixth embodiment of the information recording and reproducing apparatus in accordance with the present invention, which is shown in FIG. 8, is constituted basically in the same manner as that in the second embodiment of the information recording and reproducing apparatus shown in FIG. 3, except that, besides the recording light source 13, the excitation light source 60 is employed for the reproduction of the information. Also, the excitation light 2, which has been produced by the excitation light source 60, is reflected by the beam splitter 61, which has been inserted into the optical path of the recording light 1. The excitation light 2, which has been reflected by the beam splitter 61, follows the same optical path as that of the recording light 1.

In the sixth embodiment of FIG. 8, the recording light source 13 and the excitation light source 60, which are of the same types as those in the fifth embodiment of FIG. 7, are employed. Also, as a recording medium 30', a recording medium comprising a recording layer, which is of the same type as the recording layer 12' of the recording medium 10' employed in the fifth embodiment of FIG. 7, is employed. Therefore, in the sixth embodiment of FIG. 8, the recording of the information and the reproduction of the information are performed in the same manner as that in the fifth embodiment of FIG. 7 by driving the recording light source 13 and the excitation light source 60 respectively.

Figure 9:
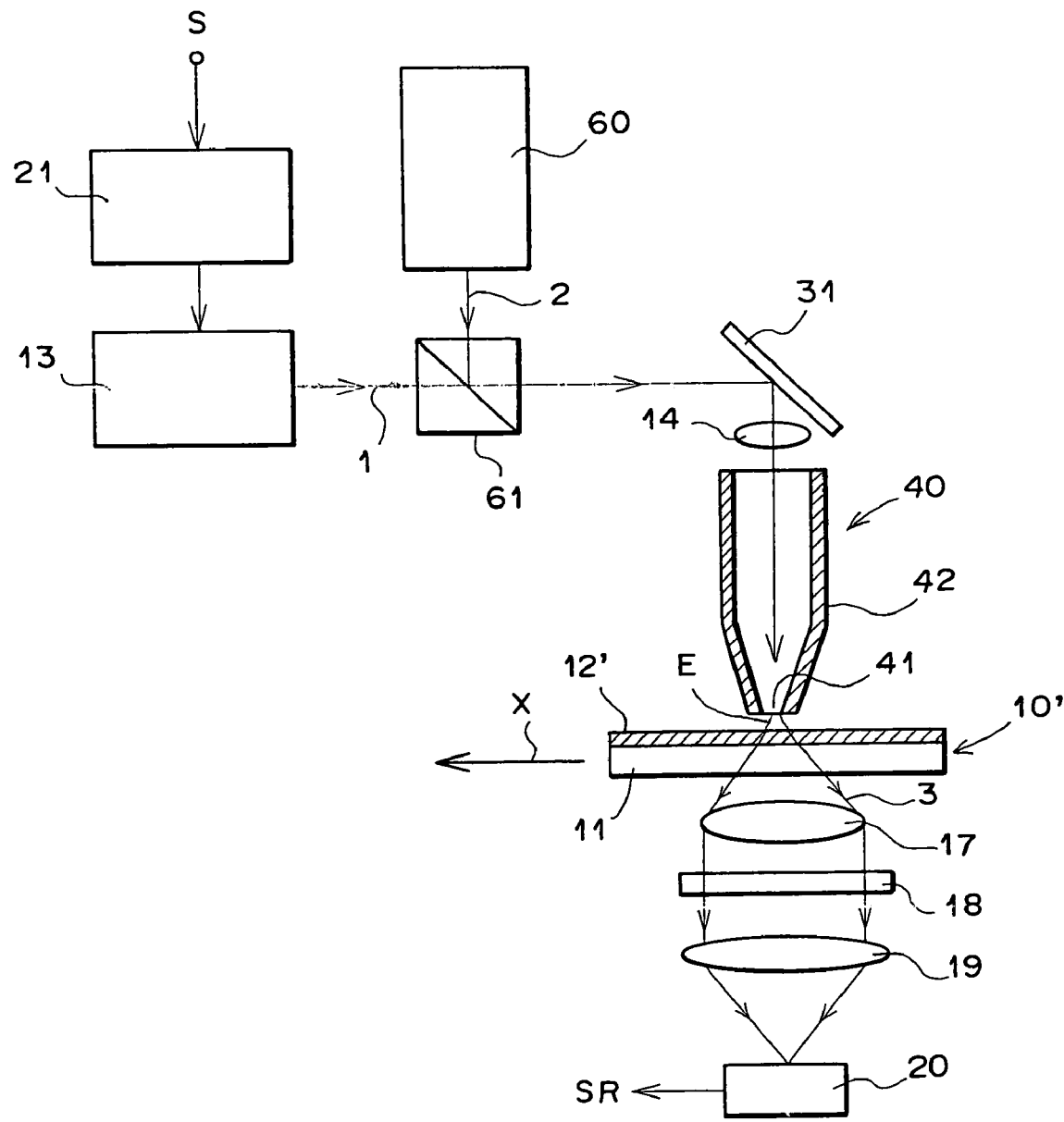
FIG. 9 is a side view showing a seventh embodiment of the information recording and reproducing apparatus in accordance with the present invention.

A seventh embodiment of the information recording and reproducing apparatus in accordance with the present invention will be described hereinbelow with reference to FIG. 9. The seventh embodiment of the information recording and reproducing apparatus in accordance with the present invention, which is shown in FIG. 9, is constituted basically in the same manner as that in the third embodiment of the information recording and reproducing apparatus shown in FIG. 4, except that, besides the recording light source 13, the excitation light source 60 is employed for the reproduction of the information. Also, the excitation light 2, which has been produced by the excitation light source 60, is reflected by the beam splitter 61, which has been inserted into the optical path of the recording light 1. The excitation light 2, which has been reflected by the beam splitter 61, follows the same optical path as that of the recording light 1.

In the seventh embodiment of FIG. 9, the recording light source 13 and the excitation light source 60, which are of the same types as those in the fifth embodiment of FIG. 7, are employed. Also, as a recording medium 10', a recording medium, which is of the same type as the recording medium 10' employed in the fifth embodiment of FIG. 7, is employed. Therefore, in the seventh embodiment of FIG. 9, the recording of the information and the reproduction of the information are performed in the same manner as that in the fifth embodiment of FIG. 7 by driving the recording light source 13 and the excitation light source 60 respectively.

Figure 10:
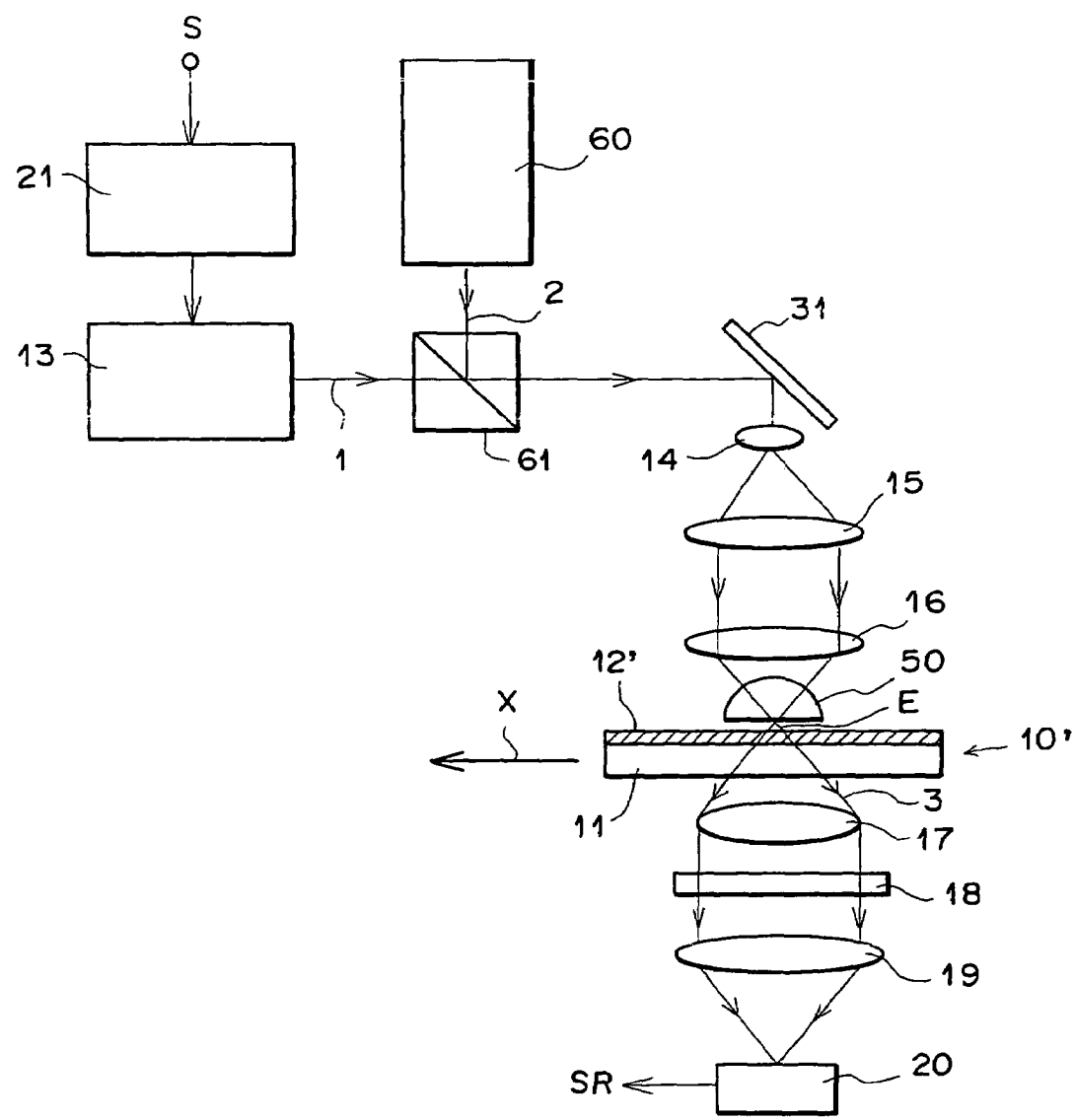
FIG. 10 is a side view showing an eighth embodiment of the information recording and reproducing apparatus in accordance with the present invention.

An eighth embodiment of the information recording and reproducing apparatus in accordance with the present invention will be described hereinbelow with reference to FIG. 10. The eighth embodiment of the information recording and reproducing apparatus in accordance with the present invention, which is shown in FIG. 10, is constituted basically in the same manner as that in the fourth embodiment of the information recording and reproducing apparatus shown in FIG. 6, except that, besides the recording light source 13, the excitation light source 60 is employed for the reproduction of the information. Also, the excitation light 2, which has been produced by the excitation light source 60, is reflected by the beam splitter 61, which has been inserted into the optical path of the recording light 1. The excitation light 2, which has been reflected by the beam splitter 61, follows the same optical path as that of the recording light 1.

In the eighth embodiment of FIG. 10, the recording light source 13 and the excitation light source 60, which are of the same types as those in the fifth embodiment of FIG. 7, are employed. Also, as a recording medium 10', a recording medium, which is of the same type as the recording medium 10' employed in the fifth embodiment of FIG. 7, is employed. Therefore, in the eighth embodiment of FIG. 10, the recording of the information and the reproduction of the information are performed in the same manner as that in the fifth embodiment of FIG. 7 by driving the recording light source 13 and the excitation light source 60 respectively.

In the recording medium in accordance with the present invention, the material employed for forming the recording layer is not limited to the materials, which are employed in the recording media 10, 10', 30, and 30' described above.

For example, the recording layer may be formed from a material comprising a combination of the compound B-6, which is one of the compounds represented by Formula (II-1) shown above and acting as the chemical species [FL] capable of producing the fluorescence, and the compound A-4, which is one of the compounds represented by Formula (II-2) shown above and acting as the chemical species [Q] capable of quenching the fluorescence. The material has the properties such that, when the recording light having the wavelength of 532 nm is irradiated to the material, the material is capable of being caused to change into the fluorescent material and such that, when the excitation light having the wavelength of 532 nm is then irradiated to the thus formed fluorescent material, the fluorescent material is capable of being caused to produce the fluorescence.

Alternatively, the recording layer may be formed from a material comprising a combination of the compound A-11, which is one of the compounds represented by Formula (II-3) shown above and acting as the chemical species [FL] capable of producing the fluorescence, and the compound B-40, which is one of the compounds represented by Formula (II-4) shown above and acting as the chemical species [Q] capable of quenching the fluorescence. The material has the properties such that, when the recording light having the wavelength of 680 nm is irradiated to the material, the material is capable of being caused to change into the fluorescent material and such that, when the excitation light having the wavelength of 680 nm is then irradiated to the thus formed fluorescent material, the fluorescent material is capable of being caused to produce the fluorescence having the wavelength of 750 nm.

As another alternative, the recording layer may be formed from a material comprising a combination of the compound B-74, which is one of the compounds represented by Formula (II-5) shown above and acting as the chemical species [FL] capable of producing the fluorescence, and the compound B-5, which is one of the compounds represented by Formula (II-4) shown above and acting as the chemical species [Q] capable of quenching the fluorescence. The material has the properties such that, when the recording light having the wavelength of 680 nm is irradiated to the material, the material is capable of being caused to change into the fluorescent material and such that, when the excitation light having the wavelength of 680 nm is then irradiated to the thus formed fluorescent material, the fluorescent material is capable of being caused to produce the fluorescence.

As a further alternative, the recording layer may be formed from a material comprising a combination of the compound B-136, which is one of the compounds represented by Formula (II-6) shown above and acting as the chemical species [FL] capable of producing the fluorescence, and the compound B-64, which is one of the compounds represented by Formula (II-4) shown above and acting as the chemical species [Q] capable of quenching the fluorescence. The material has the properties such that, when the recording light having the wavelength of 532 nm is irradiated to the material, the material is capable of being caused to change into the fluorescent material and such that, when the excitation light having the wavelength of 532 nm is then irradiated to the thus formed fluorescent material, the fluorescent material is capable of being caused to produce the fluorescence.

Figure 11:
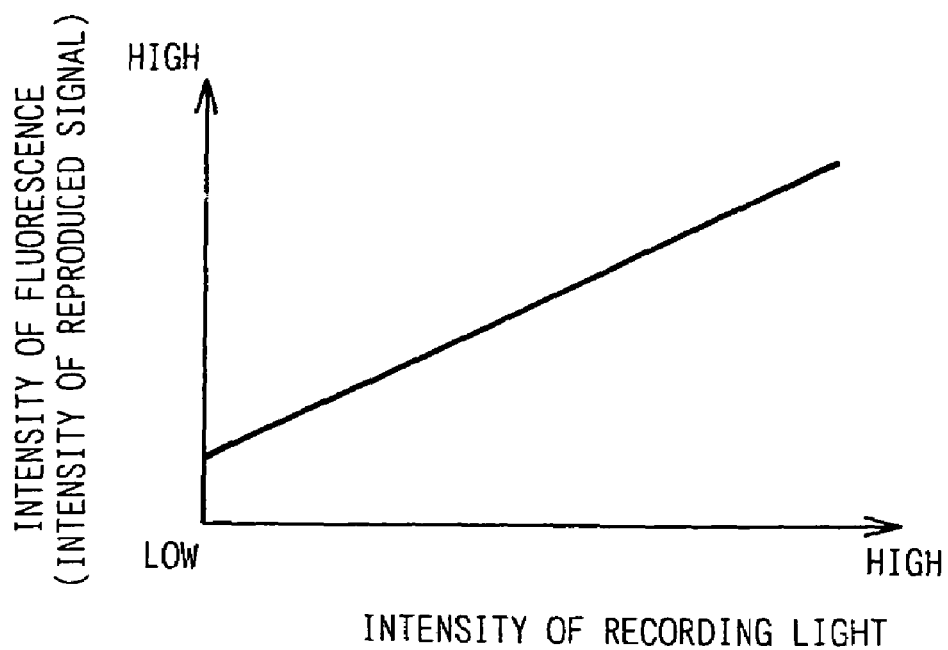
FIG. 11 is a graph showing relationship between an intensity of recording light, which is irradiated to the recording medium in accordance with the present invention, and an intensity of fluorescence, which is produced from the recording medium.

The material, which is employed for forming the recording layer of each of the recording media 10, 10', 30, and 30' in the first to eighth embodiments described above, has the characteristics such that, when the recording light 1 having the wavelength $\lambda 1$ is irradiated to the material, the material is capable of being caused to change into the fluorescent material and such that, when the excitation light 2 having the wavelength $\lambda 2$ and having a predetermined intensity is then irradiated to the thus formed fluorescent material, the fluorescent material is capable of being caused to produce the fluorescence 3 having an intensity in accordance with the intensity of the recording light 1. FIG. 11 shows the characteristics of the material.

Therefore, each of the first to eighth embodiments described above is capable of being constituted as a multi-valued information recording and reproducing apparatus. In such cases, as the digital signal S fed into the modulation driving circuit 21, a signal carrying multi-valued information, such as a gradation image signal, is employed. When the multi-valued information is to be recorded on the recording medium, as in each of the embodiments described above, the digital signal S, such as an image signal or computer data, is fed into the modulation driving circuit 21. In accordance with the digital signal S, the modulation driving circuit 21 drives the recording light source 13 and modulates the recording light 1. Specifically, the modulation driving circuit 21 drives and recording light source 13 and modulates the recording light 1 such that, in cases where the signal value of the digital signal S is large, the intensity of the recording light 1 becomes high. In this manner, the multi-valued information is recorded in the form of the pits on each of the recording media 10, 10', 30, and 30'.

When the multi-valued information, which has been recorded in the form of the pits on each of the recording media 10, 10', 30, and 30', is to be reproduced, the excitation light 2 having the predetermined intensity is irradiated to the recording layer of the recording medium in the same manner as that in each of the first to eighth embodiments described above.

As described above, when the excitation light 2 is irradiated to the recording layer of the recording medium, on which the multi-valued information has been recorded, the fluorescence 3 is produced from the site at which the pit has been formed, i.e. the site at which the fluorescent material has been formed. However, the fluorescence 3 is not produced from a site at which no pit has been formed. Also, since the recording layer is formed from the material having the characteristics described above, the fluorescence 3 having a high intensity is produced from a pit, which was exposed to the recording light 1 having a high intensity.

The fluorescence 3 is detected by the photodetector 20 via the filter 18. The fluorescence detection signal SR in accordance with the intensity of the fluorescence 3 is obtained from the photodetector 20. Therefore, by way of example, the fluorescence detection signal SR having been obtained as a time-series signal may be sampled and quantized by being synchronized with the movement of the recording medium. In this manner, the digital signal S carrying the multi-valued information is capable of being reproduced from the recording medium 10.

Figure 12:
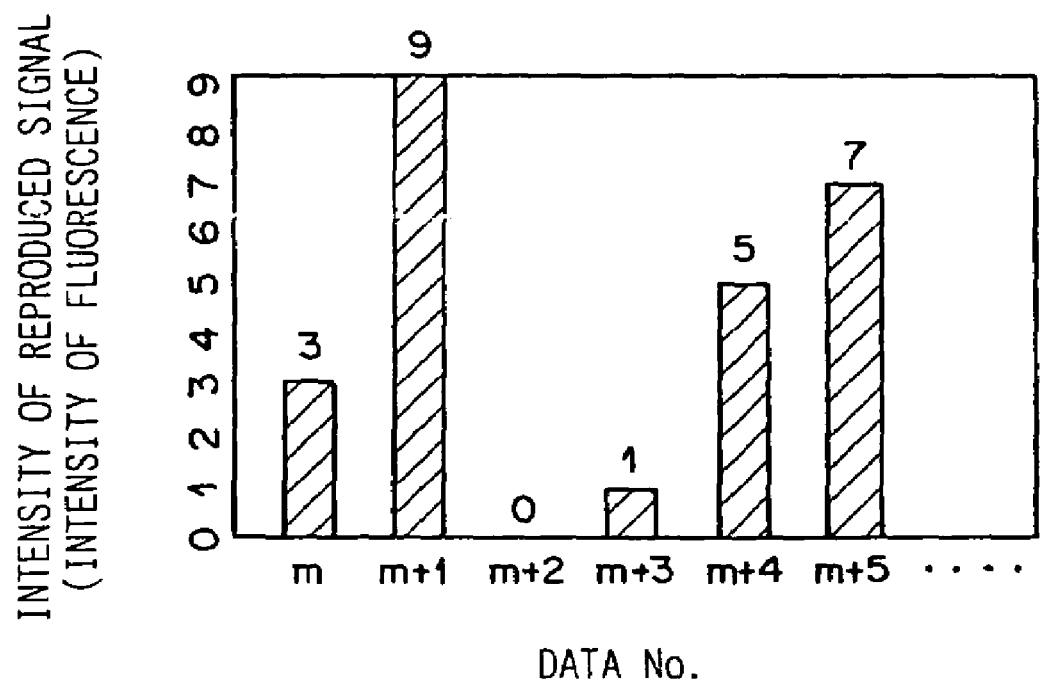
FIG. 12 is a graph showing an example of multi-valued information, which has been reproduced with the information recording and reproducing apparatus of FIG. 2.

As described above, the fluorescence 3 having a high intensity is produced from a pit, which was exposed to the recording light 1 having a high intensity. Therefore, the intensity of the fluorescence detection signal SR with respect to the pit becomes high. Accordingly, in accordance with the intensity of the fluorescence detection signal SR, the multi-valued information represented by the digital signal S is capable of being reproduced. FIG. 12 shows an example of the distribution of the intensities of the fluorescence detection signal SR (i.e., the reproduced signal), which distribution is obtained in cases where the digital signal S is a ten-valued signal.

Figure 13:
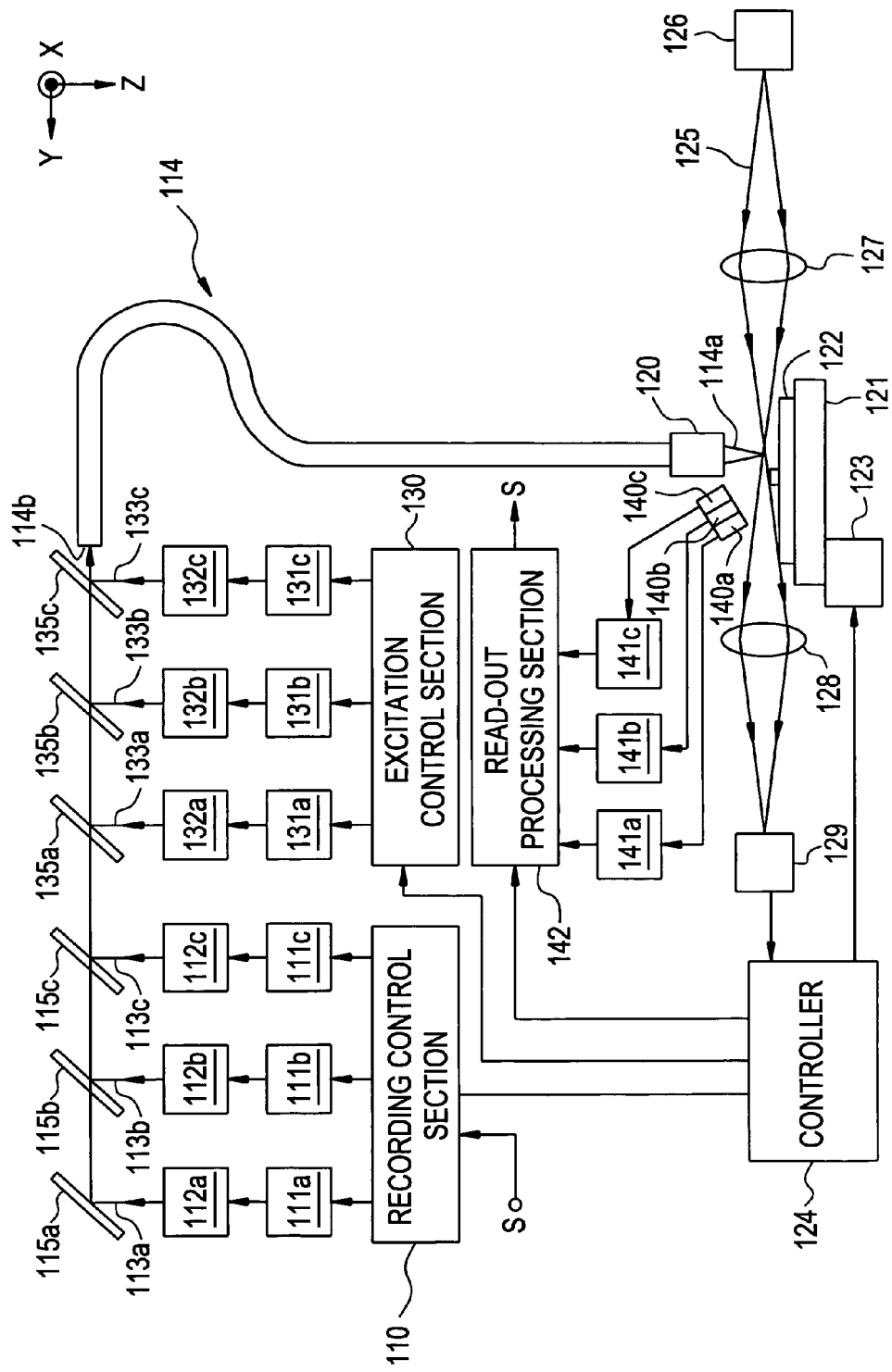
FIG. 13 is a side view showing a ninth embodiment of the information recording and reproducing apparatus in accordance with the present invention.

FIG. 13 is a side view showing a ninth embodiment of the information recording and reproducing apparatus in accordance with the present invention. With reference to FIG. 13, the information recording and reproducing apparatus comprises a recording control section 110, and three laser driving circuits 111a, 111b, and 111c, which are controlled by the recording control section 110. The information recording and reproducing apparatus also comprises recording lasers 112a, 112b, and 112c, which may be constituted of semi-conductor lasers, and the like, and which are driven respectively by the laser driving circuits 111a, 111b, and 111c. The information recording and reproducing apparatus further comprises a mirror 115a for reflecting recording light (in this case, a recording laser beam) 113a, which has been produced by the recording laser 112a, toward an optical fiber 114. The information recording and reproducing apparatus still further comprises dichroic mirrors 115b and 115c for respectively reflecting recording light (in this case, a recording laser beam) 113b and recording light (a recording laser beam) 113c, which have been produced respectively by the recording lasers 112b and 112c, toward the optical fiber 114.

One end side of the optical fiber 114 has been processed to form a micro-aperture probe 114a, which will be described later. The recording lasers 112a, 112b, and 112c respectively produce the recording laser beams 113a, 113b, and 113c, which respectively have different wavelengths $\lambda 1a$, $\lambda 1b$, and $\lambda 1c$. In this embodiment, $\lambda 1a$=488 nm, $\lambda 1b$=640 nm, and $\lambda 1c$=780 nm. The dichroic mirror 115b transmits the recording laser beam 113a having the wavelength $\lambda 1a$. The dichroic mirror 115c transmits the recording laser beam 113a having the wavelength $\lambda 1a$ and the recording laser beam 113b having the wavelength $\lambda 1b$. In this manner, the recording laser beams 113a, 113b, and 113c are combined with one another, and the combined recording laser beams impinge upon the other end 114b of the optical fiber 114 and enter into the optical fiber 114.

The information recording and reproducing apparatus also comprises an excitation control section 130, and three laser driving circuits 131a, 131b, and 131c, which are controlled by the excitation control section 130. The information recording and reproducing apparatus further comprises excitation lasers 132a, 132b, and 132c, which may be constituted of semiconductor lasers, and the like, and which are driven respectively by the laser driving circuits 131a, 131b, and 131c. The information recording and reproducing apparatus still further comprises dichroic mirrors 135a, 135b and 135c for respectively reflecting excitation light (in this case, an excitation laser beam) 133a, excitation light (an excitation laser beam) 133b, and excitation light (an excitation laser beam) 133c, which have been produced respectively by the excitation lasers 132a, 132b, and 132c, toward the optical fiber 114.

The excitation lasers 132a, 132b, and 132c respectively produce the excitation laser beams 133a, 133b, and 133c, which respectively have different wavelengths $\lambda 2a$, $\lambda 2b$, and $\lambda 2c$. In this embodiment, $\lambda 2a$=488 nm, $\lambda 2b$=640 nm, and $\lambda 2c$=780 nm. The dichroic mirrors 135a, 135b and 135c are located in the optical path of the recording laser beams 113a, 113b, and 113c, which have been combined with one another in the manner described above. The dichroic mirrors 135a, 135b and 135c transmit all of the combined recording laser beams 113a, 113b, and 113c. The dichroic mirror 135b also transmits the excitation laser beam 133a having the wavelength $\lambda 2a$. The dichroic mirror 135c also transmits the excitation laser beam 133a having the wavelength $\lambda 2a$ and the excitation laser beam 133b having the wavelength $\lambda 2b$. In this manner, the excitation laser beams 133a, 133b, and 133c are combined with one another, and the combined excitation laser beams impinge upon the other end 114b of the optical fiber 114 and enter into the optical fiber 114.

The recording control section 110 and the excitation control section 130 are controlled by a controller (a general control section) 124.

A piezo-electric device 120 is located at the micro-aperture probe 114a. Also, a disk-like recording medium 122 is supported on a turn table 121 and is located at a position in the vicinity of the bottom end of the micro-aperture probe 114a. The turn table 121 rotates the recording medium 122. The turn table 121 can also be moved in three-dimensional directions X, Y, and Z by turn table driving means 123, which may be constituted of a piezo-electric device, or the like. The turn table driving means 123 is controlled by the controller 124.

The information recording and reproducing apparatus also comprises a laser 126 for producing a laser beam 125, which is utilized for controlling the position of the turn table 121 with respect to the direction Z. The information recording and reproducing apparatus further comprises a converging lens 127 for converging the laser beam 125 to form a laser beam spot at the bottom end of the micro-aperture probe 114a, a converging lens 128 for converging the laser beam 125, which has diverged after being converged by the converging lens 127, and a photodetector 129 for detecting the laser beam 125, which has been converged by the converging lens 128. The output of the photodetector 129 is fed into the controller 124.

Furthermore, three photodetectors 140a, 140b, and 140c are located at a position in the vicinity of the micro-aperture probe 114a. The photodetectors 140a, 140b, and 140c respectively detect fluorescence having a wavelength $\lambda 3a$ of 540 nm, fluorescence having a wavelength $\lambda 3b$ of 750 nm, and fluorescence having a wavelength $\lambda 3c$ of 850 nm, which are produced from the recording medium 122 in the manner described later. The outputs of the photodetectors 140a, 140b, and 140c are respectively amplified by amplifiers 141a, 141b, and 141c. The outputs having been amplified are fed into a read-out processing section 142. The read-out processing section 142 is controlled by the controller 124.

The micro-aperture probe 114a has a micro-aperture at the bottom end. The micro-aperture has a diameter (of, by way of example, approximately several nanometers) shorter than the wavelengths $\lambda 1a$, $\lambda 1b$, and $\lambda 1c$. By way of example, as illustrated in detail in FIG. 14, the micro-aperture can be formed by pointing a bottom end portion of a core 114c of the optical fiber 114, forming an opaque metal film 114d on the core 114c of the optical fiber 114 with a vacuum evaporation process, and thereafter removing the metal film 114d from only the bottom end of the core 114c of the optical fiber 114.

Figure 14:
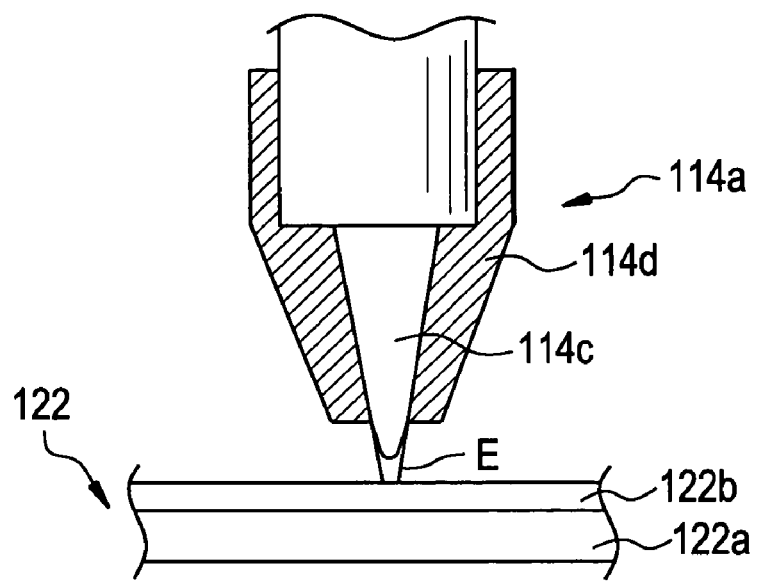
FIG. 14 is a partially cutaway side view showing a major part of the information recording and reproducing apparatus of FIG. 13.

Also, as illustrated in FIG. 14, the recording medium 122 comprises a substrate 122a and a recording layer 122b overlaid on the substrate 122a. By way of example, the recording layer 122b is constituted of a thin film containing three kinds of materials A, B, and C, which are uniformly mixed with one another.

The material A has the properties such that, when the recording laser beam 113a having the wavelength $\lambda 1a$ of 488 nm is irradiated to the material, the material is capable of being caused to change into the fluorescent material and such that, when the excitation laser beam 133a having the wavelength $\lambda 2a$ of 488 nm is then irradiated to the thus formed fluorescent material, the fluorescent material is capable of being caused to produce the fluorescence having the wavelength $\lambda 3a$ in the vicinity of 540 nm. By way of example, the material A may comprise a combination of the anion A-2, which is one of the anions represented by Formula (II-3) shown above and acting as the chemical species [FL] capable of producing the fluorescence, and the cation B-40, which is one of the cations represented by Formula (II-4) shown above and acting as the chemical species [Q] capable of quenching the fluorescence.

The material B has the properties such that, when the recording laser beam 113b having the wavelength $\lambda 1b$ of 640 nm is irradiated to the material, the material is capable of being caused to change into the fluorescent material and such that, when the excitation laser beam 133b having the wavelength $\lambda 2b$ of 640 nm is then irradiated to the thus formed fluorescent material, the fluorescent material is capable of being caused to produce the fluorescence having the wavelength $\lambda 3b$ in the vicinity of 750 nm. By way of example, the material B may comprise a combination of the compound B-6, which is one of the compounds represented by Formula (II-1) shown above and acting as the chemical species [FL] capable of producing the fluorescence, and the compound A-4, which is one of the cations represented by Formula (II-2) shown above and acting as the chemical species [Q] capable of quenching the fluorescence.

The material C has the properties such that, when the recording laser beam 113c having the wavelength $\lambda 1c$ of 780 nm is irradiated to the material, the material is capable of being caused to change into the fluorescent material and such that, when the excitation laser beam 133c having the wavelength $\lambda 2c$ of 780 nm is then irradiated to the thus formed fluorescent material, the fluorescent material is capable of being caused to produce the fluorescence having the wavelength $\lambda 3c$ in the vicinity of 850 nm. By way of example, the material C may comprise a combination of the anion B-76, which is one of the anions represented by Formula (II-5) shown above and acting as the chemical species [FL] capable of producing the fluorescence, and the cation B-5, which is one of the cations represented by Formula (II-4) shown above and acting as the chemical species [Q] capable of quenching the fluorescence.

How the ninth embodiment of the information recording and reproducing apparatus in accordance with the present invention operates will be described hereinbelow.

Firstly, how the information is recorded on the recording medium 122 will be described hereinbelow. The digital signal S, such as an image signal or computer data, is fed into the recording control section 110. The recording control section 110 separates the digital signal S into three groups of equal signal lengths in accordance with a predetermined format. Specifically, for example, in cases where the digital signal S is a 24-bit signal, processing is performed such that the digital signal S may be separated into signals of 8 bits+8 bits+8 bits.

The recording control section 110 controls the laser driving circuit 111a in accordance with a signal of a first group, which is among the signals of the three groups. Also, the recording control section 110 controls the laser driving circuit 111b in accordance with a signal of a second group and controls the laser driving circuit 111c in accordance with a signal of a third group. In this manner, the recording laser beams 113a, 113b, and 113c are respectively subjected to on-off modulation in accordance with the signals of the first group, the second group, and the third group.

As illustrated in FIG. 14, when the recording laser beam 113a follows the optical path described above and enters into the optical fiber 114, an evanescent wave E having the wavelength $\lambda 1a$ is radiated out from the micro-aperture probe 114a, which is formed at the bottom end of the optical fiber 114. When the evanescent wave E is irradiated to the recording layer 122b, the material A constituting the recording layer 122b, which material is located at the site having been exposed to the evanescent wave E, changes into a fluorescent material A, and a fine pit is thereby formed with the fluorescent material A in the recording layer 122b. In the same manner as that described above, when the recording laser beam 113b enters into the optical fiber 114, an evanescent wave E having the wavelength $\lambda 1b$ is radiated out from the micro-aperture probe 114a, and the material B constituting the recording layer 122b, which material is located at the site having been exposed to the evanescent wave E, changes into a fluorescent material B. As a result, a fine pit is formed with the fluorescent material B in the recording layer 122b. Also, when the recording laser beam 113c enters into the optical fiber 114, an evanescent wave E having the wavelength $\lambda 1c$ is radiated out from the micro-aperture probe 114a, and the material C constituting the recording layer 122b, which material is located at the site having been exposed to the evanescent wave E, changes into a fluorescent material C. As a result, a fine pit is formed with the fluorescent material C in the recording layer 122b.

In cases where the recording laser beams 113a, 113b, and 113c simultaneously enter into the optical fiber 114, the three kinds of the pits described above are formed at an identical site on the recording layer 122b, at which site the materials A, B, and C have been uniformly mixed with one another. Specifically, with this embodiment, basically, a recording density three times as high as the recording density, which is obtained when the information is recorded with one kind of recording light, is capable of being obtained.

Also, since each of the evanescent waves E, E, E described above is radiated out from the range of a diameter shorter than the wavelengths of the recording laser beams 113a, 113b, and 113c, the diameter of the pit is shorter than the wavelengths of the recording laser beams 113a, 113b, and 113c. Therefore, the recording density is capable of being enhanced markedly.

When the pit described above is formed, the recording medium 122 is rotated by the turn table 121, and the micro-aperture probe 114a is moved by a known linear movement mechanism (not shown) and in the radial direction of the recording medium 122. Therefore, each evanescent wave E, which is radiated out from the micro-aperture probe 114a, scans the recording medium 122 along a spiral path or concentric circular paths. As a result, the pits arrayed along the spiral line or concentric circular lines are formed on the recording medium 122.

In cases where the recording of the information is performed in the manner described above, it is necessary that the distance between the bottom end of the micro-aperture probe 114a and the turn table 121 be kept at a predetermined length of distance. How the distance is kept at the predetermined length of distance will be described hereinbelow.

Specifically, the bottom end portion of the micro-aperture probe 114a is subjected to resonance vibration with the piezo-electric device 120 described above, and the turn table 121 is moved vertically by the turn table driving means 123. In this manner, the distance between the bottom end of the micro-aperture probe 114a and the surface of the recording medium 122 is altered. At this time, when the bottom end of the micro-aperture probe 114a and the surface of the recording medium 122 become close to each other, van der Waals force begins to act between the bottom end of the micro-aperture probe 114a and the surface of the recording medium 122. As a result, shear force acts on the micro-aperture probe 114a, and an amplitude of vibration of the micro-aperture probe 114a varies accompanying the shear force. Therefore, the laser beam 125 is converged at the bottom end of the micro-aperture probe 114a, and diffracted light of the laser beam 125 is detected by the photodetector 129. In this manner, the amplitude of vibration of the micro-aperture probe 114a is measured. The amplitude of vibration depends upon the distance between the bottom end of the micro-aperture probe 114a and the surface of the recording medium 122. Accordingly, the turn table driving means 123 is controlled by the controller 124 such that the amplitude of vibration may be kept at a predetermined value, and the distance between the bottom end of the micro-aperture probe 114a and the surface of the recording medium 122 is thereby kept at the predetermined length of distance.

How the information, which has been recorded in the form of the pit on the recording medium 122, is reproduced from the recording medium 122 will be described hereinbelow. When the reproduction of the information is to be performed, the recording medium 122 is rotated by the turn table 121. Also, the excitation control section 130 controls the laser driving circuits 131a, 131b, and 131c such that the excitation lasers 132a, 132b, and 132c respectively produce the excitation laser beams 133a, 133b, and 133c having a predetermined intensity. When the excitation laser beams 133a, 133b, and 133c follow the optical path described above and enter into the optical fiber 114, evanescent waves E, E, E respectively having the wavelengths $\lambda 2a$, $\lambda 2b$, and λ2c are radiated out from the micro-aperture probe 114a and are irradiated to the recording layer 122b of the recording medium 122.

When the evanescent wave E having the wavelength λ2a is irradiated to the site (the pit) on the recording layer 122b, at which site the material A has changed into the fluorescent material A, the fluorescent material A is excited to produce the fluorescence having the wavelength λ3a. Even if the evanescent wave E having the wavelength λ2a is irradiated to a site on the recording layer 122b, at which site the material A has not changed into the fluorescent material A, no fluorescence will be produced from the site. Also, when the evanescent wave E having the wavelength λ2b is irradiated to the site (the pit) on the recording layer 122b, at which site the material B has changed into the fluorescent material B, the fluorescent material B is excited to produce the fluorescence having the wavelength λ3b. Even if the evanescent wave E having the wavelength λ2b is irradiated to a site on the recording layer 122b, at which site the material B has not changed into the fluorescent material B, no fluorescence will be produced from the site. Further, when the evanescent wave E having the wavelength λ2c is irradiated to the site (the pit) on the recording layer 122b, at which site the material C has changed into the fluorescent material C, the fluorescent material C is excited to produce the fluorescence having the wavelength λ3c. Even if the evanescent wave E having the wavelength λ2c is irradiated to a site on the recording layer 122b, at which site the material C has not changed into the fluorescent material C, no fluorescence will be produced from the site.

The photodetectors 140a, 140b, and 140c respectively have spectral sensitivity peaks at wavelengths in the vicinity of the wavelengths λ3a, λ3, and λ3c of the fluorescence. Therefore, of the produced fluorescence, the fluorescence having the wavelength 3a is detected independently by the photodetector 140a. Also, the fluorescence having the wavelength λ3b is detected independently by the photodetector 140b, and the fluorescence having the wavelength λ3c is detected independently by the photodetector 140c. At this time, in order to track the pits arrayed along the spiral line or concentric circular lines, the conventional tracking techniques for optical disks may be utilized.

Fluorescence detection signals, which have been obtained respectively from the photodetectors 140a, 140b, and 140c, are respectively amplified by the amplifiers 141a, 141b, and 141c. The amplified signals are fed into the read-out processing section 142. The read-out processing section 142 forms signals of the first group, the second group, and the third group described above respectively from the three series of the signals. Also, from the thus formed signals, the read-out processing section 142 reproduces the digital signal S before being separated into the three groups.

As described above, with the ninth embodiment of FIG. 13, the digital signal S is capable of being recorded at a markedly high density on the recording medium 122. Also, the recorded information is capable of being reproduced from the recording medium 122.

In the ninth embodiment of FIG. 13, the digital signal S is separated into the three groups of equal signal lengths, the recording lasers 112a, 112b, and 112c are driven in parallel, and the signals of the three groups are recorded in parallel. Alternatively, firstly, only the recording laser 112a may be driven, and the signal may thereby be recorded on the entire area of the recording layer 122b of the recording medium 122. Thereafter, only the recording laser 112b may be driven, and the signal may thereby be recorded on the entire area of the recording layer 122b of the recording medium 122. Also, only the recording laser 112c may then be driven, and the signal may thereby be recorded on the entire area of the recording layer 122b of the recording medium 122.

Figure 15:
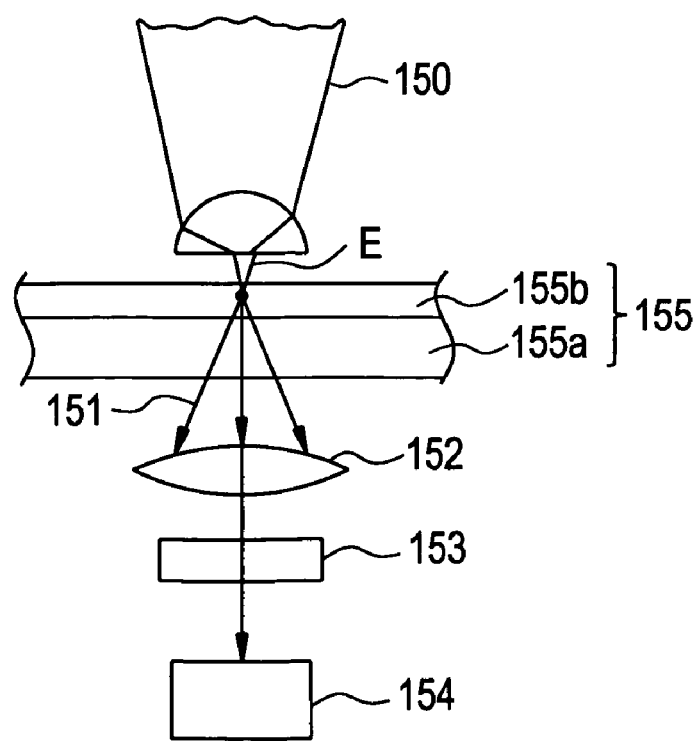
FIG. 15 is a side view showing a major part of a tenth embodiment of the information recording and reproducing apparatus in accordance with the present invention.

A tenth embodiment of the information recording and reproducing apparatus in accordance with the present invention will be described hereinbelow with reference to FIG. 15. In the tenth embodiment of FIG. 15, in lieu of the micro-aperture probe 114a described above, a solid immersion lens 150 is employed. In cases where the solid immersion lens 150 is utilized in air, the solid immersion lens 150 has the characteristics such that, when light is entered from one end side of the solid immersion lens 150 into the solid immersion lens 150, the solid immersion lens 150 radiates out the evanescent wave E from the other end (i.e., the bottom end in FIG. 15).

The solid immersion lens 150 is capable of being utilized for irradiating the recording light to a recording layer 155b of a recording medium 155 and for irradiating the excitation light to the recording layer 155b. (In FIG. 15, reference numeral 155a represents the substrate of the recording medium 155.) In cases where the wavelength of the evanescent wave E radiated out from the solid immersion lens 150 is represented by λ, and the refractive index of the medium of the lens is represented by n, the diameter of the range, from which the evanescent wave E is radiated out, is equal to λ/n, which is shorter than the wavelength λ. Therefore, in cases where the recording of the information is performed by the utilization of the solid immersion lens 150, the diameter of the pit is capable of being kept shorter than the wavelength of the recording light, and the information is capable of being recorded at a high density.

In cases where the solid immersion lens 150 is utilized, as the read-out means for detecting the fluorescence, the read-out means shown in FIG. 13 may be utilized. Alternatively, the read-out means shown in FIG. 5 may be utilized. By way of example, the read-out means shown in FIG. 15 corresponds to the recording layer 155b, which is constituted of one kind of material capable of changing into the fluorescent material. The read-out means shown in FIG. 15 comprises a converging lens 152 for converging fluorescence 151 having been produced from the recording layer 155b. The read-out means shown in FIG. 15 also comprises a filter 153 for transmitting light having wavelengths falling within the wavelength region of the fluorescence 151 and filtering out light having wavelengths falling within the wavelength region of the evanescent wave E, which acts as the excitation light. The read-out means shown in FIG. 15 further comprises a photodetector 154 for detecting the fluorescence 151 having passed through the filter 153.

In cases where the recording layer 155b comprises multiple kinds of materials, which have been uniformly mixed with one another, and the information having been recorded with multiple recording on the recording layer 155b is to be readout, the read-out means described above may be utilized. Specifically, in such cases, as the filter 153, a filter for filtering out light having wavelengths falling within the wavelength region of the evanescent wave E, which acts as the excitation light, and transmitting light having wavelengths falling within the wavelength region of the fluorescence may be provided to correspond to each of the excitation laser beams. Also, when the excitation laser beam is changed over to a different excitation laser beam, the filter corresponding to the excitation laser beam may be selected and located in front of the photodetector 154.

In the aforesaid ninth embodiment of FIG. 13, the wavelength selecting means, such as the filter 153, should preferably be utilized when necessary. Also, in lieu of the optical filter 153, a prism, a grating, a holographic element, or the like, may be employed as the wavelength selecting means.

Figure 16:
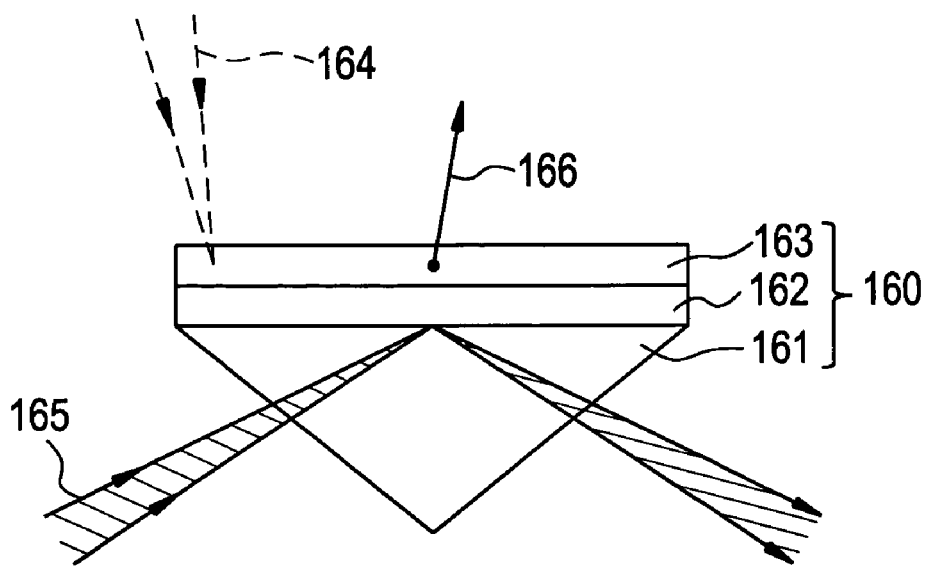
FIG. 16 is a side view showing a different embodiment of the recording medium in accordance with the present invention.

A different embodiment of the recording medium in accordance with the present invention and how the recording and the reproduction of information are performed with respect to the different embodiment of the recording medium will be described hereinbelow with reference to FIG. 16. With reference to FIG. 16, a recording medium 160 comprises a substrate 161, which is constituted of a dielectric block having a prism-like shape, a metal film 162 formed on one surface of the substrate 161, and a recording layer 163 overlaid on the metal film 162.

The metal film 162 should preferably be formed from, for example, gold or silver. The recording layer 163 comprises a material having the properties such that, when the recording light is irradiated to the material, the material is capable of being caused to change into the fluorescent material. The recording layer 163 may comprise one kind of the material. Alternatively, such that multiple recording may be performed, the recording layer 163 may comprise multiple kinds of the materials, which have been uniformly mixed with one another. By way of example, the cases where the recording layer 163 comprises one kind of the material will be described hereinbelow.

When recording light 164 having the wavelength $\lambda 1$, which recording light carries the recording information, is irradiated to the recording layer 163, the material constituting the recording layer 163 changes into the fluorescent material. Therefore, in cases where the recording layer 163 is two-dimensionally scanned with the recording light 164, the recording information is capable of being recorded in the form of, for example, the pit described above on the recording layer 163.

After the recording information has been recorded on the recording layer 163, excitation light 165 having the wavelength $\lambda 2$ is irradiated from the side of the substrate 161 to the recording medium 160 such that the excitation light 165 impinges at a specific angle of incidence upon an interface between the substrate 161 and the metal film 162. As a result, surface plasmon resonance is excited at the metal film 162, and a plasma wave (a light wave) oozes out and impinges upon the recording layer 163. When the light having the wavelength $\lambda 2$ is thus irradiated to the recording layer 163, fluorescence 166 having the wavelength $\lambda 3$ is produced from the fluorescent material having been formed in the recording layer 163. Accordingly, the interface between the substrate 161 and the metal film 162 is two-dimensionally scanned with the excitation light 165, and the fluorescence produced from the recording layer 163 is detected with respect to each of the positions which are being scanned with the excitation light 165. In this manner, the recording information is capable of being reproduced from the recording medium 160.

Alternatively, in lieu of the substrate 161 being constituted of the dielectric block having the prism-like shape, the substrate may be constituted of a dielectric block having an approximately rectangular parallelepiped shape, and the substrate and an independent prism may be coupled with each other via a refractive index matching liquid. In such cases, the substrate and the prism may be formed from an identical material, and a refractive index matching liquid having a refractive index identical with the refractive index of the substrate and the prism may be employed. In this manner, a structure optically equivalent to the structure shown in FIG. 16 is capable of being obtained.

Figure 17:
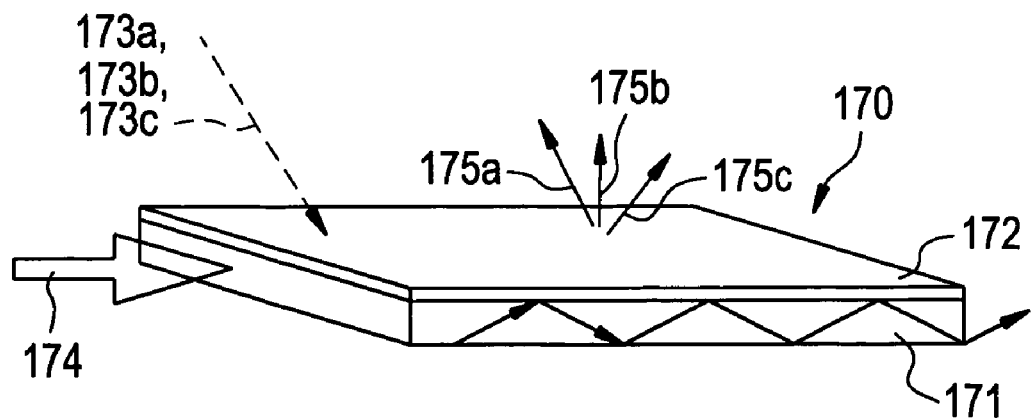
FIG. 17 is a perspective view showing a further different embodiment of the recording medium in accordance with the present invention.

A further different embodiment of the recording medium in accordance with the present invention and how the recording and the reproduction of information are performed with respect to the further different embodiment of the recording medium will be described hereinbelow with reference to FIG. 17. With reference to FIG. 17, a recording medium 170 comprises a substrate 171, which is permeable to excitation light described later, and a recording layer 172 overlaid on one surface of the substrate 171.

The recording layer 172 comprises a material having the properties such that, when the recording light is irradiated to the material, the material is capable of being caused to change into the fluorescent material. The recording layer 172 may comprise one kind of the material. Alternatively, such that multiple recording may be performed, the recording layer 172 may comprise multiple kinds of the materials, which have been uniformly mixed with one another. By way of example, the cases where the recording layer 172 comprises the three kinds of the materials A, B, and C described above will be described hereinbelow.

When recording light beams 173*a*, 173*b*, and 173*c* respectively having the wavelengths $\lambda 1a$, $\lambda 1b$, and $\lambda 1c$, which recording light beams carry the recording information, are irradiated to the recording layer 172, the materials A, B, and C constituting the recording layer 172 respectively change into the fluorescent materials A, B, and C. Therefore, in cases where the recording layer 172 is two-dimensionally scanned with the recording light beams 173*a*, 173*b*, and 173*c*, the recording information is capable of being recorded in the form of, for example, the pit described above on the recording layer 172. By way of example, the recording layer 172 may be formed by overlaying a thin film, which contains the three kinds of the materials A, B, and C uniformly mixed with one another, on the substrate 171.

After the recording information has been recorded on the recording layer 172, excitation light 174 is entered from an end face of the substrate 171 into the substrate 171 such that the excitation light 174 propagates through repeated total reflection between the two surfaces of the substrate 171. As a result, an evanescent wave oozes out from the substrate 171 toward the recording layer 172 over the entire area of the recording layer 172. The evanescent wave is thus irradiated to the recording layer 172.

In such cases, as the excitation light 174, for example, white light containing light having the wavelengths $\lambda 2a$, $\lambda 2b$, and $\lambda 2c$, which respectively fall within the excitation wavelength regions for the fluorescent materials A, B, and C, may be employed. Alternatively, as the excitation light 174, a mixture of three-color light beams respectively having wavelengths, which primarily fall within the wavelength regions of $\lambda 2a$, $\lambda 2b$, and $\lambda 2c$, may be employed. As another alternative, three-color excitation light beams respectively having wavelengths, which primarily fall within the wavelength regions of $\lambda 2a$, $\lambda 2b$, and $\lambda 2c$, may be irradiated to the recording layer 172 independently and with different timings.

When the evanescent wave described above is irradiated to the entire area of the recording layer 172, fluorescence 175*a* having a wavelength $\lambda 3a$ is produced from the site on the recording layer 172, at which site the material A has changed into the fluorescent material A. Also, fluorescence 175*b* having a wavelength $\lambda 3b$ is produced from the site on the recording layer 172, at which site the material B has changed into the fluorescent material B. Further, fluorescence 175*c* having a wavelength $\lambda 3c$ is produced from the site on the recording layer 172, at which site the material C has changed into the fluorescent material C. Therefore, the fluorescence 175*a*, the fluorescence 175*b*, and the fluorescence 175*c* may be spatially resolved and detected through wavelength discrimination by use of, for example, an area sensor comprising three kinds of fine photo detecting devices, which have different spectral sensitivity regions and which are arrayed in two-dimensional directions. In this manner, the recording information is capable of being reproduced from the recording medium 170.

In cases where the three-color excitation light beams respectively having wavelengths, which primarily fall within the wavelength regions of $\lambda 2a$, $\lambda 2b$, and $\lambda 2c$, are irradiated to the recording layer 172 independently and with different timings, the fluorescence 175$a$, the fluorescence 175$b$, and the fluorescence 175$c$ are capable of being discriminated and detected by use of one kind of photodetector, which is capable of detecting all of the fluorescence having the wavelengths $\lambda 3a$, $\lambda 3b$, and $\lambda 3c$.

In the recording medium in accordance with the present invention, the materials employed for forming the recording layer are not limited to the materials, which are employed in the recording medium 122 described above, and the recording layer may be formed from a combination of multiple kinds of the materials described below.

By way of example, the compound represented by Formula (I-4), which is one of the compounds represented by Formula (I) shown above, may be employed as the material constituting the recording layer. The material has the properties such that, when the recording light having the wavelength of 350 nm is irradiated to the material, the material is capable of being caused to change into a fluorescent material and such that, when the excitation light having the wavelength of 350 nm is then irradiated to the thus formed fluorescent material, the fluorescent material is capable of being caused to produce the fluorescence.

Also, as the material constituting the recording layer, it is possible to employ a material comprising a combination of the compound B-6, which is one of the compounds represented by Formula (II-1) shown above and acting as the chemical species [FL] capable of producing the fluorescence, and the compound A-4, which is one of the compounds represented by Formula (II-2) shown above and acting as the chemical species [Q] capable of quenching the fluorescence. The material has the properties such that, when the recording light having the wavelength of 532 nm is irradiated to the material, the material is capable of being caused to change into the fluorescent material and such that, when the excitation light having the wavelength of 532 nm is then irradiated to the thus formed fluorescent material, the fluorescent material is capable of being caused to produce the fluorescence.

Further, as the material constituting the recording layer, it is possible to employ a material comprising a combination of the compound A-11, which is one of the compounds represented by Formula (II-3) shown above and acting as the chemical species [FL] capable of producing the fluorescence, and the compound B-40, which is one of the compounds represented by Formula (II-4) shown above and acting as the chemical species [Q] capable of quenching the fluorescence. The material has the properties such that, when the recording light having the wavelength of 680 nm is irradiated to the material, the material is capable of being caused to change into the fluorescent material and such that, when the excitation light having the wavelength of 680 nm is then irradiated to the thus formed fluorescent material, the fluorescent material is capable of being caused to produce the fluorescence.

Furthermore, as the material constituting the recording layer, it is possible to employ a material comprising a combination of the compound B-74, which is one of the compounds represented by Formula (II-5) shown above and acting as the chemical species [FL] capable of producing the fluorescence, and the compound B-5, which is one of the compounds represented by Formula (II-4) shown above and acting as the chemical species [Q] capable of quenching the fluorescence. The material has the properties such that, when the recording light having the wavelength of 680 nm is irradiated to the material, the material is capable of being caused to change into the fluorescent material and such that, when the excitation light having the wavelength of 680 nm is then irradiated to the thus formed fluorescent material, the fluorescent material is capable of being caused to produce the fluorescence.

Also, as the material constituting the recording layer, it is possible to employ a material comprising a combination of the compound B-136, which is one of the compounds represented by Formula (II-6) shown above and acting as the chemical species [FL] capable of producing the fluorescence, and the compound B-64, which is one of the compounds represented by Formula (II-4) shown above and acting as the chemical species [Q] capable of quenching the fluorescence. The material has the properties such that, when the recording light having the wavelength of 532 nm is irradiated to the material, the material is capable of being caused to change into the fluorescent material and such that, when the excitation light having the wavelength of 532 nm is then irradiated to the thus formed fluorescent material, the fluorescent material is capable of being caused to produce the fluorescence.

As an example of a combination of multiple kinds of materials, it is possible to employ a combination of (a) a material comprising the compound represented by Formula (I-4), which is one of the compounds represented by Formula (I) shown above, and (b) a material comprising a combination of the compound B-6, which is one of the compounds represented by Formula (II-1) shown above and acting as the chemical species [FL] capable of producing the fluorescence, and the compound A-4, which is one of the compounds represented by Formula (II-2) shown above and acting as the chemical species [Q] capable of quenching the fluorescence. As for the material comprising the compound represented by Formula (I-4), the wavelength $\lambda 1$ of the recording light, with which the material is caused to change into the fluorescent material, is equal to 350 nm, the wavelength $\lambda 2$ of the excitation light for the formed fluorescent material is equal to 532 nm, and the wavelength $\lambda 3$ of the fluorescence produced by the fluorescent material is equal to 620 nm. As for the material comprising the combination of the compound B-6, which is one of the compounds represented by Formula (II-1) shown above, and the compound A-4, which is one of the compounds represented by Formula (II-2) shown above, the wavelength $\lambda 1$ of the recording light, with which the material is caused to change into the fluorescent material, is equal to 640 nm, the wavelength $\lambda 2$ of the excitation light for the formed fluorescent material is equal to 640 nm, and the wavelength $\lambda 3$ of the fluorescence produced by the fluorescent material is equal to 700 nm.

As a different example of a combination of multiple kinds of materials, it is possible to employ a combination of (a) a material comprising the compound represented by Formula (I-4), which is one of the compounds represented by Formula (I) shown above, and (b) a material comprising a combination of the compound A-2, which is one of the compounds represented by Formula (II-3) shown above and acting as the chemical species [FL] capable of producing the fluorescence, and the compound B-40, which is one of the compounds represented by Formula (II-4) shown above and acting as the chemical species [Q] capable of quenching the fluorescence: As for the material comprising the compound represented by Formula (I-4), the wavelength $\lambda1$ of the recording light, with which the material is caused to change into the fluorescent material, is equal to 350 nm, the wavelength $\lambda2$ of the excitation light for the formed fluorescent material is equal to 532 nm, and the wavelength $\lambda3$ of the fluorescence produced by the fluorescent material is equal to 620 nm. As for the material comprising the combination of the compound A-2, which is one of the compounds represented by Formula (II-3) shown above, and the compound B-40, which is one of the compounds represented by Formula (II-4) shown above, the wavelength $\lambda1$ of the recording light, with which the material is caused to change into the fluorescent material, is equal to 488 nm, the wavelength $\lambda2$ of the excitation light for the formed fluorescent material is equal to 532 nm, and the wavelength $\lambda3$ of the fluorescence produced by the fluorescent material is equal to 580 nm.

What is claimed is:

1. A method of generating fluorescence in an information recording medium, comprising the step of:

using a chemical species [FL] and a chemical species [Q] in the recording medium;

irradiating recording light having a predetermined wavelength $\lambda1$, said recording light carrying recording information, to the chemical species [FL] and the chemical species [Q] contained in the recording medium, thereby changing a combination of the chemical species [FL] and the chemical species [Q] into a fluorescent material; and irradiating excitation light having a predetermined wavelength $\lambda2$ to the fluorescent material, thereby causing the fluorescent material to emit fluorescence, wherein the chemical species [FL] is a compound represented by Formula (II-1):

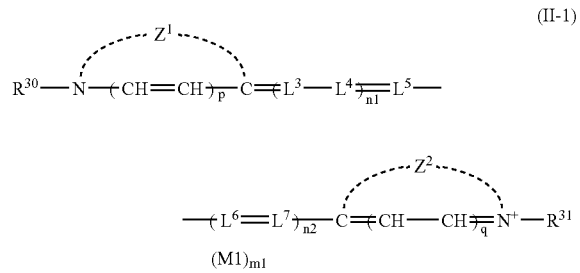

(II-1)

wherein $Z^1$ and $Z^2$ each represent an atom group necessary for forming a five-membered or six-membered, nitrogen-containing heterocyclic ring; $R^{30}$ and $R^{31}$ each independently represent an alkyl group or an aryl group; $L^3$, $L^4$, $L^5$, $L^6$, and $L^7$ each independently represent a substituted or unsubstituted methine group, provided that, in cases where $L^3$ to $L^7$ are substituted by substituents, the substituents may optionally be connected with one another to form a ring; p and q each independently represent 0 or 1; n1 and n2 each independently represent 0, 1, or 2; M1 represents a charge balancing counter ion; and mi represents a number necessary for keeping charge balance;

and the chemical species [Q] is a compound represented by Formula (II-2):

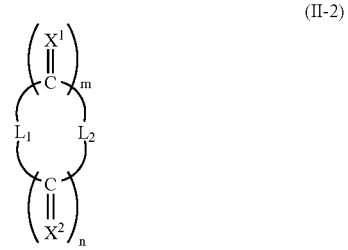

(II-2)

wherein m and n each independently represent an integer of 0 to 2; $X^1$ and $X^2$ each represent $=NR^1$ or $=CR^2R^3$, in which $R^1$, $R^2$, and $R^3$ each represent a substituent; and $L^1$ and $L^2$ each independently represent a bivalent linking group.

2. The method of claim 1, wherein an evanescent wave, which has been radiated out from a range of a diameter shorter than the wavelength of the recording light, is employed as the recording light.

3. The method of claim 1, further comprising:

detecting the fluorescence.

4. The method of claim 3, wherein light having the wavelength $\lambda2$ identical with the wavelength $\lambda1$ of the recording light is employed as the excitation light, an intensity of the excitation light having the wavelength $\lambda2$ is set at an intensity lower than the intensity of the recording light, and the excitation light having the thus set intensity is irradiated to the recording layer.

5. The method as defined in claim 3 wherein light having the wavelength $\lambda2$ different from the wavelength $\lambda1$ of the recording light is employed as the excitation light.

6. The method of claim 3, wherein light irradiated to a fine range is employed as the excitation light, the recording layer is scanned with the excitation light, and the fluorescence produced from the recording layer during the scanning with the excitation light is detected with respect to each of positions which are being scanned.

7. The method of claim 6, wherein an evanescent wave, which has been radiated out from a range of a diameter shorter than the wavelength of the excitation light, is employed as the excitation light.

8. The method as defined in claim 3 wherein the recording medium comprises a substrate and a recording layer; and wherein the excitation light is entered into the substrate so as to propagate through repeated total reflection between two surfaces of the substrate, an evanescent wave, which oozes out from the substrate toward the recording layer when the excitation light is thus entered into the substrate, is irradiated to the recording layer, and the fluorescence, which has been produced from the recording layer when the evanescent wave is thus irradiated to the recording layer, is spatially resolved and detected.

9. The method as defined in claim 3 wherein the recording medium comprises a substrate and a recording layer; and wherein the recording medium is constituted such that the substrate comprises a dielectric material, a metal film is overlaid on one surface of the dielectric material, and the recording layer is overlaid on the metal film, and the excitation light is irradiated from the substrate side to the recording medium such that the excitation light impinges at a specific angle of incidence upon the metal film.

10. The method of claim 1,
wherein the recording light has an intensity in accordance with multi-valued information, and
wherein the emitted fluorescence has an intensity in accordance with the multi-valued information.

11. The method of claim 10, wherein an evanescent wave, which has been radiated out from a range of a diameter shorter than the wavelength of the recording light, is employed as the recording light.

12. The method of claim 10, comprising:
detecting the multi-valued fluorescence.

13. The method of claim 12, wherein light having the wavelength $\lambda 2$ identical with the wavelength $\lambda 1$ of the recording light is employed as the excitation light,
an intensity of the excitation light having the wavelength $\lambda 2$ is set at an intensity lower than the intensity of the recording light, and
the excitation light having the thus set intensity is irradiated to the recording layer.

14. The method as defined in claim 12 wherein light having the wavelength $\lambda 2$ different from the wavelength $\lambda 1$ of the recording light is employed as the excitation light.

15. The method of claim 12, wherein light irradiated to a fine range is employed as the excitation light,
the recording layer is scanned with the excitation light, and
the fluorescence produced from the recording layer during the scanning with the excitation light is detected with respect to each of positions which are being scanned.

16. The method of claim 15, wherein an evanescent wave, which has been radiated out from a range of a diameter shorter than the wavelength of the excitation light, is employed as the excitation light.

17. The method as defined in claim 12 wherein the recording medium comprises a substrate and a recording layer; and wherein the excitation light is entered into the substrate so as to propagate through repeated total reflection between two surfaces of the substrate,
an evanescent wave, which oozes out from the substrate toward the recording layer when the excitation light is thus entered into the substrate, is irradiated to the recording layer, and
the fluorescence, which has been produced from the recording layer when the evanescent wave is thus irradiated to the recording layer, is spatially resolved and detected.

18. The method as defined in claim 12 wherein the recording medium comprises a substrate and a recording layer; and wherein the recording medium is constituted such that the substrate comprises a dielectric material, a metal film is overlaid on one surface of the dielectric material, and the recording layer is overlaid on the metal film, and
the excitation light is irradiated from the substrate side to the recording medium such that the excitation light impinges at a specific angle of incidence upon the metal film.

19. The method of claim 10, wherein the wavelength $\lambda 1$ of the recording light and the wavelength $\lambda 2$ of the excitation light are identical to each other.

20. The method of claim 10, wherein the wavelength $\lambda 1$ of the recording light and the wavelength $\lambda 2$ of the excitation light are different from each other.

21. The method of claim 1, wherein the wavelength $\lambda 1$ of the recording light and the wavelength $\lambda 2$ of the excitation light are identical to each other.

22. The method of claim 1, wherein the wavelength $\lambda 1$ of the recording light and the wavelength $\lambda 2$ of the excitation light are different from each other.

* * * * *